United States Patent

Akao et al.

[11] Patent Number: 5,814,697
[45] Date of Patent: Sep. 29, 1998

[54] COLOR MASTERBATCH RESIN COMPOSITION FOR PACKAGING MATERIAL FOR PHOTOGRAPHIC PHOTOSENSITIVE MATERIAL AND PACKAGING MATERIAL

[75] Inventors: Mutsuo Akao; Koji Inoue, both of Kanagawa, Japan

[73] Assignee: Fuji Photo Film Co., Ltd., Kanagawa, Japan

[21] Appl. No.: 812,806

[22] Filed: Mar. 6, 1997

Related U.S. Application Data

[63] Continuation of Ser. No. 502,137, Jul. 13, 1995, abandoned.

[30] Foreign Application Priority Data

Jul. 13, 1994 [JP] Japan ................................. 6-161453

[51] Int. Cl.⁶ ............................. C08L 51/04; C08L 53/00
[52] U.S. Cl. ........................ 524/495; 523/215; 523/351; 524/318; 524/399; 524/400; 524/577; 524/578; 525/241; 428/35.7
[58] Field of Search ........................... 523/215; 524/351, 524/399, 400, 495, 318, 577, 578; 525/241; 428/35.7

[56] References Cited

U.S. PATENT DOCUMENTS

| | | | |
|---|---|---|---|
| 3,413,249 | 11/1968 | Luftglass | 523/351 |
| 4,788,232 | 11/1988 | Needham | 523/351 |
| 4,880,857 | 11/1989 | Mori et al. | 523/215 |
| 5,001,171 | 3/1991 | Bohm et al. | 523/215 |
| 5,036,132 | 7/1991 | Coran | 524/526 |
| 5,543,270 | 8/1996 | Akao et al. | 430/347 |

FOREIGN PATENT DOCUMENTS 1182327  7/1989  Japan ..................................... 523/351

OTHER PUBLICATIONS

West et al., *Textbook of Biochemistry*, Macmillan Co., NY, NY, 1966, pp. 126–127.

*Primary Examiner*—Andrew E. C. Merriam
*Attorney, Agent, or Firm*—Sughrue, Mion, Zinn, Macpeak & Seas, PLLC

[57] ABSTRACT

A color masterbach resin composition for a packaging material for a photographic photosensitive material which does not adversely affect photographic properties of the photographic photosensitive material, comprising a light-shielding material in a concentration thrice as much as or more that of the packaging material for a photographic photosensitive material, and a thermoplastic resin of which 50 wt. % or more is the same type as a thermoplastic resin occupying 50 wt. % or more of the total thermoplastic resin composing the packaging material for a photographic photosensitive material, production thereof, a packaging material for a photographic photosensitive material formed of a color masterbatch resin composition, and production thereof. In the color masterbatch resin composition and the packaging material for a photographic photosensitive material of the invention, light-shielding material is dispersed uniformly by employing a special resin composition, and thereby, adverse affects upon photographic hpotosensitive materials are prevented, and favorable appearance can be ensured. Moreover, fog with time, abnormal sensitivity, abrasion, pressure marks, etc. can be prevented.

6 Claims, 8 Drawing Sheets

COLOR MASTERBATCH RESIN COMPOSITION FOR PACKAGING MATERIAL FOR PHOTOGRAPHIC PHOTOSENSITIVE MATERIAL AND PACKAGING MATERIAL

This is a Continuation of application Ser. No. 08/502,137 filed Jul. 13, 1995, now abandoned.

BACKGROUND OF INVENTION

This invention relates to a color masterbatch resin composition for a packaging material for a photographic photosensitive material, production thereof, a packaging material for a photographic photosensitive material formed of a color masterbatch resin composition, and production thereof.

As the a packaging material for a photographic photosensitive material, there are a resin composition composed of 30 to 95 wt. % of EEA resin containing 7 wt. % or more of EA and 5 to 70 wt. % of carbon black (EP A 0 277598), and a resin composition composed of 5 to 90 wt. % of a modified polyolefin resin, 5 to 70 wt. % of carbon black having an oil absorption value of 50 ml/100 g or more and volatile components of 3.5% or less, and 0 to 10 wt. % of a fatty acid and/or a fatty acid metal salt (U.S. Pat. No. 5,262,471).

However, the above-mentioned conventional color masterbatch resin compositions are inferior in dispersibility of color materials including most light-shielding materials, and great agglomerates (lumps) of color material occasionally deposit on the surface of molded packaging materials for a photographic photosensitive material. The lumps cause adverse affects, such as fog with time, abnormal sensitivity, abrasion, pressure marks and fog by abrasion, upon photographic photosensitive materials packaged, and uniform coloring is difficult due to the inferior dispersibility. The deposition of lumps of color material degrades appearance of the packaging material.

In a color masterbatch process, frequency of contacts between a masterbatch resin composition and a thermoplastic resin for dilution not containing a light-shielding material is not so many. Therefore, when a color masterbatch resin composition is diluted at a high ratio, e. g. 7 times or more, by using a low grade kneading molding machine, the dispersion of a light-shielding material becomes insufficient. As a result, various troubles occur, such as uneven coloring of molded articles, jetting troubles around gates, generation of microgrits and weldlines to degrade appearance of packaging materials, delamination, decrease of physical strength or the like.

SUMMARY OF THE INVENTION

An object of the invention is to resolve the above problems and to provide a color masterbatch resin composition for a packaging material for a photographic photosensitive material which is excellent in dispersibility, capable of coloring uniformly, rare generation of microgrits, rare occurrence of die lip fouling, no adverse affects upon photographic properties, and beautiful appearance, and a method of producing the same.

Another object of the invention is to provide a packaging material for a photographic photosensitive material formed of the color masterbatch resin composition and a method of producing the same.

The present invention provides a color masterbatch resin composition for a packaging material for a photographic photosensitive material and a method of producing the same which have achieved the above object, and have the following aspects.

In an aspect of the invention, a color masterbach resin composition for a packaging material for a photographic photosensitive material which does not adversely affect photographic properties of the photographic photosensitive material, comprising a light-shielding material in a concentration thrice as much as or more that of the packaging material for a photographic photosensitive material, and a thermoplastic resin of which 50 wt. % or more is the same type as a thermoplastic resin occupying 50 wt. % or more of the total thermoplastic resin composing the packaging material for a photographic photosensitive material.

In another aspect of the invention, a color masterbach resin composition for a packaging material for a photographic photosensitive material which does not adversely affect photographic properties of the photographic photosensitive material, comprising a light-shielding material in a concentration thrice as much as or more that of the packaging-material for a photographic photosensitive material, and a thermoplastic resin of which 50 wt. % or more is the same type as a thermoplastic resin occupying less than 50 wt. % of the total thermoplastic resin composing the packaging material for a photographic photosensitive material.

In another aspect of the invention, a color masterbatch resin composition for a packaging material for a photographic photosensitive material comprising 0.5 to 80 wt. % of a black light-shielding material, 99.4 to 9.8 wt. % of a thermoplastic resin, and 0.01 to 10 wt. % in total of one or more members selected from the group consisting of partially saponified fatty acid ester metal salts, fatty acids and fatty acid compounds.

In another aspect of the invention, a color masterbatch resin composition for a packaging material for a photographic photosensitive material comprising 100 parts by weight of a resin composition consisting of 40 to 99.5 parts by weight of a polystyrene resin and/or a polyolefin resin and 0.5 to 60 parts by weight of carbon black, 0.01 to 10 parts by weight of a metal salt of a partially saponified fatty acid ester having 20 to 50 carbon atoms and/or a metal salt of a fatty acid having 15 to 50 carbon atoms, 0 to 1 part by weight of an antioxidant and 0 to 40 parts by weight of a low molecular weight polyolefin resin.

In another aspect of the invention, a color masterbatch resin composition for a packaging material for a photographic photosensitive material comprising 10 to 500 parts by weight of a thermoplastic resin inactive to polyolefin resin 100 parts by weight of a light-shielding material, and 10 to 500 parts by weight of an ester compound represented by the general formula ROOCR', wherein R is an alkyl group or a cycloalkyl group having 11 to 28 carbon atoms of, and R' is an alkyl group having 1 to 8 carbon atoms.

In another aspect of the invention, a color masterbatch resin composition for a packaging material for a photographic photosensitive material comprising 3 to 40 wt. % of a polyolefin resin, 3 to 40 wt. % of a low crystallinity resin, 5 to 60 wt. % of a light-shielding material, and 0.01 to 10 wt. % of a lubricant.

In another aspect of the invention, a color masterbatch resin composition for a packaging material for a photographic photosensitive material comprising 100 parts by weight of a polyolefin resin mixture comprising of 40 to 98 wt. % of a polyolefin resin and 2 to 60 wt. % of a modified polyolefin copolymer resin having a crystallinity of 1 to 40% produced by graft polymerization of a polyolefin resin with 0.05 to 2 wt. % of maleic anhydride, 5 to 100 parts by weight of furnace carbon black, and 0.001 to 5 parts by weight of a lubricant.

In another aspect of the invention, a color masterbatch resin composition for a packaging material for a photographic photosensitive material comprising 100 parts by weight of a polyolefin resin mixture comprising of 40 to 98 wt. % of a polystyrene resin having a rubber content of 15 wt. % or less and 2 to 60 wt. % of a modified polyolefin copolymer resin having a crystallinity of 1 to 40% produced by graft polymerization of a polyolefin resin with 0.05 to 2 wt. % of maleic anhydride, 5 to 100 parts by weight of furnace carbon black, and 0.001 to 5 parts by weight of a lubricant.

In another aspect of the invention, a method of producing a color masterbatch resin composition comprising diluting with a resin, a high concentration masterbatch resin composition comprising 1 to 80 wt. % of a light-shielding material prepared in the presence of 0.001 to 5 wt. % of an antioxidant and 0.01 to 10 wt. % of a fatty acid metal salt.

The present invention also provides a packaging material for a photographic photosensitive material formed of a color masterbatch resin composition and a method of producing the same which have achieved the above object, and have the following aspects.

In an aspect of the invention, a packaging material for a photographic photosensitive material comprising a color masterbatch resin composition of a packaging material which comprises a thermoplastic resin and a light-shielding material fo which surface has been coated with a surface-coating material dispersed into the thermoplastic resin, a resin composition for dilution, and at least a lubricant or an antistatic agent.

In an aspect of the invention, a packaging material for a photographic photosensitive material comprising a color masterbatch resin composition for a packaging material comprises 100 parts by weight of a polystyrene resin and/or an ABS resin, 0.2 to 50 parts by weight of carbon black and 0.02 to 10 parts by weight of a lubricant, and a thermoplastic resin for dilution.

In an aspect of the invention, a method of producing a packaging material for a photographic photosensitive material which comprises, mixing a color masterbatch resin composition with a thermoplastic resin for dilution in an amount twice as much as or more of the color masterbatch resin composition, keeping a hopper and a resin feed opening of an extruder under reduced pressure conditions lower than an atmospheric pressure.

In an aspect of the invention, a method of producing a packaging material for a photographic photosensitive material which comprises mixing 100 parts by weight of a color masterbatch resin composition for a packaging material with 300 parts by weight or more of a thermoplastic resin for dilution by a mixer almost uniformly, providing a line mixer without any movable part between an extruder and a mold, and supplying the mixed resin in a melted state to the mold through the line mixer.

In an aspect of the invention, a method of producing a packaging material for a photographic photosensitive material which comprises mixing pellets of a color masterbatch resin composition for a packaging material for a photographic photosensitive material with pellets of a thermoplastic resin for dilution in a predetermined ratio by an automatic weighing mixer, removing evaporable substances from the resin mixture through their evaporation by keeping a hopper and a resin feed opening of an extruder to which the mixed pellets are supplied under reduced pressure conditions lower than an atmospheric pressure, and then molding the resin mixture.

In an aspect of the invention, a method of producing a packaging material for a photographic photosensitive material which comprises mixing pellets of a color masterbatch resin composition for a packaging material for a photographic photosensitive material with pellets of a rubber-containing polystyrene resin for dilution in a predetermined ratio by a mixer almost uniformly, injecting the resin mixture into a mold of which a wall temperature of core and cavity portions is from 110° to 250° C., and taking the molded packaging material out of the mold when the wall temperature of core and cavity is less than a glass transition temperature of the rubber-containing polystyrene resin.

Figure 1:
FIGS. 1 through 9 are partial sectional views of packaging materials for a photographic photosensitive material embodying the invention, respectively.

1a . . . Light-shielding thermoplastic resin film layer (packaging material for photographic photosensitive material)
2, 2a . . . Thermoplastic resin layer
3 . . . Intermediate layer
4 . . . Adhesive layer
5 . . . Flexible sheet layer
9 . . . Metallized biaxially stretched film layer
10 . . . Metal foil
a . . . indicating to contain a light-shielding material

DETAILED DESCRIPTION OF THE INVENTION

As the resin component of the color masterbatch resin composition of the invention, polyolefin resins and polystyrene resins are preferred.

The polyolefin resins are crystalline olefin polymers of which the essential monomer is an olefin, and illustrative of the polyolefin resins are low density homopolyethyelene resins, medium density homopolyethylene resins, high density homopolyethylene resins, ethylene copolymer resins, homopolypropylene resins, propylene-α-olefin copolymer resins (illustrative of α-olefins are ethylene, butene-1, hexene-1, 4-methylpentene-1, octene-1, etc.), polybutene resins, polymethylbutene resins, polymethylpentene resins, etc.

Representative ethylene copolymer resins are ethylene-vinyl acetate copolymer (EVA) resin, ethylene-propylene copolymer resin, ethylene-1-butene copolymer resin, ethylene-butadiene copolymer resin, ethylene-vinyl chloride copolymer resin, ethylene-methylmethacrylate copolymer (EMM) resin, ethylene-methyl acrylate copolymer (EMA) resin, ethylene-ethyl acrylate copolymer (EEA) resin, ethylene-acrylonitrile copolymer resin, ethylene-acrylic acid copolymer (EAA) resin, ionomer resin (copolymer of ethylene and unsaturated acid crosslinked using metal such as zinc), ethylene-α-olefin copolymer (L-LDPE) resin, ethylene-propylene-butene-1 ternary copolymer resin, polyethylene resin elastomer, and the like.

The L-LDPE resin is called third polyethylene resin, and it is a low cost high strength resin, having the advantages of both low, medium density polyethylene resin and high density polyethylene resin, which meets the requirements, i.e. resource conservation and energy conservation, of the time. The L-LDPE resin is a copolymer of ethylene and α-olefin, and it has a linear structure having short branches. The number of carbon atoms of the α-olefin is 3 to 13. Preferable α-olefin has a number of carbon atoms of 4 to 10, and examples of the α-olefin are butene-1, pentene-1, 4-methylpentene-1, 3-methylpentene-1, hexene-1, 4,4-dimethylpentene-1, heptene-1, octene-1, nonene-1, decene-1, undecene-1, dodecene-1, etc. The density (ASTM D-1505) is usually in the degree of low, medium polyethylene resin and most of commercial resins are in the range of 0.87 to 0.97 g/cm$^3$. Melt flow rate (ASTM D-1238, Condition E) is mostly in the range of 0.1 to 80 g/10 minutes.

As the polymerization process of L-LDPE resin, there are the vapor process and the liquid slurry process using a medium, low pressure apparatus and the ion polymerization process using an apparatus for the high pressure modified method.

Examples of commercial L-LDPE resin are "G-Resin" and "TUFLIN" (UCC), "NUC Polyethylene-LL" and Moretec (Idemitsu Petrochemical), "Dowlex" (Dow chemical), "Suclear" (Dupont de Nemour, Canada), "Marlex" (Phillips), "Neozex" and "Ultzex" (Mitsui Petrochemical Industries), "Nisseki Linirex" (Nippon Petrochemicals), "Stamilex" (DSM) "Mitsubishi Polyethy-LL" (Mitsubishi Petrochemical), and the like. Very low density L-LDPE resins having a density of less than 0.910 g/cm$^3$ are also preferred, such as "NUC-FLX" (UCC) and "Excelene VL" (Sumitomo Chemical).

Preferable L-LDPE resins for film molded articles in view of physical strength, heat seal strength and inflation film moldability are copolymers of ethylene and α-olefin, of which the number of carbon atoms is 6 to 8, having a melt flow rate (MFR) of 0.8 to 10 g/10 minutes, preferably 1 to 7 g/10 minutes (ASTM D-1238, Condition E) and a density of 0.870 to 0.940 g/cm$^3$, preferably 0.890 to 0.930 g/cm$^3$ (ASTM D-1505) manufactured by the liquid slurry process or the vapor process. Preferable L-LDPE resins for injection molded articles in view of the balance between physical strength and, injection moldability are copolymers of ethylene and α-olefin, of which the number of carbon atoms is 3 to 8, having a melt flow rate (MFR) of 2 to 80 g/10 minutes, preferably 5 to 50 g/10 minutes (ASTM D-1238, Condition E) and a density of 0.890 to 0.985 g/cm$^3$, preferably 0.900 to 0.980 g/cm$^3$ (ASTM D-1505) manufactured by the liquid slurry process or the vapor process.

Representative polystyrene resins include styrene resins, ABS resins, acrylonitrile-styrene resins, AAS (ASA) resin and AES resins.

I. Styrene Resin

There are clear general purpose polystyrene (GPPS) resins which are homopolystyrene resin produced by polymerizing styrene monomer alone and high impact polystyrene (HIPS) resin which are rubber-containing polystyrene resin, i.e. homopolystyrene resin reinforced by a rubber material. Polystyrene portions of both resins are linear and amorphous. When using a Natta catalyst, isotactic polystyrene is obtained. It is opaque and thermal deformation temperature is about 200° C. Characteristics of styrene resin are specific gravity being greater than polyolefin resin but smaller than metal, tasteless, odorless, non-toxic, small hygroscopicity, excellent electrically insulating ability and radiofrequency inslating ability, good coloring and coating ability, very excellent moldability, good dimensional stability of molded articles, relatively cheap material, etc. On the other hand, disadvantages according to use are insufficient impact strength, corrosion by a part of oils and of organic solvents, insufficient heat resistance, easy combustion, insufficient weatherability, easy electrification.

Polystyrene resins are produced mostly by continuous bulk polymerization and partly by batch suspension polymerization, both are typical radical polymerization. The continuous bulk polymerization is an ideal process wherein a polymerization process, a degassing and monomer recovering process and a granulating process are combined continuously, and remarkable improvement is considered difficult.

As the rubber-containing aromatic monovinyl resin which includes rubber-containing polystyrene resin (also called high-impact polystyrene resin), there are embodiments of polymers of a rubber material and an aromatic monovinyl monomer, mixtures formed by mere blending a rubber material with an aromatic monovinyl resin, and mixtures of a polymer of a rubber material and aromatic monovinyl monomer and an aromatic monovinyl resin.

A suitable rubber material content of the rubber-containing aromatic monovinyl resin is 1 to 12 wt. %, preferably 1.5 to 10 wt. %, particularly preferably 2 to 8 wt. %, in view of the balance between physical strength required as the packaging material for a photographic photosensitive material of the invention and adverse affects upon photographic properties. The content of less than 1 wt. % results in insufficient physical strength and wear resistance, particularly in insufficient dropping strength for photographic film spools, photographic film cartridges, instant film units, camera bodies, photographic film magazines and photographic film units with a lens which are frequently used under low temperature conditions of lower than 0° C. On the other hand, the content of more than 12 wt. % results in the increase of fogging by 0.03 or more and in the partial increase of sensitivity by 20% or more to generate uneven density in a print, with time during storing a photographic photosensitive material for 3 months or more in sealed conditions. Moreover, bending elastic modulus is decreased.

The rubber material is ethylene-propylene copolymer, ethylene-propylene-nonconjugative diene ternary copolymer, isoprene copolymer, polyisobutylene, styrene-isoprene copolymer, polybutadiene, styrene-butadiene copolymer and the like. The polybutadiene may be a high cis-polybutadiene preferably having a cis 1,4-bond content of 70 mol. % or more, particularly preferably 90 mol. % or more, or a low cis-polybudddiene having a low cis content.

A suitable mean particle size of the rubber material is 0.1 to 10 μm, preferably 0.2 to 7 μm, more preferably 0.5 to 5 μm, the most preferably 0.7 to 3.5 μm. The mean particle size of less than 0.1 μm results in the decrease of impact strength, and abrasion troubles frequently occur. The mean particle size of more than 10 μm results in a great surface roughness, and tensile strength decreases. In general, when the mean particle size is small, molded articles have a high gloss and surface smoothness. However, the surface tends to be damaged, and the polymerization cost increases. On the other hand, when the mean particle size is great, reflection decreases to lower gloss. Accordingly, in the case of obtaining a high gloss molded article, resin blended with a rubber material having a mean particle size of 0.1 to 1.5 μm, preferably 0.2 to 1 μm, is used. In the case of obtaining a mat molded article with a low gloss in order to prevent reflection, resin blended with a rubber material having a mean particle size of 1.5 to 10 μm, preferably 1.7 to 7 μm, particularly preferably 2 to 5 μm, is used. By using the rubber material having the greater particle size, fogging caused by light reflection can be avoided unless embossing is provided on the surface. However, to provide embossing is preferred because fogging caused by light reflection can be prevented more completely.

The mean particle size of the rubber material is determined by slicing the rubber material particle into very thin laminas by a microtome, photographing by a transmission electron microscope, and measuring each particle size of 600 particles of the rubber material in photographs. The mean particle size is calculated by the following formula.

Mean Particle Size=$\Sigma nD^2/\Sigma nD$

In the formula, n is particle size, and D is the number of particles of the rubber material.

The mean particle size of the rubber material can be controlled by adjusting stirring conditions upon polymerization, viscosity of rubber material solution, or the like.

The aromatic monovinyl monomer includes styrene, alkylated styrenes at the nucleus, such as o-methylstyrene, p-methylstyrene, m-methylstyrene, 2,4-dimethylstyrene, ethylstyrene and p-tert-butylstyrene, halogenated styrenes at the nucleus, such as 2,4,6-tribromostyrene and 2,4,6-trichlorostyrene, α-alkyl substituted styrenes, such as α-methylstyrene and α-methyl-p-methylstyrene, and the like. In addition, methacrylate esters, acrylate esters, acrylonitrile and maleic anbydride, which are copolymerizable with a styrene monomer, are included.

Among the rubber-containing aromatic monovinyl resins, the polymer of a rubber material and an aromatic monovinyl monomer can be produced by the following polymerization methods, (A) Radical Polymerization
① Batch Bulk Polymerization
Advantages . . . Produced in a simple process.
Disadvantages . . . Difficulty in heat diffusion in a large scale production. Molecular weight distribution is broad, and moldability is inferior.
② Continuous Bulk Polymerization
Advantages . . . Quality of the product is uniform. Manufacturing cost is cheap.
Disadvantages . . . Transportation of a high viscosity reaction solution, and channeling phenomenon in a reaction tower.

③ Continuous Solution Polymerization
Advantages . . . Control of polymerization heat is easy.
Disadvantages . . . Removal of solvent is necessary. Stirring is difficult.
④ Suspension Polymerization
Advantages . . . Removal of polymerization heat is possible. Granular polymer can be obtained. Residual amount of monomer is small.
Disadvantages . . . Contamination by water and stabilizer occurs. Removal of volatile components is necessary. Drying and pelletizing are necessary.
⑤ Emulsion Polymerization
Advantages . . . Reaction rate is great. Removal of polymerization heat is possible. Continuous polymerization is possible. Polymer in latex can be obtained.
Disadvantages . . . Contamination by water and emulsifier occurs. Drying and pelletizing are necessary.
(B) Ion Polymerization
① Ion Polymerization
Advantages . . . Reaction rate is great. Control of polymerization heat is possible.
Disadvantages . . . Removal of solvent and catalyst powder are necessary. Refrigeration is necessary.

Among the above polymerization methods, the bulk polymerization and bulk-suspension two-step polymerization wherein styrene monomer is polymerized through radical reaction in the presence of rubber polymer are preferable in economical viewpoint, and the continuous bulk polymerization is particularly preferred. On the other hand, the suspension polymerization (in a batch form) is also preferable in view of a small amount of residual monomer, the excellence in heat resistance and the capability of a sharp turn.

A suitable melt flow index (MFI, ASTM D-1238, Condition G) of the rubber-containing aromatic monovinyl resin is 3 to 40 g/10 minutes, preferably 5 to 35 g/10 minutes, more preferably 7 to 30 g/10 minutes, the most preferably 10 to 25 g/10 minutes. The MFI of less than 3 g/10 minutes results in the frequent occurrence of short shot and weld lines due to the inferiority of resin fluidity and in the lengthening of molding cycle. On the other hand, the MFI of more than 40 g/10 minutes results in small physical strength, the frequent occurrence of burrs and the tendency to thermal degradation.

A suitable number average molecular weight of the rubber-containing aromatic monovinyl resin is 10,000 to 1,000,000, preferably 20,000 to 800,000, particularly preferably 50,000 to 600,000, in view of the balance between physical strength and polymerization cost and injection moldability.

A suitable bending elastic modulus (ASTM D-790) of the rubber-containing aromatic monovinyl resin is 20,000 kg/cm$^2$ or more, preferably 22,000 kg/cm$^2$ or more, more preferably 23,000 kg/cm$^2$ or more, the most preferably 25,000 kg/cm$^2$ or more. When the bending elastic modulus is less than 20,000 kg/cm$^2$, dimensional stability and complete light-shielding ability cannot be ensured due to the tendency to deformation by external force. Particularly, in the case of photographic film spools and photographic film cartridges made of resin (including K16 film and K35 film) used by loading into a camera, the deformation results in the difficulty in the loading into a camera, and photographing becomes impossible.

A suitable Vicat softening point (ASTM D-1525) of the rubber-containing aromatic monovinyl resin is 78° C. or more, preferably 82° C. or more, more preferably 85° C. or more, the most preferably 87° C. or more. When the Vicat softening point is less than 78° C. in the case of the molded articles colored black, they are softened to deform by leaving in an auto car under the sunlight for 1 hour or more, and as a result, complete light-shielding cannot be ensured.

In the case of spools, they cannot be rotated smoothly by the occurrence of deformation.

A suitable Rockwell hardness (ASTM D-785) of the rubber-containing aromatic monovinyl resin is M40 or more, preferably M45 or more, more preferably M50 or more, the most preferably M55 or more. The Rockwell hardness of less than M40 results in the occurrence of abrasion caused by the friction with a cartridge made of metal, a cap, photographic film or the like, in the increase of winding torque, in the difficulty to ensure dimensional stability, and in the occurrence of spots by the adhesion of abrasion dust on a photographic photosensitive material.

A suitable Izod impact strength (ASTM D-256) of the rubber-containing aromatic monovinyl resin is 2.0 k·cm/cm or more, preferably 2.5 kg·m/cm or more, more preferably 3.0 kg·m/cm or more, the most preferably 3.5 kg·m/cm or more. When the Izod impact strength is less than 2.0 kg·m/cm, physical strength is small. Particularly, in the case of photographic film spools, photographic film cartridges made of resin, instant film units, camera bodies and photographic film units with a lens which are frequently used under low temperature conditions of lower than 0° C. their dropping strength is insufficient, and to ensure complete light-shielding ability is difficult by cracking or breakage.

II. ABS Resin

ABS resin is a thermoplastic resin of which the principal components are acrylonitrile (A), butadiene (B) and styrene (S). AS copolymer is grafted from polybutadiene partices, and accordingly, compatibility between polybutadiene particles and AS continuous phase is excellent, and aggregation of polybutadiene particles cannot be observed. Since ABS resin is in a grafted rubber particle dispersion system similar to high impact polysyrene (HIPS) resin, viscoelasticity temperature characteristics are divided into the dispersion absorption around −80 y polybutadiene rubber and the dispersion absorption around +120 y AS copolymer. Impact strength which is the most characteristic of ABS resin may depend on the absorption of impact energy by deforming polybutadiene particles and on the absorption of impact energy by crazes generated at the interface between polybutadiene particles. The mechanism of inhibiting transmission and destroy of crazes as well as the generation of crazes may also be important in order to further raise impact strength. ABS resin is excellent in moldability, such as in injection molding, extrusion molding and vacuum molding, and also excellent in rigidity and chemical resistance. Coloring by a light-shielding material is excellent, and secondary processings, such as coating, printing, hot stamping, vacuum deposition and plating are also excellent. Blends with other resins, such as polycarbonate resin and polyvinyl chloride resin form characteristic commercial goods as ABS alloys. Only defect is inferior weatherability, and improvement therefor is investigated as to additives such as an age-resistor and resin composition.

ABS resin is produced by graft blending, bulk uspension polymerization or emulsion·continuous bulk polymerization. In the graft blending, an ABS resin having a high rubber content is prepared by reacting polybutadiene latex with acrylonitrile/styrene monomer, followed by blending an AS copolymer resin separately prepared to obtaine a prescribed ABS resin. In the bulk uspension polymerization, uncrosslinked rubber is dissolved in styrene monomer, and preliminary bulk polymerization is carried out in a rubber matrix state. When phase transition to a rubber suspension state, grafting in a suspension system is carried out to obatain the ABS resin. Since it is difficult to produce a ABS resin having a high rubber content according to this method, a way of producing the object ABS resin is to blend with an ABS resin produced by another method or AS copolymer resin. In the emulsion ontinuous bulk polymerization, an ABS latex having a high rubber content prepared by emulsion polymerization is mixed with Acrylonitrile/styrene monomer and an electrolite, and water separated is removed to obtain an ABS crumb. acrylonitrile/styrene monomer is added to the ABS crumb to make an ABS dope, and continuous bulk polymerization is carried out to obtain the ABS resin. In this method, since coagulation, washing with water and drying of ABS resin powder are not necessary, a great decrease in cost is possible.

III. Acrylonitrile-Styrene Resin

Since styrene is a representative vinyl monomer, copolymers with various monomers have been developed. Among the copolymers of styrene and other comonomers, commercialized transparent highly rigid (not reinforced by rubber) resins are acrylonitrile-styrene (AS) resin, methylmethacrylate-styrene (MS) resin and maleic anhydride-styrene resin. These styrene resins are produced, in general, by radical polymerization, and their molecular structures are of typical random copolymer resin, and are different from rubber-graft modified copolymer resin, such as high impact polystyrene resin which is a rubber-containing polystyrene resin. In the transparent copolymer resins, when the resin composition is shipped only by several percents, the transparency sharply degrades. Accordingly, how to maintain the composition destribution is an important point in the production. For example, in the case of AS resin, since azeotropic composition is of styrene monomer/acrylonitrile=75/25, commercial AS resins have mostly an AN content of 25 to 35% and a composition distribution of ±1%. Since the inner rotation of molecular chain is inhibited by the introduction of polar groups and bulky side chains by the copolymerization, the acrylonitrile-styrene resins are superior in mechanical properties, heat resistance, chemical resistance, etc. compared with general purpose homopolystyrene resin.

The acrylonitrile-styrene resin is produced by bulk polymerization or suspension polymerization due to the restriction by quality requirement and economical viewpoint. For example, AS resin is naturally possible to be produced similar to GPPS resin, but various problems accompanied by the introduction of acrylonitrile comonomer (such as, increase of polymerization reaction heat, increase of viscosity of polymerization system, composition distribution, etc.) are important. Generally speaking, bulk polymerization is disadvantageous in equipment cost, but advantageous is stable quality due to no contamination with impurities and economical advantage due to continuous polymerization.

IV. AAS (ASA) Resin and AES Resin

The fundamental structure of the AAS (ASA) resin is

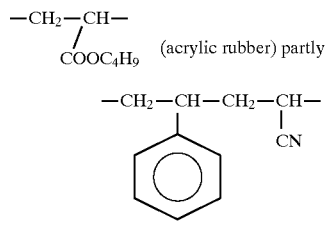

(AS copolymer). However, in the acrylic rubber, other acrylic acid esters such as ethyl acrylate is used as monomer unit in addition to n-butyl acrylate. The monomer unit ratio of styrene and acrylonitrile in the AS copolymer varies according to grades.

The fundamental structure of AES resin is composed of

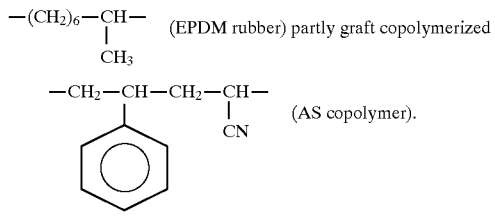

However, the monomer unit ratio of styrene and acrylonitrile in the AS copolymer varies according to grades.

The AAS (ASA) resin and AES resin are characterized by the superiority in weatherability and impact resistance, and moldability and appearance of molded articles are excellent. The excellent impact resistance is due to the dispersion of acrylic rubber particles or EPDM rubber particles which absorbs impact energy. The excellent weatherability is due to the remarkable stability of acrylic rubber and EPDM rubber against UV degradation compared with butadiene rubber in ABS resin, etc.

The AAS (ASA) resin is produced by adding several percents of a crosslinking agent or a grafting agent to n-butyl acrylate, and emulsion polymerization is carried out to form a rubber latex. Then, styrene and acrylonitrile are added to the rubber latex, and graft copolymerization is carried out. After the polymerization, subjected to salting out to obtaine resin powder. The AES resin is produced by dissolving EPDM rubber in an organic solvent, and graft copolymerization is carried out by adding styrene and acrylonirile. There is a method wherein the organic solvent is not used. After polymerization, the solvent is removed the obtain resin powder.

Taking into consideration the case of reclamation treatment as waste, degradable platic which is being developed or has already introduced in the market can be used. For example, a biodegradable polymer of "BIOPOL" (ICI), "Polycaprolactone" (UCC) or the like is utilized, or a polymer indirectly collapsed by blending a biodegradable natural or synthetic polymer as an additive, such as polyethylene blended with starch, can be utilized. In order to improve industrial waste treatment, it is also preferable to blend a recently commercialized synthetic biodegradable plastic which can be decomposed up to carbon dioxide and water by the action of microoragnisms ("Bionol", Showa Polymer, which is a special polyester resin synthesized from dicarboxylic acid and the like, a polymer alloy of modified polyvinyl alcohol having biodegradability and maize starch) in an amount of not less than 10 wt. % of the resin composition for the molded article. In the case of a multi-layer molded article, it is preferable so that the layer(s) which do not contact directly photographic photosensitive materials contain not less than 50 wt. % of the above biodegradable plastic in view of the improvement in industrial waste treatment.

Moreover, it is also possible to utilize a photodegradable polymer, such as ELCO copolymer wherein carbonyl groups are introduced into the main chain as a photosensitization group at the time of polymerization of ethylene, i.e. copolymerization of ethylene and carbon monoxide, polymers to which photodegradability is imparted by adding transition metal salt, oxidation accelerator, photosensitizer or the like to base polymer. It is also possible to combine degradable polymers, such as biodegradable polymer, photodegradable polymer and water-soluble polymer (Japanese Patent KOKAI No. 3-129341). When recycling is taken into consideration, it is preferable to form all of the packaging material for a photographic photosensitive material by the same or similar resin composition. For example, it is preferable that all of a cartridge body, a spool and a babel with print constituting a cartridge for a photographic film is made of a polystyrene resin or polypropylelen resin, and all of a spool, an upper case and a lower case of a film unit with a lens is made of a polystyrene resin or polypropylelen resin having complete light-shielding ability.

Low crystallinity thermoplastic resins can also be used. The low crystallinity thermoplastic resin is a general term of rubber-containing thermoplastic resins and modified polyolefin resins, and includes thermoplastic resin elastomers, ethylene-vinyl acetate copolymer resins (having a vinyl acetate content of 5 to 40 wt. % are preferred.), ethylene-ethyl acrylate copolymer resins (having an ethyl acrylate content of 5 to 30 wt. % are preferred.), ethylene-α-olefin copolymer resins (having an α-olefin content of 5 to 40 wt. % are preferred.), thermoplastic butadiene resins (preferred are syndiotactic 1,2-polybutadiene containing 90% or more of 1,2-bonds.), chlorinated polyethylene resin (chlorine content: 20 to 50 wt. %), and the like. The α-olefin has a number of carbon atoms of 3 to 15, preferably 3 to 8 such as propylene, butene-1, 4-methylpentene-1, hexene-1, heptene-1 and octene-1.

The acid-modified polyolefin resin is a modified resin of polyolefin resin graft-modified with unsaturated carboxylic acid compound, and includes graft-modified polyethylene resin, graft-modified polypropylene resin, and graft-modified ethylene copolymer resins, such as graft-modified ethylene-ethyl acrylate copolymer resin, graft-modified ethylene-vinyl acetate copolymer resin, graft-modified L-LDPE resin and graft-modified ethylene-methyl acrylate copolymer resin, and the like.

The unsaturated carboxylic acid compound usable as the modifier of the polyolefin resin is acrylic acid, methacrylic acid, crotonic acid, isocrotonic acid, fumaric acid, maleic acid, itaconic acid, citraconic acid, angelic acid, tetrahydrophthalic acid, sorbic acid, mesaconic acid, nudic acid (end-cis-bicyclo[2,2,1]-hepto-5-en-2,3-dicarboxylic acid), maleic anhydride, itaconic anhydride, citraconic anhydride, methyl acrylate, methyl methacrylate, ethyl methacrylate, ethyl acrylate, n-butyl acrylate, glycidyl acrylate, glycidyl methacrylate, glycidyl maleate n-butyl methacrylate, maleic acid monoethyl ester, maleic acid diethyl ester, fumaric acid monoethyl ester, fumaric acid dimethyl ester, itaconic acid diethyl ester, acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monoethylamide, fumaric acid-N,N-diethylamide, fumaric acid-N-monobutylamide, fumaric acid-N,N-dibutylamide maleimide, N-butylmaleimide, N-phenylmaleimide, malonyl chloride, monomethylmaleate, dimethylmaleate, dipropylmaleate, potassium acrylate, sodium acrylate, zinc acrylate, magnesium acrylate, calcium acrylate, sodium methacrylate, potassium methacrylate, or the like. Two or more unsaturated carboxylic acid compounds may be combined. Preferable unsaturated carboxylic acid compounds are acrylic acid, maleic acid, maleic anhydride and nudic acid, and maleic anhydride is particularly preferred. A suitable amount of the unsaturated carboxylic acid compounds is 0.01 to 20 parts by weight, preferably 0.2 to 5 parts by weight, per 100 parts by weight of the polyolefin base resin in view of securing adhesive strength.

The grafting modification method may be any known method, such as the method of reacting in a melted state disclosed in Japanese Patent KOKOKU No. 43-27421, the method of reacting in a solution state disclosed in Japanese Patent KOKOKU No. 44-15422, the method of reacting in a slurry state disclosed in Japanese Patent KOKOKU No. 43-18144 and the method of reacting in a vapor state disclosed in Japanese Patent KOKOKU No. 50-77493. Among them, the melting method using an extruder is preferred because of simple operation and inexpensiveness.

A peroxide is added in order to accelerate the reaction between the polyolefin base resin and the unsaturated carboyxlic acid. Suitable peroxides are organic peroxides such as benzoyl peroxide, lauroyl peroxide, dicumyl peroxide, α,α'-bis(t-butylperoxydiisopropyl)benzene, 2,5-dimethyl-2,5-di(t-butylperoxy)hexane, 2,5-dimethyl-2,5-di(t-butylperoxy)hexyne, di-t-butyl peroxide, cumene hydroperoxide, t-butyl-hydroperoxide, t-butylperoxylaurate, t-butylperoxybenzoate, 1,3-bis(t-butylperoxyisopropyl)benzene, di-t-butyl-diperoxyphthalate, t-butylperoxymaleic acid and isopropyl percarbonate, azo compounds such as azobisisobutyronitrile, and inorganic peroxides such as ammonium persulfate. Two or more peroxides may be combined. Particularly preferred peroxides are di-t-butylperoxide, dicumylperoxide, 2,5-dimethyl-2,5-di(t-butylperoxy)hexane, 2,5-dimethyl-2,5-di(t-butylperoxy)hexyne, 1,3-bis(t-butylperoxyisopropyl)benzene and the like, which have a decomposition temperature between 170° C. and 200° C. A suitable amount of the peroxide is 0.005 to 5 parts by weight, preferably 0.01 to 1 part by weight per 100 parts by weight of the polyolefin base resin.

There are commercial adhesive polyolefin resins, such as "N polymer" (Nippon Petrochemicals), "Admer" (Mitsui Petrochemical Industries), "ER Resin" (Showa Denko), "Novatec-AP" (Mitsubishi Chemical Industries), "Modic" (Mitsubishi Petrochemical), "NUC-Ace" (Nippon Unicar), "Ube Bond" (Ube Ind.), "Bondain" (Sumitomo Chemical), "Melcene M" (Toso), "CMPS" (Mitsui Polychemicals), etc.

Furthermore, thermoplastic resins inactive to polyolefin resin can also be used for the color masterbatch resin composition of the invention. When the thermoplastic resin inactive to polyolefin resin is selected from the compatibilizing agents described later, various excellent effects can be exhibited, such as the improvement in physical strength, the improvement in appearance and the like as well as the improvement in he dispersion of light-shielding material.

The thermoplastic resin inactive to polyolefin resin is not decomposed and does not accelerate the decomposition of polyolefin resin upon kneading with the polyolefin resin and molding with heating (extrusion, injection molding, etc.), and is not denatured nor degraded and does not induce denaturation and degradation even if coexisting for a long period. The thermoplastic resin inactive to polyolefin resin has thermoplasticity and blendability with polyolefin resin, and functions as a dispersing medium for keeping the dispersion of light-shielding material. Illustrative of the thermoplastic resins inactive to polyolefin resin are homopolyethylene resins with a variety of density, L-LDPE resins, homopolypropylene resins, propylene-α-olefin copolymer resins, EVA resins, EEA resins, EMA resin, EAA resins, ionomer resins, EMMA resins, modified polyolefin resins, various thermoplastic elastomers (ethylene based, olefin based, vinyl chloride based, ester based, amide based, etc., such as ethylene-propylene elastomer, polyisobutylene, etc.), in addition to the foregoing compatibilizing agents.

Preferred ones are homopolyethylenes with a variety of density, L-LDPE resins, EEA resins, EVA resins, homopolypropylene resins, propylene-ethylene copolymer resins, various polyolefin based elastomers and compatibilizing agents.

An ester compound having the following general formula can be used for the color masterbatch resin composition of the invention.

Provided that, in the formula, R is an alkyl group or a cycloalkyl group having a number of carbon atoms of 11 to 28, and R' is an alkayl group having a number of carbon atoms of 1 to 8.

The ester compound is quite different from the lower alcohol esters of higher fatty acid wellknown as lubricant or spreading agents.

The ester compounds of which the number of carbon atoms of R is 10 or less have a high volatility, and the improvement in compatible affinity of medium polymer is small. Examples of such an ester compound are octyl acetate and octyl propionate. On the other hand, the ester compounds of which the number of carbon atoms of 29 or more are poor in practical value. In any event, R may be branched or ringed.

The ester compounds of which the number of carbon atoms of R' is 9 or more are inferior in compatibility with polyolefin resin, and the improvement in the dispersion and affinity of medium polymer is small. Examples of such an ester compound are bytyl stearate and stearyl stearate.

Preferable ester compounds are esters of one or more of alcohols of lauryl alcohol, myristyl alcohol, cetyl alcohol, stearyl alcohol, eicosyl alcohol, ceryl alcohol, triacontyl alcohol, isostearyl alcohol, butylcyclohexyl alcohol, etc., and one or more of fatty acids of acetic acid, propionic acid, caproic acid, etc.

The light-shielding material may be either organic material or inorganic material. In order to avoid adverse affects upon photographic properties of photographic photosensitive material, strongly acidic or strongly alkaline materials are unsuitable. Light-shielding materials which do not affect adversely photographic properties and have excellent dispersibility can easily be selected from commercial goods by the teaching of references or several simple tests. The light-shielding material is added in order to ensure light-shielding and so on .

Representative examples of the light-shielding material are shown below.

Inorganic Compounds:

Oxides . . . silica, diatomaceous earth, alumina, titanium oxide, calcium oxide, iron oxide, zinc oxide, magnesium oxide, antimony oxide, barium ferrite, strontium ferrite, berylium oxide, pumiice, pumice balloon, alumina fiber, etc.

Hydroxides . . . aluminum hydroxides, magnesium hydroxides, calcium hydroxide, basic magnesium carbonate, etc.

Carbonates . . . calcium carbonate (ground, soft, colloid), magnesium carbonate, dolomite, dawsonite, etc.

Sulfates, sulfites . . . calcium sulfate, barium sulfate, ammonium sulfate, calcium sulfite, etc.

Silicates . . . talc, clay, mica, asbestos, glass fiber, glass baloon, glass bead, calcium silicate, montmorillonite, bentonite, zeolite, etc.

Carbons . . . carbon black, graphite, carbon fiber, carbon hollow bead, etc.

Others . . . iron powder, copper powder, lead powder, tin powder, stainless steel powder, peaorl pigment, aluminum powder, molybdenum sulfide, boron fiber, silicon carbide fiber, brass fiber, potassium titanate, lead titanate zirconate, zinc borate, barium metaborate, calcium borate, sodium borate, aluminum paste, etc. Preferable packaging materials for a photographic photosensitive material contain one or more light-shielding materials selected from the above inorganic materials because of ensuring heat resistance, good photographic properties and complete light-shielding. In view of the above points, preferable inorganic light-shielding materials have a specific gravity of 1.5 to 8, preferably 1.6 to 7, a hardness (Mohs' hardness) of 1.0 to 9.5, preferably 1.1 to 8, a pH of 4.5 to 9.5, preferably 5 to 9, a heat resistance of 100° C. or more, preferably 105° C. or more, a mean particle size of 10 $\mu$m or less, preferably 9 $\mu$m or less, a refractive index of 1.50 m or more, preferably 1.55 or more, a DBP oil absorption value of 10 ml/100 g or more. Particularly preferable inorganic light-shielding materials have a specific gravity of 1.7 to 6, a hardness of 1.2 to 7, a pH of 5.5 to 8.5, a heat resistance of 110° C. a mean particle size of 8 $\mu$m or less, a refractive index of 1.60 or more, a DBP oil absorption value of 15 ml/100 g or more. Measuring methods of respective properties are described later.

Organic Compounds: wood flour such as pine, oak and sawdust, husk fiber such as almond, peanut and chaff, colored various fibers such as cotton, jute, paper piece, cellophane piece, nylon fiber, polypropylene fiber, various starch (containing modified starch, surface-treated starch, etc.), aromatic polyamide fiber, organic pigments generally used for coloring plastics, such as azo pigments, phthalocyanine pigments, quinacridone pigments, anthraquinone pigments, dioxazine pigments, perillene pigments, indigo pigments and indanthrene pigments, etc.

Preferable ones are black pigments, such as carbon black, graphite, iron black, phthalocyanine, aniline black, titanium oxide nitride, CuO—Mn$_2$O$_3$—Fe$_2$O$_3$ pigments and CuO—Cr$_2$O$_3$—Fe$_2$O$_5$ pigments, and blue pigments, such as Ultramarine Blue, Prussian Blue and Cobalt Blue, which are light-absorptive light-shielding materials, because of having a great light-shielding ability and of functioning so as to prevent photographic photosensitive material from fogging caused by light-piping or irregular reflection.

Among these light-shielding materials, various carbon blacks are preferable, because dispersibility of carbon black is improved by adsorbing lubricant, surfactant, etc. on the surface or carbon black, and thereby, bleeding out of lubricant, etc. can be decreased.

Carbon blacks are divided into gas black, furnace black, channel black, anthracene black, acetylene black, Ketjen carbon black, thermal black, lamp black, vegetable black and animal black according to their origin. Among these, furnace carbon black is preferable in terms of light-shielding character, low cost improvement in physical strength and no adverse affect upon photographic properties. On the other hand, since acetylene black concluctive carbon black, graphite and Ketschen carbon black which is modified by-produced carbon black have an antistatic character, they are also preferable, although they are expensive. They may be blended with furnace black in order to improve its character. Although, there are various blending method, such as dry coloring, liquid coloring, paste color, masterbatch pellets, compound color pellets and granular color pellets, the masterbatch method using masterbatch pellets is preferred in view of cost and less contamination of the working place. Japanese Patent KOKOKU No. 40-26196 discloses a method of making a masterbatch of polymercarbon black by dissolving the polymer in an organic solvent and dispersing the carbon black into the solution. Japanese Patent KOKOKU No. 43-10362 discloses another method of making a masterbatch by dispersing the carbon black into polyethylene.

Particularly preferable carbon blacks for the packaging material for a photographic photosensitive material have a pH (JIS K 6221) of 6 to 9, preferably pH 6.5 to 8.5, particularly preferably 6 to 8, a mean particle size (measured by an electron microscope) of 10 to 120 m$\mu$, preferably 12 to 70 m$\mu$, particularly preferably 15 to 50 m$\mu$, and among them, the most preferred is furnace carbon black having a volatile component content (JIS K 6221) of not more than 3.5%, preferably no more than 1.5%, and a DBP oil absorption value (JIS K 6221) of not less than 50 ml/100 g, preferably more than 70 mg/100 g, in view of no occurrence of fogging, rare occurrence of photosensitivity deviation and great light-shielding ability. Moreover, when it is blended in polyolefin resin injection molded articles, polystyrene resin injection molded articles, L-LDPE resin films, etc. lumps of carbon black and fish eyes rarely occur, and pinholes also rarely occur in injection molded articles and light-shielding films. Channel black is not preferred because of containing mostly volatile components of more than 5.0%, of being acidic having mostly a pH 3, and of frequently inducing fogging and abnormal sensitivity on photographic photosensitive materials, as well as of being expensive. Lamp black has mostly pH 5.0 or less, and adversely affects photographic properties. Accordingly, even when it is necessary to use, a material capable of reacting with or adsorbing substances which adversely affect photographic properties must be used together with the carbon blacks, or usable carbon black must be selected by a preliminary test. Concerning sufur components, unless the content is 0.9% or less, preferably 0.7% or less, measured by ASTM D-1619-60, photographic properties are occasionally adversely affected, such as the occurrence of fogging or abnormal sensitivity. Since free sulfur components especially adversely affect photographic properties of photographic photosensitive materials, it is preferable to select carbon blacks having a free sulfur content of 0.1% or less, preferably 0.05% or less.

In order to improve wear resistance and reinforcing ability, preferred carbon blacks have an iodine adsorption amount (JIS K 6221) of 20 mg/g or more, preferably 30 mg/g or more, particularly preferably 35 mg/g or more, and a dibutylphthalate (DBP) oil absorption value (JIS K 6221) of 50 ml/100 g or more, preferably 60 ml/100 g or more, particularly 70 ml/100 g or more.

When taking photographic properties, dispersibility into thermoplastic resin, cost, light-shielding ability, prevention of resin deterioration, prevention of physical strength degradation of resin, stable availability, etc. into consideration, the most suitable carbon black is furnace carbon black having a pit 6 to 9, a mean particle size of 12 to 70 m$\mu$ and the above iodime adsorption amount and DBP oil absorpation value. As conductive carbon blacks, particularly preferred is furnace carbon black which does not affect adversely photographic properties, is dispersible almost uniformly into the thermoplastic resin composition blended with the organic compounds having a number average molecular weight of less than 10,000, can render the surface specific resistance 1 the logarithmic mean value of the surface specific resistances at 10 parts of a sheet to be tested cut into a square having a side of 12 cm measured by using a digital multimeter (Takeda Riken) wherein the distance between both electiodes was adjusted to 1 cm) to $10^{12} \Omega$ or less, and has a mean particle size of 12 to 50 m$\mu$, a DBP oil absorption value of 100 ml/100 g or more and a pH of 6–8. Particularly preferable one is furnace carbon black having a DBP oil absorption value of 250 ml/100 g or more in view of imparting high conductivity by blending a small amount.

As the preferable light-shielding materials, inorganic pigments having a refractive index measured by the Larsen oil immersion method of not less than 1.50, preferably not less than 1.55, various metal powders, metal flakes, metal pastes, metal fibers, and carbon fiber are next to carbon black. Representative examples are titanium oxide of the rutile type (2.76), titanium oxide of the anatase type (2.52), silicon carbide (2.67), zinc oxide (2.37), antimony oxide (2.35), lead white (2.09), zinc white (2.02), lithopone (1.84), zircon (1.80), corundum (1.77), spinel (1.73), apatite (1.64), baryta powder (1.64), calcium carbonate (1.58), talc (1.58), calcium sulfate (1.56), silicic anhydride (1.55), silica powder (1.54), magnesium hydroxide (1.54), basic magnesium carbonate (1.52), magnesite (1.62), dolomite (1.59), alumina (1.50), and the like. The number in parenthesis indicates refractive index. Particularly preferable light-shielding materials have a refractive index of not less than 1.56, more preferably not less than 1.60. On the other hand, since calcium silicate (1.46), diatomaceous earth (1.45), hydrous silicate (1.44) and the like have a refractive index of less than 1.50, they are unsuitable, because of a small light-shielding ability. As a result it is necessary to blend in quantity, and thereby, lump generation increases.

Recently, X-ray checking apparatus is used for baggage inspection at air port. When a high sensitivity photographic film having a sensitivity of ISO photographic speed 400 or more is passed through the X-ray checking appartus, fogging is liable to occur on the photographic film by X-ray. To blend a light-shielding material having a specific gravity of not less than 3.1, preferably not less than 3.4 particularly preferably not less then 4.0, is preferable for preventing the occurrence of fogging by the X-ray.

The light-shielding material having X-ray-shielding ability as well as light-shielding ability has a specific gravity of not less than 3.1, preferably not less than 3.4, particularly preferably not less than 4.0, and the form may be any form, such as pigment, powder, flake, whisker or fiber. Examples of the light-shielding material having X-ray-shielding ability are silicon carbide, barium sulfate, molybdenum disulfide) lead oxide (lead white), iron oxide, titanium oxide, magnesium oxide, barium titanate, copper powder, iron powder, brass powder, nickel powder, silver powder, lead powder, steel powder, zinc powder, tungsten whisker, silicon nitride whisker, copper whisker, iron whisker, nickel whisker, chrominum whisker, stainless steel powder and whisker, magnesite, aptite, spinel, corundum, zircon, antimony trioxide, barium carbonate, zinc white, chromium oxide, tin powder, their mixtures, etc.

Particularly preferable ones are zircon, corundum, barium sulfate, barium chloride, barium titanate, lead powder, lead oxide, zinc powder, zinc white, tin powder, stainless steel powder, stainless steel whisker, iron oxide, tungsten whisker, nickel whisker, etc. Preferable light-shielding materials have a refractive index of not less than 1.50 and a specific gravity of not less than 3.1, more preferably a refractive index of not less than 1.56 and a specific gravity of not less than 3.4.

A suitable content of the X-ray-shielding light-shielding material is 5 to 80 wt. %, preferably 10 to 70 wt. %, particularly preferably 20 to 60 wt. %, in view of the balance among X-ray-shielding ability, moldability, physical strength, appearance, cost, etc. In order not to affect adversely photographic photosensitive materials and not to degrade film moldability, the X-ray-shielding light-shielding material is used preferably in a state that weight loss on drying at 100° C. for 5 hours is not more than 2 wt. %, preferably not more than 1 wt. %, particularly preferably not more than 0.5 wt. %. The X-ray-shielding light-shielding material can be made in this state by using at least one of washing, refining, heating, evacuating and surface-treating to remove volatile component of 100° C. or less or to prevent adsorption of moisture, etc. As oil-absoptive inorganic pigment having a function of adsorbing lubricant, antioxidant and organic nucleating agent, which are liable to bleed out, deodorant, agent imparting fragrance, oxygen scavenger, etc.; there are zinc white (52), asbestine (50), clay (51), titanium dioxide (56), kaolin (60), talc (60), carbon black (not less than 60), activated carbon and the like. The number in parenthesis indicates oil absorption value (ml/g) measured by JIS K 6221, A method.

The metal powder includes metal paste, and examples are aluminum powder, aluminum paste, copper powder, stainless steel powder, iron powder, nickel powder, brass powder, silver powder, tin powder, zinc powder, steel powder and the like.

As the aluminum powder including aluminum paste, aluminum powder of which the surface is coated with a surface-coating material and aluminum paste from which low volatile components are removed and then kneaded with a thermoplastic resin are preferred. The paste of aluminum powder is produced by adding a liquid medium such as mineral spirits or and a small amount of a higher fatty acid such as stearic acid or oleic acid to form a paste at the production of aluminum powder according to a known method such as using a ball mill, a stamp mill or an atomizer. The aluminum paste is kneaded together with a thermoplastic resin, such as an aromatic monovinyl resin, such as polystyrene resin or rubber-containing polystyrene resin, a polyolefin thermoplastic resin, such as various polypropylene resins, various polyethylene resins, acid-modified resins, EVA resin, EEA resin or EAA resin, dispersing agent, such as low molecular weight polyolefin resin, paraffin wax, tackifier and metallic soap (fatty acid metal salt), etc. under heat, and volatile components mainly mineral spirits and white spirits are removed by heat, a vacuum pump or the like up to the low volatile component of not more than 3%, preferably not more than 1%, particulalry preferably not more than 0.5%. This product is preferably used as aluminum paste compound resin or aluminum paste masterbatch resin. The aluminum paste masterbatch resin is preferable because noxious odors and adverse influences upon the photographic photosensitive materials are eliminated. In order to eliminate noxious odor and adverse influences upon the photographic photosensitive materials, the content of mineral spirits should be less than 0.1 wt. %. When the aluminum paste content of the molded article is made 2 wt. 5 by using a masterbatch resin containing 40 wt. % of aluminum paste and 1.0 wt. % of mineral spirits, one part by weight of the masterbatch resin is blended with 19 parts by weight of the natural resin for dilution (thermoplastic resin not containing a light-shielding material). Since part of the mineral spirits evaporates during molding, the final content of the mineral spirits is less than 0.05 wt. %. The aluminum powder includes microflakes produced from aluminum foil which is crushed by a ball mill or a stamp mill, in addition to typical aluminum powder manufactured by atomization, dropping on a rotary disc or evaporation from melted aluminum. Since aluminum powder simplex is unstable and inferior in uniform dispersion into thermoplastic resin, it is atabilized by a known treatment.

A suitable content of the light-shielding material is 0.01 to 30 wt. % in total in order to ensure qualities as goods, photographic properties, moldability and economical view point of the packaging material for a photographic photosensitive material of the invention, but it varies according to light-shielding ability. In the case of carbon black and aluminum powder excellent in light-shielding ability, a suitable content is 0.05 to 20 wt. %, preferably 0.1 to 10 wt. %, particularly preferably 0.2 to 7 wt. % in total. When the content is less than 0.01 wt. %, unless the thickness of the packaging material is increased greatly, fogging occurs due to insufficient light-shielding ability. The thickening of the packaging material results in the retardation of molding speed due to lengthening cooling time, and the cost increases by the increase of resin. When the content exceeds 30 wt. %, dispersibility becomes worse to generate microgrits (lumps) which induces pressure marks and abrasion on photographic photosensitive materials. Moreover, a water content of the packaging material increases by the increase of water adsorbed on carbon black, and adversely affects photographic properties, such as fogging, sensitivity deviation and abnormal coloring, upon photographic photosensitive materials. Furthermore, moldability of the packaging material is degraded to induce the occurrence of foaming, silver streaks, pinholes short shot or the like, appearance is degraded, and physical strength decreases.

It is preferable to coat the surface of a light-shielding material, preferably carbon black, aluminum powder (including aluminum paste), inorganic pigment having a refractive index of not less than 1.50, inorganic pigment having a specific gravity of not less than 3.4 or inorganic pigment having an oil absorption value of not less than 50 ml/100 g, by surface-coating material, in order to improve the dispersibility into resin and the resin fluidity, to prevent the generation of volatile substances harmful to photographic properties, to decrease hygroscopicity, to prevent fouling of die lip, and the like. The surface-coating materials are also useful as the surface-coating material of inorganic or organic nucleating agent, hydrous double salt of hydrotalcite, etc. described later.

Representative coatings by the surface-coating material are as follows:
(1) Using a coupling agent:
  Coated with a coupling agent containing azidosilane compound (disclosed in Japanese Patent KOKAI No. 62-32125).
  Coated with a silane coupling agent.
  Coated with a titanate coupling agent.
(2) Coated by depositing silica followed by depositing alumina.
(3) Coated with higher fatty acid metal salt, such as zinc stearate, magnesium stearate or calcium stearate.
(4) Coated with surfactant, such as sodium stearate, potassium searate or hydroxyethylene dodecylamine.
(5) Coated by reacting barium sulfide aqueous solution with sulfuric acid aqueous solution in the presence of an excess amount of barium ion to produce barium sulfate having a mean particle size of 0.1 to 2.5 μm, adding alkaline silicic acid solution thereto to deposit barium silicate on the surface of the barium sulfate, and depositing hydrous silica on the surface of the barium sulfate produced by the decomposition of the barium silicated by adding mineral acid to the slurry.
(6) Coated with a composition consisting of one or more of the oxides selected from hydrated oxides of metal, such as titanium, aluminum, cerium, zinc, iron, cobalt or silicon, and oxides of metal, such as titanium, aluminum, cerium, zinc, iron, cobalt or silicon.
(7) Coated with a polymer having one or more reactive groups selected from aziridine group, oxiazoling group and N-hydroxyalkylamide group.
(8) Coated with polyoxyalkylene amine compound.
(9) Coated with cerium, iron, selected acid amion and alumina.
(10) Coated with alkoxy titanium derivative having α-hydroxycarboxylic acid residue as substituent.
(11) Coated with polytetrafluoroethylene.
(12) Coated with polydimethylsiloxane or modified silicone.
(13) Coated with phosphate ester compound.
(14) Coated with divalent to tetravalent alcohol.
(15) Coated with olefin wax, such as polyethylene wax or polypropylene wax.
(16) Coated with hydrous aluminum oxide.
(17) Coated with silica of zinc compound consisting of zinc chloride, zinc hydroxide, zinc oxide, zinc sulfate, zinc nitrate, zinc acetate or zinc citrate of a combination thereof.
(18) Coated with polyhydroxy saturated hydrocarbon.

Preferable coatings are the above (1), (3), (12), (14), (15), (16) and organic chelate compounds, various antistatic agents, lubricants, dripproofing agents and surfactants, because of rare adverse effect upon photographic photosensitive materials, such as fogging, and being excellent in the improvement in the dispersibility of light-shielding material, in the decrease of lump generation, and in the improvement in resin fluidity.

Particularly suitable coatings are esters of an aliphatic monocarboxylic acid and a monovalent aliphatic alcohol in an amount of 0.001 to 2 wt. %. The ester decreases motor load, and improves the dispersibility of light-shielding material and moldability to render the appearance of molded articles beautiful. The ester is composed of an aliphatic monocarboxylic acid having a number of carbon atoms of 20 to 40, preferably 25 to 35 and a monovalentaliphatic alcohol having a number of carbon atoms of 20 to 40, preferably 25 to 35. Examples of the aliphatic monocarboxylic acid are montanic acid, melissic acid, cerotic acid, lacceric acid and the like. Examples of the monovalent aliphatic alcohol are montyl alcohol, melissyl alcohol, lacceryl alcohol, ceryl alcohol and the like. The above esters are also very excellent as the surface-coating material of the light-shielding material because of the improvement in the fluidity of thermoplastic resin and uniform blendability. Moreover, when they are used for coating the surface of inorganic or organic nucleating agent as the dispersing agent, various excellent effects are exercised, such as the prevention of dusting and bleeding out, and the improvement in dispersibility and resin fluidity and the like.

A suitable coating amount is 0.001 to 10 wt. %, preferably 0.005 to 5 wt. %, more preferably 0.01 to 3 wt. %, particularly preferably 0.05 to 1.5 wt. %, against light-shielding material, such as carbon black or aluminum powder. When the coating amount is less than 0.001 wt. %, the coating effect is insufficient. When the coating amount exceeds 10 wt. %, bleeding out with time increases. Moreover, screw slip occurs that results in a variation of the amount of ejected resin.

A suitable total sulfur content (ASTM D-1619) of the above composite light-shielding material is not more than 1 %, preferably not more than 0.8%, particularly preferably not more than 0.5%. A suitable free sulfur component is not more than 150 ppm, preferably not more than 50 ppm, particularly preferably not more than 30 ppm, and an ash content according to ASTM D-1506 is not more than 0.5%, preferably not more than 0.4%, particularly preferably not more than 0.3%. A suitable aldehyde compound content is not more than 0.2%, preferably not more than 0.1%, particularly preferably not more than 0.05%, in order to avoid adverse effects upon photographic properties. Since cyanides also adversely affect photographic properties of photographic photosensitive materials, it is suitable that the hydrogen cyanide quantity determined by the 4-pyridine-carboxylic acid pyrazolone absorption photometry is not more than 20 ppm, preferably not more than 10 ppm, particularly preferably not more than 5 ppm, converted to the weight of light-shielding material.

A suitable blending amount of the light-shielding material in a packaging material for a photographic photosensitive material is 0.01 to 30 wt. %, preferably 0.05 to 20 wt. %, more preferably 0.1 to 10 wt. %, particularly preferably 0.2 to 7 wt. %. When a material colored by light, such as vitamin E and photosensitive resins is combined, combination effects greatly exhibit which are improvement in light-shielding ability by the increase of color density, and accordingly, the blending amount of light-shielding material can be decreased resulting in less degradation of physical strength, improvement in melt salability, moldability and resin fluidity. Particularly, in the case of a thickness of 100 μm or less, a suitable blending amount of light-shielding material is 0.1 to 20 wt. %, preferably 0.5 to 15 wt. %, more preferably 0.7 to 10 wt. %, particularly preferably 1 to 7 wt. %, in view of ensuring light-shielding and physical strength.

The light-shielding material may be a mixture of carbon black and a graphite interlaminar compound. The graphite interlaminar compound is an interlaminar compound of graphite and a compound capable of imparting a high conductivity to the graphite, such as an alkali metal, e.g. potassium, arsenic pentafluoride, antimony pentafluoride or nitric acid, and the compound capable of imparting a high conductivity to the graphite particles wides a space between layers of praphite having a crystalline structutre and is dispersed thereinto. The graphite interlaminar compound can be obtained relatively easily by contacting graphite particles with gas of the compound capable of imparting a high conductivity. A suitable mean particle size of the graphite interlaminar compound is 5 μm or less, preferably 3.5 μm or less, more preferably 2 μm or less, most preferably 1 μm or less. The mean particle size of carbon black is necessary to be smaller than the mean particle size of the graphite interlaminar compound, and is preferably ⅓ or less or the mean particle size of the graphite interlaminar compound, more preferably ⅕ or less, furthermore preferably ¹⁄₁₀ or less, most preferably ¹⁄₂₀ or less.

The blending ratio of the graphite interlaminar compound to carbon black in the above mixture is 1:9 to 9:1, preferably 2:8 to 8:2, more preferably 3:7 to 8:2, most preferably 5:5 to 7:3. By using the special light-shielding thermoplastic resin film is made excellent in complete light-shielding material and antistic ability without affecting adversely photographic properties, and it can be put to practical use as a packaging material for a photographic photosensitive material even in a single layer film.

It is preferable to blend a lubricant in order to improve packaging ability, peeling resistance, antistatic ability, and moldability of thermoplastic resin film.

Examples of the lubricant are as follows:
(I) Fatty acid amide lubricants
(1) Saturated fatty acid amide lubricants:
   ① Behenic acid amide lubricants: "DIAMIDE KN" (Nippon Kasei Chemical Co., Ltd.)
   ② Stearic acid amide lubricants: "ARMIDE HT" (Lion), "ALFLOW S-10" (Nippon Oil and Fats Co., Ltd.), "FATTY AMIDE S" (Kao Corp.), "NEWTRON 2" (Nippon Fine Chemical Co., Ltd.), "DIAMID 200" and "DIAMIDE AP-1" (Nippon Kasei Chemical Co., Ltd.), "AMIDE S" and "AMIDE T" (Nitto Kagaku K.K.), etc.
(2) Hydroxystearic acid amide lubricants:
   ① Palmitic acid amide lubricants: "NEWTRON S-18" (Nippon Fine Chemical Co., Ltd.), "AMIDE P" (Nitto Kagaku K.K.), etc.
   ② Lauric acid amide lubricants: "AMIDE C" (Lion Akzo Co., Ltd.), "DIAMID" (Nippon Kasei Chemical Co., Ltd.), etc.
(3) Unsaturated fatty acid amide lubricants:
   ① Erucic acid amide lubricants: "ALFLOW P-10" (Nippon Oil and Fats Co., Ltd.), "NEWTRON-S" (Nippon Fine Chemical Co., Ltd.), "LUBROL" (I.C.I.), "DIAMID L-200" (Nippon Kasei Chemical Co., Ltd.), etc.
   ② Oleic acid amide lubricants: "ARMOSLIP-CP" (Lion Akzo Co., Ltd.), "NEWTRON" and "NEWTRON E-18" (Nippon Fine Chemical Co., Ltd.), "AMIDE-O" (Nitto Kagaku K.K.),"DIAMID O-200" and "DIAMID G-200" (Nippon Kasei Chemical Co., Ltd.), "ALFLOW E-10" (Nippon Oil and Fats Co., Ltd), "FATTY AMIDE O" (Kao Corp.), etc.
(4) Bisfatty acid amide lubricants
   ① Methylenebisbehenic acid amide lubricants: "DIAMID NK BIS" (Nippon Kasei Chemical Co., Ltd.), etc.
   ② Methylenebisstearic acid amide lubricants: "DIAMID 200 BIS" (Nippon Kasei Chemical Co., Ltd.), "ARMOWAX" (Lion Akzo Co., Ltd.), "BISAMIDE" (Nitto Kagaku K.K.), etc.
   ③ Methylenebisoleic acid amide lubricants: "LUBRON 0" (Nippon Kasei Chemical Co, Ltd.), etc.
   ④ Ethylenebisstearic acid amide lubricants: "ARMOSLLP EBS" (Lion Akzo Co., Ltd.), etc.
   ⑤ Hexamethylenebisstearic acid amide lubricants: "AMIDE 65" (Kawaken Fine Chemicals Co., Ltd.), etc.
   ⑥ Hexamethylenebisoleic acid amide lubricants: "AMIDE 60" (kawaken Fine Chemicals Co., Ltd.), etc.
(II) Nonionic surfactant lubricants: "ELECTROSTRIPPER TS-2", "ELECTROSTRIPPER TS-33" (Kao Corp.), etc.
(III) Hydrocarbon lubricants: liquid paraffin, natural paraffin, microwax, synthetic paraffin, polyethylene wax (number average molecular weight less than 10,000, preferably less than 8,000, particularly preferably less than 6,000), polypropylene wax (number average molecular weight less than 10,000, preferably less than 8,000, particularly preferably less than 6,000), chlorinated hydrocarbon, fluorocarbon, etc.
(IV) Fatty acid lubricants: higher fatty acids preferably more than $C_{12}$, such as caproic acid stearic acid, oleic acid, erucic acid and palmitic acid, hydroxy fatty acids, etc.
(V) Ester lubricants: fatty acid lower alcohol esters, fatty acid polyol esters, fatty acid polyglycol esters, fatty acid fatty alcohol esters, etc.
(VI) Alcohol lubricants: polyols, polyglycols, polyglycerols, etc.
(VII) Fatty acid metal salts (metal soap): compounds of metal, such as Li, Na, Mg, Ca, Sr, Ba, Zn, Cd, Al, Sn, Pb with a fatty acid having a number of carbon atoms of 6 to 50 preferably 10 to 40, particularly preferably 10 to 30, such as caproic acid, caprylic acid, capric acid, myristic acid, lauric acid, stearic acid, succinic acid, behenic acid, linolic acid, stearyl lactic acid, lactic acid, phthalic acid, benzoic acid, hydroxystearic acid, montanic acid, ricinoleic acid, naphthenic acid, oleic acid, palmitic acid or erucic acid. Preferred are magnesium stearate, calcium stearate, zinc stearate, magnesium oleate, etc.

(VIII) Partially saponified montanate esters:

(IX) Silicone lubricants dimethylpolysiloxanes and modified versions thereof in various grades (Shin-Etsu Silicone, Toray Silicone).

Particularly, various silicone oils are preferable, because of not only exhibiting the improvement in resin fluidity, lubricity, etc. but also, when they are used together with a light-shielding material, exhibiting unexpected effects, such as the improvement in the dispersibility of light-shielding material and the increase of haze (ASTM D-1003) by rendering resin turbid resulting in the improvement in coloring power and light-shielding ability.

The above silicone oil has preferably a viscosity at ordinary temperature (25° C.) of 50 to 100,000 centistokes, preferably 1,000 to 60,000 centistokes, more preferably 5,000 to 30,000. When the viscosity is less than 50 centistokes, the silone oil adversely affects photographic properties, and bleeding out becomes a problem. When the viscosity exceeds 100,000 centistokes, difficulty occurs in handling because of too viscous.

Examples of silicones and modified versions thereof are those having modified siloxane bonds such as polydimethylsiloxane and polymethylphenylsiloxane, olefin-modified silicone, amide-modified silicone, amino-modified silicone, dimethylpolysiloxane, amino-modified silicone, carboxyl-modified silicone, $\alpha$-mehylstyrene-modified silicone, polyether-modified silicone modified with polyethylene glycol, polypropylene glycol, etc., olefin/polyether-modified silicone, epoxy-modified silicone, alcohol-modified silicone, etc. Among them, olefin-modified silicone, polyether-modified silicone dimethylpolysiloxane, amide-modified silicone, carboxyl-modified silicone, and olefin/polyether-modified silicone are preferable for packaging materials for a photographic photosensitive material because of rare adverse affects upon photographic properties and a great lubricating effects. The silicone oil improves friction coefficient of a molding material, such as a resin sheet in heated conditions, decreases sliding resistance generated during hot plate sealing in an automatic packaging machine an prevents the occurrence of wrinkling. Thereby, the silicone oil provides a resin film which has a beautiful appearance, a high sealability, and adhesion to an article to be packaged without sagging. It also prevents the degradation of gloss by sliding to form a fine sealed portion. In the case of using silicone oil, friction coefficient at high temperature can be not more than 1.4 for sliding heat seal. In the case of a packaging material for a photographic photosensitive material composed of injection molded articles, since light-shielding ability is increased, blending amount of light-shielding material can be decreased. As a result, various properties, such as physical strength, injection moldability and appearance can be improved. Particularly, when a rubber-modified polystyrene resin modified with a synthetic resin (high impact polystyrene resin according to JIS) is blended with silicone oil, blending effects, such as the improvement in lubricity, wear resistance, light-shielding ability, etc., are greatly exhibited.

The above effects can further be increased by further blending a natural or synthetic wax, a caster oil ethylene oxide adduct, oxidative synthetic wax, a higher fatty acid alkyl ester, a polyol alkylate ethylene oxide adduct, a fatty amide, a bis fatty amide a fatty acid metal salt, etc., having a softening point of 70° to 140° C., together with the above silicone oil. A suitable blending amount of the above wax, etc. is 10 to 200 parts, preferably 30 to 180 parts, particularly preferably 50 to 150 parts per 100 parts of the silicone oil. By combining the above wax, etc., stick slip at 100° C. or less which is liable to occur in the case of using merely silicone oil can be prevented, slip from various metal guide plates of an automatic packaging machine is rendered smooth, and packaging troubles can be prevented. Furthermore, slip under pressurized high temperature conditions can also be improved.

The compatibilizing agent is a material capable of compatibilizing two or more thermoplastic resins, when a novel property or performance not existing in a single thermoplastic resin is exhibited by combining same kind thermoplastic resins which are different in properties, two or more kinds thermoplastic resins, recycled thermoplastic resin and virgin resin (thermoplastic resins not used in a form of a molded article), masterbatch thermoplastic resin containing light-shielding material in a high concentration and thermoploastic resin for dilution (the resin blended with the masterbatch resin) or combinations thereof.

A suitable blending amount of the compatibilizing agent is 1 to 70 wt. %, preferably 2 to 50 wt. %, more preferably 3.5 to 40 wt. %, particularly preferably 5 to 35 wt. %, in view of not degrading physical strength while achieving the above objects and in a practical viewpoint. When the content is less than 1 wt. %, the improvement in physical strength, appearance and compatibility cannot be achieved effectively. When the content exceeds 70 wt. %, the compatibilizing agent is possible to affect adversely photographic photosensitive materials, and moreover, raises the manufacturing cost.

As the compatibilizing agent, there are non-reactive compatibilizing agents and reactive compatibilizing agents.

Examples of non-reactive compatibilizing agent:
    Styrene-ethylene-butadienen block copolymer resin
    Polyethylene-polystyrene graft copolymer resin
    Polyethylene-polymethyl methacrylate graft copolymer resin
    Polyethylene-polymethyl methacrylate block copolymer resin
    Ethylene-propylene-diene copolymer resin
    Ethylene-propylene copolymer resin
    Polystyrene-low density homopolyethylene graft copolymer resin
    Polystyrene-high density homopolyethylene graft copolymer resin
    Hydrogenatedstyrene-butadiene copolymer resin
    Styrene-ethylene/butadiene-styrene copolymer resin
    Styrene-butadiene-styrene copolymer resin
    Chlorinated polyethylene resin
    Polypropylene-polyamide graft copolymer resin
    Polypropylene-ethylene-propylene-diene copolymer resin
    Polystyrene-polyethyl acrylate graft copolymer resin
    Polystyrene-polybutadiene graft copolymer resin
    Polystyrene-polymethyl methacrylate block copolymer resin etc.

Examples of reactive compatibilizing agent:
    Maleic anhydride-induced ethylene-propylene copolymer resin
    Maleic anhydride-induced styrene graft copolymer resin
    Maleic anhydride-induced styrene-butadiene-styrene copolymer resin
    Maleic anhydride-induced styrene-ethylene-butadiene-styrene copolymer resin
    Ethylene-glycidyl methacrylate copolymer resin
    Ethylene-glycidyl methacrylate-styrene graft copolymer resin Ethylene-glycidyl methacrylate-methyl methacrylate graft copolymer resin Maleic anhydride-grafted polypropylene copolymer resin, etc.

Representative examples of a plasticizer usable for the invention are described below.

(1) Phthalic acid plasticizer dibutyl phthalate, diheptyl phthalate, dioctyl phthalate, diisodecyl phthalate, butyl lauryl phthalate, ditridecyl phthalate, butyl benzyl phthalate, butyl phthalyl butyl glycolate, etc.

(2) Phosphoric acid plasticizer tricresyl phosphate, trioctyl phosphate, etc.

(3) Fatty acid plasticizer tri-n-butyl citrate, dioctyl adpate, dioctyl azelate, dioctyl sebacate, methyl acetyl ricinoleate, etc.

(4) Epoxy plasticizer alkyl epoxy stearate, 4,5-epoxytetrahydrodiisodecyl phthalate, etc.

(5) Other plasticizer chlorinated paraffin, polyester, sucrose octacetate, etc .

A suitable blending amount of the plasticizer is 0.01 to 10 wt. %, preferably 0.05 to 7 wt. %, particularly preferably 0.1 to 5 wt. %. When the blending amount is less than 0.01 wt. %, the blending effects of the improvement in the uniform dispersibility of light-shielding material and in the blocking adhesion is insufficient. When the blending amount exceeds 10 wt. %, screw slip occurs in an extruder resulting in the variation of ejected resin amount.

Antistatic agent applicable to the invention includes:
Nonionic Antistatic Agent:
Alkylamine derivatives:

Polyoxyethylene alkyl amine, tertiary amine e.g. laurylamine, N,N-bis(2-hydroxyethyl cocoamine, N-hydroxyhexadecyl-di-ethanolamine, N-hydroxyoctadecyl di-ethanolamine, etc.
Fatty acid amide derivatives:

Oxalic acid-N,N'-distearylamide butyl ester, polyoxyethylene alkyl amide, etc.
Ethers:

Polyoxyethylene alkyl ether, $RO(CH_2CH_2)_nH$ polyoxyethylene alkyl phenyl ether, etc.
Polyol esters:

Glycerine fatty acid esters (mono, di or tri-glyceride of stearic acid, hydroxystearic acid, etc.), sorbitan fatty acid esters, 1-hydroxyethyl-2-dodecylglyoxazoline, etc.
Anionic Antistatic Agent:
Sulfonates:

Alkyl sulfonate ($RSO_3Na$), alkylbenzene sulfonate, alkyl sulfate ($ROSO_3Na$), alkyl aryl sulfate, etc.
Phosphate esters:

Alkyl phosphate, etc.
Cationic Antistatic Agent:
Cationic amides:

Quaternary ammonium salts:

Quaternary ammonium chloride, quaternary ammonium sulfate, quaternary ammonium nitrate, e.g. stearamide propyl-dimethyl-β-hydroxyethyl ammonium nitrate, etc.
Ampholytic Antistatic Agent:
Alkyl betaines:
Imidaxolines:
Alkyl imidazolines:
Metal salts:

$(RNR'CH_2CH_2CH_2NCH_2COO)_2$ Mg $\{R \geqq C, R'=H$ or $(CH_2)_m$ COO—,$\}$etc.
Alkyl alanines:
Conductive resin:

Polyvinylbenzyl cation, polyacrylic acid cation, etc.

Various known antistatic agents can be used in the invention by selecting type, adjusting blending amount or combining other additive(s) so as not to affect adversely photographic properties of photographic photosensitive materials. For example, they can be selected from various antistatic agents disclosed on pages 776 to 778 of "Plastic Date Handbook" (published by Kogyo Chosa Kai, those disclosed on pages 123 to 151 of "Plastic Data Collection" (published by The Chemical Daily Co., Ltd., those disclosed in "Taidenboshizai-Kobunshi no Hyomen Kaishitsu (Antistatic Agent-Surface Modification of Polymers), Zohoban (Enlarged Supplement)" (published by Hana Shobo on Mar. 25, 1972).

Among them, nonionic antistatic agents are particularly preferred, because adverse affects upon photographic properties and human body are small, and static marks can be prevented remarkably.

A suitable blending amount of the antistatic agent is 0.01 to 10 wt. %, preferably 0.05 to 7 wt. %, particularly preferably 0.1 to 5 wt. %. When the blending amount is less than 0.01 wt. %, the blending effects are insufficient. When the blending amount exceeds 10 wt. % slip between molten resin and a screw of an extruder is liable to occur resulting in the variation of ejected resin amount. Moreover, greasiness and bleeding out tend to occur with time.

A dripproofing agent may be blended. The dripproofing agent includes diglycerine monostearate ester, polyglycerine monopalmitate ester, sorbitan monolaurate ester, sorbitan monoerucate, polyoxyethylene sorbitan fatty acid ester, stearic acid monoglyceride, palmitic acid monoglyceride, oleic acid monoglyceride, lauric acid monoglyceride, polyoxyethylene nonylphenyl ether, sorbitan sesquipalmitate, diglycerine sesquioleate, sorbitol fatty acid ester, sorbitol fatty acid dibasic acid ester, diglycerine fatty acid dibasic acid ester, glycerine fatty acid dibasic acid ester, sorbitan fatty acid dibasic acid ester, sorbitan palmitate, sorbitan stearate, sorbitan palmitate propylene oxide 3 moles adduct, sorbitan palmitate propylene oxide 2 moles adduct, sorbitol stearate, sorbitol stearate ethylene oxide 3 moles adduct, diglycerine palmitate, glycerine palmitate, glycerine palmitate ethylene oxide 2 moles adduct, etc.

The dripproofing agent functions also to prevent adhesion of dew and to inhibit deposition into white powder of additives liable to bleed out, such as lubricant and antioxidant. Preferable dripproofing agents have a contact angle with water of 45 degrees or less, more preferably 35 degrees or less. Besides two or more of water-absorptive material(s), hygroscopic material(s) and dripproofing agent(s) may be combined.

A suitable blending amount of the dripproofing agent is 0.01 to 5 wt. %, preferably 0.05 to 3.5 wt. %, particularly preferably 0.1 to 2.5 wt. %. When the blending amount is less than 0.01 wt. %, fog resistance is insufficient. Moreover, to inhibit deposition into white powder of additives liable to bleed out, such as lubricant and antioxidant is insufficient. When the blending amount exceeds 5 wt. %, the effect increased by increasing the blending amount is little. Bleeding out onto the surface of the molded article withtime increases resulting in the degradation of quality, such as greasiness and adhesion of dust. When the dust adheres to a photographic film, uneven developing rate trouble occurs.

It is preferable to provide molded articles containing the dripproofing agent with a surface activation treatment, such as corona discharge, ozone treatment, plasma treatment, etc. because of exhibiting antifog action and dripproof action more effectively.

The organic nucleating agent usable in the invention includes carboxilic acids, dicarboxylic acids, their salts and anhydrides, salts and esters of aromatic sulfonic acids, aromatic phosphinic acids, aromatic phosphonic acids, aromatic carboxylic acids and their aluminum salts, metal salts of aromatic phosphoric acids, alkyl alcohols having a number of carbon atoms of 8 to 30, condensation products of a polyhydric alcohol and an aldehyde, and alkylamines. Examples are aluminum p-t-butylbenzoate, 1,3-benzylidenesorbitol, 1·3,2·4-dibenzylidensorbitol, the di-substituted benzylidene-sorbitol represented by the following formula;

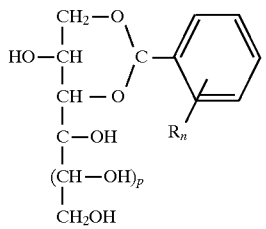 (A)

In the formula, $R_1$ and $R_2$ indicate an alkyl group or an alkoxy group having a number of carbon atoms of 1 to 8 or a halogen, and m and n are 0 to 3 and $m+n \geq 1$.

metal salts, such as calcium salt and magnesium salt, of stearyl lactic acid, the compounds, such as N-(2-hydroxyethyl)-stearylamine, represented by the following formula;

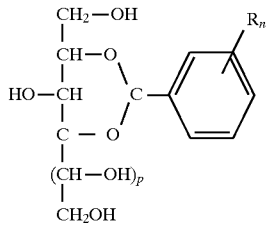 (B)

In the formula, $R_3$ indicates an alkyl group having a number of carbon atoms of 8 to 30, and k and l are 0 to 10 and $k+l \geq 1$.

metal salts, such as lithium salt, sodium salt, potassium salt, calcium salt and magnesium salt, of 1,2-dihydroxystearic acid, alkyl alcohols, such as stearyl alcohol and lauryl alcohol, sodium benzoate, benzoic acid, and sebacic acid.

Among the organic nucleating agents, sorbitol compounds are preferable. Examples of the sorbitol compound are as follows:
di-(o-methylbenzylidene) sorbitol
o-methylbenzylidene-p-methylbenzylidene sorbitol
di-(m-methylbenzylidene) sorbitol
m-methylbenzylidene-o-methylbenzlidene sorbitol
di-(p-methylbenzylidene)sorbitol
m-methylbenzylidene-p-methylbenzylidene sorbitol
1·3-heptanylidenesorbitol
1·3,2·4-diheptanylidenesorbitol
1·3,2·4-di(3-nonyl-3-pentenylidene)sorbitol
1·3-cyclohexanecarbylidenesorbitol
1·3,2·4-dicyclohexanecarbylidenesorbitol
1·3,2·4-di (p-methylcyclohexanecarbylidene )sorbitol
Aromatic hydrocarbon groups and derivatives thereof
1·3-benzylidenesorbitol
1·3,2·4-dibenzylidene-D-sorbitol
1·3,2·4-di(m-methylbenzylidene)sorbitol
1·3,2·4-di(p-methylbenzylidene)sorbitol
1·3,2·4-di(p-hexylbenzylidene)sorbitol
1·3,2·4-di(1-naphthalenecarbylidene)sorbitol
1·3,2·4-di(phenylaceylidene)sorbitol
1·3·2·4-di(methylbenzylidene)sorbitol
1·3·2·4-di(ethylbenzylidene)sorbitol
1·3·2·4-di(propylbenzyledene )sorbitol
1·3·2·4-di(methoxybenzylidene)sorbitol
1·3·2·4-di(ethoxybenzylidene)sorbitol
1·3·2·4-di(p-methylbenzylidene)sorbitol
1·3·2·4-di(p-chlorobenzylidene)sorbitol
1·3·2·4-di(p-methoxydenzylidene)sorbitol
1·3·2·4-di(alkyldenzylidene)sorbitol
1·3·2·4-di (methylbenzylidene)sorbitol aluminum benzoate, etc.

The nucleating agent is not limited to the above compounds, and any known nucleating agent may be employed. Moreover, two or more nucleating agents may be used simultaneously.

Preferable nucleating agents are organic nucleating agent of dibenzylidenesorbitol compounds, and the di-substituted benzylidenesorbitol compositions described below are particularly preferable for the polyolefin resins, preferably homopolypropylene resins, propylene-α-olefin block copolymer resins, propylene-α-olefin random copolymer resins, homopolyethylene resins having a density of not less than 0.910 g/cm$^3$ and ethylene-α-olefin copolymer resins having a density of not less than 0.870 g/cm$^3$, which belong to the crystalline resin, in view of the improvement in Young's modulus, physical strength, rigidity hardness, wear resistance, dimensional accuracy, crystallization rate and molding speed, the decrease of molding troubles, and the improvement in foreign odor and blending out which are the defects of conventional organic nucleating agent.

The di-substituted benzylidenesorbitol composition contains solid powder of the dibenzylidenesorbitol derivative represented by the following general formula and the following higher fatty acid as the essential components, and the surface of the solid powder of the dibenzylidenesorb itol derivative is coated with the higher fatty acid.

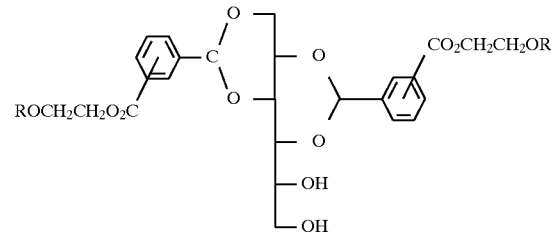

In the formula, R and R' independently represent an atom or a group selected from chlorine atom, methyl group and ethyl group, preferably chlorine atom or methyl group.

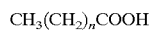

In the formula, n represents a number of 14 to 30, preferably 18 to 27, particularly preferably 20 to 25.

Preferable dibenzylidenesorbitol derivatives of the above general formula are 1·3,2·4-di(p-methylbenzylidene) sorbitol, 1·3,2·4-di(p-ethylbenzylidene)sorbitol, 1·3-p-methylbenyilidene-2·4-p-chlorobenzylidenesorbitol, 1·3-p-methylbenzylidene-2·4-p-ethylbenzylidenesorbitol, 1·3-p-chlorobenzylidene-2·4-p-methylbenzylidensorbitol and the like. Particularly preferable dibenzylidenesorbitol derivatives are 1·3,2·4-di(p-methylbenzylidene)sorbitol, 1·3-p-methylbenzylidene-2·4-p-chlorobenzylidene sorbitol and 1·3-p-chlorobenzylidene-2·4-p-methylbenzylidenesorbitol.

Preferable higher fatty acids are behenic acid, stearic acid and palmitic acid. Behenic acid is the most preferable, and stearic acid is in the second place.

The particle size of the solid powder of the dibenzylidene sorbitol derivative is not particularly limited, but a particle size distribution of 30 to 100 mesh is preferred.

Preferable organic nucleating agent composition contains 95 to 50 parts by weight, preferably 90 to 50 parts by weight, of the dibenzylidenesorbitol derivative and 5 to 50 parts by weight, preferably 10 to 50 parts by weight, of at least one of the higher fatty acid and/or a higher fatty acid compound (fatty acid metal salts, fatty acid amides, etc.) and/or a plasticizer so that the total of both components is 100 parts by weight.

The di-substituted dibenzylidenesorbitol can be prepared by adding the solid powder of the dibenzylidenesorbitol derivative to an aqueous emulsion containing at least one of the higher fatty acid and/or the higher fatty acid compound and/or the plasticizer in the above ratio, stirring to form a coating layer of at least one of the higher fatty acid and/or the higher fatty acid compound and/or the plasticizer on the surface of the solid powder of the dibenzylidenesorbitol derivative, filtering out the dibezylidenesorbitol derivative powder coated with at least one of the higher fatty acid and/or the higher fatty acid compound and/or the plasticizer, washing followed by drying. The above aqueous emulsion of at least of the higher fatty acid and/or the higher fatty acid compound and/or the plasticizer is prepared by dispersing an organic solvent solution of at least one of the higher fatty acid and/or the higher fatty acid compound and/or the plasticizer in a concentration of 5 to 50 wt. %, preferably 10 to 50 wt. % into water together with a small amount, such as 1 to 10 parts by weight, preferably 2 to 5 parts by weight, of surfactant. The presence of at least one of the higher fatty acid and/or the higher fatty acid compound and/or the plasticizer coating formed on the surface of the solid powder of the dibenzylidenesorbitol derivative can be confirmed by coloring the coating using a dye and then observing. In addition, it is also preferable to coat the surface of the organic nucleating agent by the surface coating material for the light-shielding material described later, in view of the improvement in dispersibility, etc.

The polyolefin resin, to which the preferable organic nucleating agent composition is blended as an additive in order to improve physical strength and to decrease bleeding out and odor, includes homopolymers and copolymers of aliphatic monoolefin having a number of carbon atoms of 2 to 6, such as polypropylene resins including powder of the dibenzylidenesorbitol derivative, filtering out the dibezylidenesorbitol derivative powder coated with at least one of the higher fatty acid and/or the higher fatty acid compound and/or the plasticizer, washing followed by drying. The above aqueous emulsion of at least of the higher fatty acid and/or the higher fatty acid compound and/or the plasticizer is prepared by dispersing an organic solvent solution of at least one of the higher fatty acid and/or the higher fatty acid compound and/or the plasticizer in a concentration of 5 to 50 wt. %, preferably 10 to 50 wt. % into water together with a small amount, such as 1 to 10 parts by weight, preferably 2 to 5 parts by weight, of surfactant. The presence of at least one of the higher fatty acid and/or the higher fatty acid compound and/or the plasticizer coating formed on the surface of the solid powder of the dibenzylidenesorbitol derivative can be confirmed by coloring the coating using a dye and then observing. In addition, it is also preferable to coat the surface of the organic nucleating agent by the surface coating material for the light-shielding material described later, in view of the improvement in dispersibility, etc.

The polyolefin resin, to which the preferable organic nucleating agent composition is blended as an additive in order to improve physical strength and to decrease bleeding out and odor, includes homopolymers and copolymers of aliphatic monoolefin having a number of carbon atoms of 2 to 6, such as polypropylene resins including homopolypropylene resins and propylene-α-olefin copolymer resins polyethylene resins including low density homopolyethylene resins, high density homopolyethylene resins, linear polyethylene (ethylene-α-olefin copolymer) reins and ethylene-propylene copolymer resins and the like, having a number average molecular weight of about 10,000 to 600,000 preferably 11,000 to 500,000, more preferably 12,000 to 400,000, particularly preferably 13,000 to 300,000. Particularly, crystalline polyolefin resins having a high crystallinity are preferable, because blending effects of the organic nucleating agent are effectively exhibited. A suitable crystallinity is 50% or more, preferably 70% or more, more preferably 80% or more, most preferably 90% or more. A suitable molecular weight distribution (weight average molecular weight/number average molecular weight) of the polyolefin resin is 1.5 to 20, preferably 2 to 15, more preferably 2.5 to 12, most preferably 3 to 10, in view of the balance between to ensure physical strength and to ensure moldability. It was found that the blending effect of the organic nucleating agent having a less molecular weight distribution is exhibited more effective. The molecular weight distribution is determined by the molecular weight measured by the GPC method. When the molecular weight distribution is less than 1.5, physical strength is very excellent, and in the case of injection-molded articles, dimensional accuracy is excellent. However, moldability is degraded, and polymerization is not easy. When the molecular weight distribution exceeds 20, matters opposite to the above occurs.

A suitable blending amount of the di-substituted benzylidenesorbitol composition is 0.005 to 5 parts by weight, preferably 0.01 to 3 parts by weight of the di-benzylidenesorbitol derivative coated with at least one of the higher fatty acid and/or the higher fatty acid compound and/or the plasticizer per 100 parts by weight of the polyolefin resin.

The di-substituted benzylidenesorbitol composition-can be blended into the polyolefin resin having a crystallinity of 70% or more and a molecular weight distribution of 2 to 15, preferably a crystallinity of 80% or more and a molecular weight distribution of 2.5 to 12 which exhibits a great blending effect by an arbitrary known blending means, and the blend prepared in a high concentration can be used as a masterbatch resin.

In the di-substituted benzylidenesorbitol composition, it is important that the surface of the solid particles of the dibenzylidenesorbitol derivative is coated with at least one of the higher fatty acid, and/or the higher fatty acid compound and/or the plasticizer and the aforementioned effects cannot be obtained by mere blending of the dibenzylidene sorbitol derivative and the higher fatty acid.

Moreover, in order to obtain the aforementioned effects, a heat history of no less than 180° C., preferably not less than 190° C., particularly preferably not less than 200° C. is necessary. The heat history is sufficient by once. For example, the polyolefin resin composition is blended with 0.01 to 2 wt. % of the above di-substituted benzylidenesorbitol composition, and pelletized with heating than 190° C. particularly preferably not less than 200° C. The pellets are used for molding a light-shielding polyolefin resin film or the like. Even when the molding resin temperature is less than 180° C., the aforementioned effects are obtained. However, by rendering the molding resin temperature also not less than 180° C. i.e. twice heat history of not less than 180° C.), the molded thermoplastic resin film is very excellent in physical properties and rigidity, and has high surface gloss and rare occurrence of appearance troubles, such as wrinkling and streaks. In the case of injection-molded articles, similarly, the injection-molded article is excellent in physical strength, rigidity, wear resistance, gloss, hardness, dimensional stability, injection moldability, etc. When no coloring material is blended, the injection-molded article is excellent in transparency.

In order to exhibit the blending effects of the nucleating agent, preferable thermoplastic resins to which the nucleating agent is blended are polypropylene resins and polyethylene resins having a molecular weight distribution (weight average molecular weight/number average molecular weight) of 1.5 to 12, preferably 2 to 10, particularly preferably 2.5 to 8.

The di-substituted benzylidenesorbitol composition exhibits various advantages compared with conventional organic nucleating agent, such as not degrading various properties,such as physical strength, bleeding out and rigidity, but occasionally improving the above properties, being excellent in odorless propertiy, resistance to appearance troubles, such as wrinkling and streaks, the improvement in film moldability, film forming speed, and in the case of injection-molded articles, the decrease of molding troubles such as gate remainders, by blending the polyolefin resin composition. That is, packaging materials for a photographic photosensitive material excellent in physical strength, rigidity, rare bleeding out, odorless property, film moldability injection moldability, dimensional accuracy, and wear resistance etc. can be provided by blending the polyolefin resin composition of the invention with the di-substituted benzylidenesorbitol composition.

Although the reason why the di-substituted benzylidenesorbitol composition exhibits the above excellent effects is not clear, it can be considered that benzaldehyde, which is a raw material of conventional dibenzylidenesorbitol, and benzaldehyde derivatives such a p-substituted benzaldehyde which are raw materials of the dibenzylidene sorbitol derivative of the invention, have odor, and a trace amount thereof unavoidably-remains in dibenzylidenesorbitol or its derivative after purification to cause foreign odor of clear or light-shielding polyolefin resin, and that a small amount of dibenzylidenesorbitol or its derivative is decomposed during molding the clear or light-shielding injection-molded article or the clear or light-shielding thermoplastic resin film to cause foreign odor.

By satisfying the requirement of using the solid particles of the dibenzylidenesorbitol derivative of the aforementioned formula and coating them with the higher fatty acid of the aforementioned formula, the disubstituted benzylidenesorbitol composition exhibits the effect of sharply decreasing the foreign odor of the injection-molded thermoplastic resin articles and the thermoplastic resin film, etc. of the invention and the effect of improving the aforementioned various properties, such as rigidity, hardness, dimensional accuracy, wear resistance and physical strength.

Various organic nucleating agent may be used as a single material or combined with inorganic nucleating agent or with one or more other organic nucleating agent. The surface of organic and/or inorganic nucleating agent may be coated with various lubricant, such as fatty acid, fatty acid compound or silicone, coupling agent, plasticizer, dispersing agent such as surfactant, wetting agent or the like.

The inorganic nucleating agent usable in the invention includes clays, such as talc, clay, mica, montmorillonite and bentonite, inorganic salts, such as calcium silicate, magnesium silicate, calcium sulfate, barium sulfate, lithium carbonate, sodium carbonate, sodium hydrogen carbonate, potassium hydrogen carbonate, calcium carbonate, magnesium carbonate, lithium hydroxide, sodium hydroxide, potassium hydroxide, calcium hydroxide, magnesium hydroxide and barium hydroxide, metal oxides, such as sodium oxide, calcium oxide, magnesium oxide, alumina, titanium oxide, iron oxide and zinc oxide.

A suitable blending amount of the inorganic nucleating agent is 0.01 to 5 wt. % preferably 0.03 to 3.5 wt. %, more preferably 0.06 to 2 wt. %, most preferably 0.1 to 1 wt. %. When the blending amount is less than 0.01 wt. %, the improvement in rigidity, heat resistance and hardness is insufficient. On the other hand, when the blending amount exceeds 5 wt. %, the improvement in rigidity, etc. by the excess amount is small.

Examples of the antioxidant applicable to the invention are as follows:

Phenolic Antioxidants:

6-t-butyl-3-methylphenol derivatives, 2,6-di-t-butylphenol, 2,6-di-t-butyl-p-ethylphenol, 2,6-di-t-butyl-p-cresol (BHT), 2,2'-methylenebis-(4-ethyl-6-t-butylphenol), 2,2-methylenebis-(4-methyl-6-t-butylphenol), 4,4'-butylidenebis(6-t-butyl-m-cresol), 4,4'-thiobis(6-t-butyl-m-cresol), 4,4-dihydroxydiphenylcyclohexane, alkyl group-induced bisphenol, styrene group-induced phenol, 2,6-di-t butyl-4-methylphenol, n-octadecyl-3-(3,5'-di-t-butyl-4'-hydroxyphenyl)propionate, 2,2,'-methylenebis(4 methyl-6-t-butylphenol), 4,4'-butylidenebis(3-methyl-6-t-butylphenol), stearyl-β-(3,5-di-4-butyl-4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis[methylene-3-(3',5'-di-t-butyl-4'-hydroxyphenyl)propionate]methane, etc.

Ketone-Amine Condensate Antioxidants:

6-ethoxy-2,2,4-trimethyl-1,2-dihydroquinoline, polymers of 2,2,4-trimethyl-1,2-dihydroquinoline, trimethyldihydroquinoline derivatives, etc.

Arylamine Antioxidants:

Phenyl-α-naphthylamine, N-phenyl-β-naphthylamine, N-phenyl-N'-isopropyl-p-phenylenediamine, N,N'-diphenyl-p-phenylenediamine, N,N'-di-β-naphthyl-p-phenylenediamine, N-(3'-hydroxybutylidene)-1-naphthylamine, etc.

Imidazole Antioxidants:

2-mercaptobenzomidazole, zinc salt of 2-mercaptobenzomidazole, 2-mercaptomethylbenzoimidazole, etc.

Phosphite Antioxidants:

Alkyl—induced arylphosphite, diphenylisodecylphosphite, socium phosphite salt of tris(nonylphenyl)phosphite, trinonylphenylphosphite, triphenylphosphite, etc.

Thiourea Antioxidants:

Thiourea derivatives, 1,3-bis (dimethylaminopropyl)-2-thiourea, etc.

Other Antioxidants:

Those useful for air oxidation, such as dilauryl thiodipropionate, metal deactivators, etc.

Among the above antioxidants, phenolic antioxidants and phosphite antioxidants are preferable, and for example, each antioxidants are incorporated in an amount of 0.001 to 0.5 wt. %, and as the sum of both antioxidants becomes 0.002 to 1 wt. %, in view of no adverse affect upon photographic properties of photographic photosensitive materials and of no adverse affect upon moldability.

Moreover, among the phenolic antioxidants, those having a molecular weight of 350 or more are preferable because of small bleeding, resistance to the high temperature of molding, small fuming and rare adverse affects upon photographic properties of photographic photosensitive materials, and examples are various hindered phenolic antioxidants, such as tetrakis (methylene-3-(3,5-di-t-butyl-4-hydroxyphenyl)propionate) methane, 1,3,5-tris-(2-butyl-4-hydroxy-5-di-t-butyl)butane, etc.

Particularly preferable antioxidants are hindered phenolic antioxidants because of rare adverse affect upon photographic properties of photographic photosensitive materials. The hindered phenolic antioxidants are 1,3,5-trimethyl-2,4, 6-tris (3,5-di-tert-butyl-4-hydroxybenzyl) benzene, tetrakis (methylene(3,5-di-tert-butyl-4-hydroxy-hydrocinnamate) methane), octadecyl-3,5-di-tert-butyl-4-hydroxy-hydrocinnamate, 2,2',2'-tris (3,5-di-tert-butyl-4-hydroxyphenyl)propionyloxy ethylisocyanulate, 1,3,5-tris (4-tert-butyl-3-hydroxy-2,6-di-methylbenzyl) isocyanulate, tetrakis (2,4-di-tert-butylphenyl)-4,4'-biphenylene diphosphite ester, tetrakis[methylene-3-(3,5-di-tert-butyl-4-hydroxyphenyl)propionate]methane, 4,4'-triobis-(6-tert-butyl-o-cresol), 2,2'-thiobis-(6-tert-butyl-4-methylphenol), tris-(2-methyl-4-hydroxy-5-tert-butylphenyl)butane, 2,2'-methylene-bis-(4-methyl-6-tert-butylphenol), 4,4'-methylene-bis-(2,6-di-tert-butylphenol), 4,4'-butylidenebis-(3-methyl-6-tert-butylphenol), 2,6-di-tert-butyl-4-methylphenol, 4-hydroxymethyl-2,6-di-tert-butylphenol, 2,6-di-tert-4-n-butylphenol, 2,6-bis(2'-hydroxy-3'-tert-butyl-5'-methylbenzyl)-4-methylphenol, 4,4'-methylene-bis-(6-tert-butyl-o-cresol), 4,4'-butylidene-bis-(6-tert-butyl-m-cresol, 3·9-bis {1·1-dimethyl-2-(β-(3-t-butyl-4-hydrox-5-methylphenyl) propionyloxy)ethyl} 2,4·8,10-tetraoxospiro [5,5]undecane, and the like. Preferable antioxidants have a melting point of 100° C. or more, particularly preferably 120° C. or more, in view of small bleeding out, small thermal decomposition, and small adverse affect upon photographic photosensitive materials. Moreover, it is effective to combine a phosphorous-containing antioxidant with the hindered phenolic antioxidant. To combine a phosphorous-containing antioxidant and a hydrotalcite compound with the hindered phenolic antioxidant is particularly preferable for packaging materials for a photographic photosensitive material, because of obtaining excellent photographic properties, of no rusting a molding machine, and of preventing the decrease of physical strength caused by thermal degradation of thermoplastic resin and the generation of coloring troables and lumps (agglomerates of foreign material) caused by resin yellowing.

Preferable antioxidants are phenolic antioxidants, and particularly effective antioxidants are BHT, low volatile high molecular weight penolic antioxidants ("Irganox 1010", "Irganox 1076", trade names of Ciba-Geigy A.G., "Ionox 330", trade name of Shell, "Good-Rite 3114" trade name of Goodrich, "Topanol CA", trade name of I.C.I., etc.), dilaurylthiodipropionate, distearylthiodipropionate, dialkylphosphate, etc. Two or more antioxidants may be combined.

Furthermore, oxidation inhibition is synergistically exercised by combining carbon black or the like, and particularly exercised by combining a phenolic antioxidant, a phosphorus-containing antioxidant and carbon black.

Besides, other antioxidants usable in the invention can be selected from those disclosed in "Plastic Data Handbook" (published by Kyogyo Chosa Kai), pages 794–799, "Plastic Additives Data Collection" (published by The Chemical Dail Co., Ltd.), pages 327–329, "Plastic Age Encyclopedia, Advance Editions 1986" (published by Plastic Age), pages 211–212, etc.

As the combination of two or more antioxidants, there are those selected from combinations of an alkyl substituted monophenol antioxidant and/or an alkyl substituted polyphenol antioxidant and/or an organic phosphite compound antioxidant and/or an organic phosphite ester antioxidant, such as combinations of a hindered phenolic antioxidant and a pentaerythritol phosphite compound antioxidant, combinations of a hindered phenolic antioxidant and a diorganic pentaerythritol diphosphite compound antioxidant, combinations of a hindered phenolic antioxidant and a phosphite ester antioxidant, etc.

A suitable blending amount of antioxidant is 0.001 to 5 wt. %, preferably 0.005 to 3 wt. %, more preferably 0.01 to 1.5 wt. %, most preferably 0.02 to 1 wt. %. When the content is less than 0.001 wt. %, the prevention of thermal degradation and coloring of resin is insufficient. As a result, decomposition or crosslinking occurs during molding at a high temperature resulting in the variation of resin fluidity and in the generation of aldehydes and lumps which adversely affect photographic properties. When the content exceeds 5 wt. %, the antioxidants adversely photographic properties of photographic photosensitive materials even in the case of phenolic antioxidant (it is necessary to select antioxidants strictly.)

The color masterbatch resin composition for a packaging material for a photographic photosensitive material may contain at least one of a radical scavenger, the aforementioned fatty acid metal salt (metallic soap), a hydrous double salt compound and an antioxidant synergist, in order to enhance the prevention of thermal degradation of resin, in addition to the antioxidant. By incorporating at least one of radical scavenger, the fatty acid metal salt, hydrous double salt compound and antioxidant sypergist, thermal degradation and thermal decomposition of resins and low molecular weight additives are inhibited, and remarkable variation of resin fluidity and generation of lumps can be prevented. Furthermore, generation of thermal decomposition products (aldhydes, etc.) which adversely affect photographic photosensitive materials is prevented, and catalyst residues are rendered harmless by neutralization.

A suitable content of each of the above additives is 0.001 to 10 wt. %., preferably 0.005 to 5 wt. %, more preferably 0.01 to 3 wt. %. Taking cost, photographic properties, appearance, etc. into consideration, the most preferable content is 0.05 to 1.5 wt. %. When the content is less than 0.001 wt. %, the blending effect is insufficient. When the content exceeds 10 wt. %, various troubles occur, such as generation of lumps, appearance degradation, decrease of physical strength, degradation of photographic properties (occurrence of fogging, spot trouble, abnormal sensitivity, etc.) produce a great quantity of alcohols, aldehydes, acids and the like, and they react with each other to produce polymer. In order to prevent oxidation of hydrocarbon, it is necessary to intercept the above chain reaction, and antioxidant is used for that purpose. Besides, it is also preferable to add the following radical scavenger.

As the radical scavenger suitable for the invention, there are 1,1-diphenyl-2-picrylhydrazyl, 1·3·5-triphenyl-ferudazyl, 2·2,6·6-tetramethyl-4-piperidone-1-oxyl, N-(3-N-oxyanilino-1 3-dimethylbytylidene) anilinoxide, high valency metal salts, such as ferric chloride, diphenylpicrylhydrazine, diphenyamine, hydroquinone, t-butylcatechol, dithiobenzyldisulfide, p'-ditolyltrisulfide, benzoquinone derivatives, nitro compounds, nitroso compounds, and the like. Among them, to use hydroquinone is particularly preferred. The above radical scavenger may be used as a single material, or several kinds may be combined.

It is preferable to blend the hydrous double salt compound because of exhibiting similar effect to deterioration preventing agent, such as antioxidant.

Preferable hydrous double salt compounds for the invention include hydrotalite compounds having a general formula of

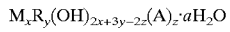

$$M_xR_y(OH)_{2x+3y-2z}(A)_z \cdot aH_2O$$

In the formula, M represents Mg, Ca or Zn, R represents Al, Cr of Fe, A represents $CO_3$ or $HPO_4$, and x, y, z and a are positive numbers, respectively, and examples are $Mg_6Al_2(OH)_{16}CO_3 \cdot 4H_2O$, $Mg_8Al_2(OH)_{20}CO_3 \cdot 5H_2O$, $Mg_5Al_2(OH)_{14}CO_3 \cdot Mg_{10}Al_2(OH)_{22}(CO_3)_2$, $\cdot 4H_2O$, $Mg_6Al_2(OH)_{16}HPO_4 \cdot 4H_2O$, $Ca_6Al_2(OH)_{16}CO_3 \cdot 4H_2O$, $Zn_6Al_2(OH)_{,6}CO_3 \cdot 4H_2O$, $Mg_{4.5}Al_2(OH)_{13}CO_3 \cdot 3.5H_2O$, etc.

Other preferable hydrous double salt compounds include hydrotalcite compounds having a refractive index of 1.40 to 1.60, preferably 1.45 to 1.55, and having a general formula of

$$M_{(1-x)} \cdot Al_x \cdot (OH)_2 \cdot X_{x/n} \cdot mH_2O$$

In the formula, M represents an alkaline earth metal or Zn, X represents n valent anion, and x and m satisfy $o<x<0.5$ and O
, wherein examples of the n valent anion are $Cl^-$, $Br^-$, $I^-$, $NO_3^-$, $ClO_4^-$, $SO_4^{2-}$, $CO_3^{2-}$, $SiO_3^{2-}$, $HPO_4^{2-}$, $HBO_3^{2-}$, $PO_4^{2-}$, $Fe(CN)_6^{3-}$, $Fe(CN)_4^{4-}$, $CH_3COC^-$, $C_6H_4(OH)COO^-$,

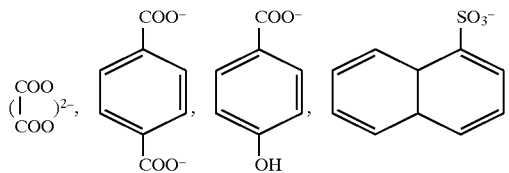

Sill otter preferable hydrous double salt compounds include hydrotalcite compounds composed of magnesium and aluminum having a general formula of

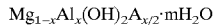

$$Mg_{1-x}Al_x(OH)_2A_{x/2} \cdot mH_2O$$

In the formula, x is a real number in the range of $o<x \leq 7$, A represents $CO_3$ and, and m is a real number. The inventor founded that the hydrotalcite compounds not only exhibit almost the same effects as antioxidant but also function to remove adverse affects upon photographic properties of photographic photosensitive materials by neutralizing catalyst residues, Examples are

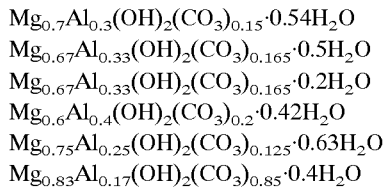

$Mg_{0.7}Al_{0.3}(OH)_2(CO_3)_{0.15} \cdot 0.54H_2O$ $Mg_{0.67}Al_{0.33}(OH)_2(CO_3)_{0.165} \cdot 0.5H_2O$ $Mg_{0.67}Al_{0.33}(OH)_2(CO_3)_{0.165} \cdot 0.2H_2O$ $Mg_{0.6}Al_{0.4}(OH)_2(CO_3)_{0.2} \cdot 0.42H_2O$ $Mg_{0.75}Al_{0.25}(OH)_2(CO_3)_{0.125} \cdot 0.63H_2O$ $Mg_{0.83}Al_{0.17}(OH)_2(CO_3)_{0.85} \cdot 0.4H_2O$ The hydrous double salt compound may be natural or synthetic. The synthetic methods disclosed in Japanese Patent KOKOKU 46-2280 and 50-30039 can be used therefor. Particularly preferred are hydrotalcite compounds of which crystal structure and crystal size are not limited. As natural hydrotalcite compounds, there are hydrotalcite, stichtite, pyroaurite, etc. The hydrous double salt compound may be use as a single material or combined two or more.

Particularly, it is preferable to use together with the antioxidant or the fatty acid metal salt.

A suitable blending amount of the hydrous double salt in the resin composition is 0.001 to 5 wt. %, preferably 0.005 to 3.5 wt. %, more preferably 0.01 to 2 wt. %, most preferably 0.05 to 1 wt. %. When the blending amount is less than 0.001 wt. %, the blending effect is insufficient, and coloring or resin degradation of molded articles occur. When the blending amount exceeds 5 wt., %, appearance of molded articles is degraded by generation of lumps and degradation of gloss. The particle size if the hydrotalcite compound is not limited, but in view of processibility, such as injection moldability, properties, etc., a suitable mean secondary particle size is 20 μm or less, preferably 10 μm or less, particularly preferably 5 μm or less, and as to BET specific surface area, suitably 50 $m^2/g$ or less, preferably 40 $m^2/g$ or less, particularly preferably 30 $m^2/g$ or less.

It is preferable to treat the hydrotalcite compound by a surface treating agent. By treating with surface treating agent, dispersibility and miscibility against resin are further improved, and processibility such as injection moldability, properties, and the like are also improved.

As examples of the surface treating agent, there are higher fatty acid metal salts, such as sodium laurate, potassium laurate, sodium oleate, potassium oleate, calcium oleate, magnesium stearate, sodium stearate, potassium stearate, sodium palmitate, potassium palmitate, sodium caprate, potassium caprate, sodium myristate, potassium myristate, sodium linolate and potassium linolate, higher fatty acids, such as lauric acid, palmitic acid, oleic acid, stearic acid, capric acid, myristic acid and linolic acid, organic sulfonic acid metal salts, such as calcium dodecylbenzene sulfonate and sodium dodecylbenzene sulfonate, coupling agents, such as isopropyltriisostearoyl titanate, isopropyltris (dioctylpyrophosphate) titanate, tetraisopropylbis (dioctylphosphite) titanate, vinyltriethoxysilane, gamma-methacryloxypropyltrimethoxysilane and gamma-glycidoxypropyltrimethoxysilane, and various lubricants, such as higher fatty acid amides, higher fatty acid esters, silicones and waxes.

The surface treatment using the surface treating agent can be conducted, for example, by adding an aqueous solution of a higher fatty acid alkali metal salt to the hydrotalcite compound suspended in hot water with stirring, or by adding a melted higher acid or a coupling agent solution dropwise to a hydrotalcite compound stirred by a Henschel mixer. A suitable amount of the surface treating agent is, in general, 0.01 to 50 wt. %, preferably 0.05 to 35 wt. %, more preferably 0.1 to 20 wt. %, most preferably 0.5 to 10 wt. %. Moreover, a small amount of impurities, such as other metal oxides, may contain so far as not degrading the effects of the invention.

Moreover, in order to improve dispersibility of the hydrotalcite compound, one or more of a higher fatty acid, a fatty acid amide lubricant, a silicone oil, a sorbitan fatty acid ester, such as sorbitan monostearate, and a glycerine fatty acid esters, such as glycerine monostearate may be added the resin composition as dispersing agent in an amount as the total of 0.01 to 10 wt. %, preferably 0.05 to 8 wt. %, more preferably 0.08 to 5 wt. %, most preferably 0.1 to 3 wt. %. By combining with the hydrous double salt compound, processibility and anticorrosion are improved, coloring and resin degradation of molded articles are prevented, transparency is improved, decrease of physical strength is prevented, and lump generation caused by resin yellowing is prevented. It is particularly preferable to combine one or more stabilizers selected from the group consisting of phenolic antioxidants, phosphorous-containing (phosphite) antioxidants and fatty acid metal salts which synergistically improve the above functions.

In this case, in order not to affect adversely photographic performance of photographic photosensitive materials, ① to blend 0.0005 to 0.5 wt. %, preferably 0.001 to 0.4 wt. %, particularly preferably 0.002 to 0.3 wt. %, of a phenolic antioxidant, ② to blend 0.0005 to 0.5 wt. %, preferably 0.001 to 0.4 wt. %, particularly preferably 0.002 to 0.1 wt. %, of a phosphorus-containing antioxidant, ③ to blend 0.0005 to 10 wt. %, preferably 0.001 to 5 wt. %, particularly preferably 0.002 to 3 wt. %, of a hydrous double salt compound and/or a fatty acid metal salt (metallic soap), and the total blending amount of ①+②+③ becomes 0.0015 to 11 wt. %, preferably 0.002 to 10 wt. %, more preferably 0.003 to 9 wt. %, most preferably 0.005 to 8 wt. % of the packaging material for a photographic photosensitive material. In any event, it is preferable to blend a minimum amount capable of preventing resin degradation in view of not degrading photographic performance and inhibiting increase of cost.

By combining the antioxidant synergist with one or more of the aforementioned antioxidant, radical scavenger, hydrous double salt compound, thermal degradation or thermal decomposition of resins and low molecular weight additives (lubricant, antistatic agent, organic nucleating agent, dripproofing agent, compatibilizing agent, etc.), degradation of physical strength, remarkable variation of resin fluidity and generation of lumps can be prevented. Furthermore, generation of thermal decomposition products (aldehydes, etc.) which adversely affect photographic photosensitive material can be prevented. As the antioxidant synergist, there are phosphoric acid, citric acid, phosphoric acid compounds, citric acid compounds, etc. Particularly, phosphoric acid metal salts, and citric acid metal salts are preferable.

It is also preferable to add an ultraviolet stabilizer which prevents the degradation of thermoplastic resin, such as various polyolefin resins, homopolystyrene resins and the rubber-containing aromatic vinyl resin, similar to the antioxidant, the radical scavenger, the antioxidant synergist and the age resistor. Representative ultraviolet stabilizer are salicylate ultraviolet stabilizers, such as phenylsalicylate, p-t-butylphenylsalicylate and p-octylphenylicylate, benzophenone ultraviolet stabilizers, such as 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydoxy-4,4'-dimethoxybenzophenone and 2-hydroxy-4-methoxy-5-sulfobenzophenone, benzotriazole ultraviolet stabilizers, such as 2-(2'-hydroxy-5'-methylphenyl)benzotriazole, 2-(2'-hydroxy-5'-t-butylphenyl) benzotriazole, 2-(2'-hydroxy-5'-di-t-butylphenyl)benzotriazole, 2-(2'-hydroxy-3',5'-di-t-butylphenyl'benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-3',5'-di-t-amylphenyl)benzotriazole, 2-(2'-hydroxy-4'-octoxyphenyl)benzotriazole, 2-(2'-hydroxy-3'-(3",4",5",6"-tetrahydrophthalimidemethyl)-5'-methylphenyl)-benzotriazole and 2,2-methylene-bis(4-(1,1,3,3-tetramethylbutyl)-6-(2H-benzotriazole-2-il)phenol), and cyanoacrylate ultravioletstabilizers, such as 2-ethylhexyl-2-cyano-3,3'-di-phenylacrylate and ethyl-2-cyano-3,3'-diphenylate, and the like. A suitable blending amount is 0.01 to 10 parts by weight, preferably 0.05 to 5 parts by weight, particularly preferably 0.1 to 3 parts by weight, per 100 parts by weight of thermoplastic resin, such as various polyolefin resins, homopolystyrene resin, polyamide resin or rubber-containing aromatic vinyl resin. The blending amount of less than 0.01 part by weight results in insufficient effects on ultraviolet stabilization, and on the other hand, the blending amount of more than 10 parts by weight results in the occurrence of bleeding out which adversely affects photographic properties of photographic photosensitive materials. Two or more ultraviolet stabilizers may be combined.

In the invention, it is preferable to add an age resistor which prevents the degradation of thermoplastic resin, such as various polyolefin resins, homopolystyrene resin or the rubber-containing aromatic vinyl resin, similar to the antioxidant and the radical scavenger. Representative age resistors are naphthylamines such as phenyl-β-naphthylamine, diphenylamines such as N,N'-diphenylethylenediamine, p-phenylenediamines such as N,N'-diphenyl-p-phenylenediamine, hydroquinone derivatives such as 6-ethoxy-2,2,4-trimethyl-1,2-dihydroquinoline, monophenols such as 2,6-di-tert-butyl-4-methylphenol, polyphenols such as 2,2'-methylene-bis (4-ethyl-6-t-butylphenol, thiobisphenols such as 4,4'-thiobis-(6-t-butyl-3-methylphenol), 2-mercaptobenzoimidazole and the like. They are optionally blended according to their characteristics. A suitable blending amount is 0.01 to 10 parts by weight, preferably 0.05 to 5 parts by weight, particularly preferably 0.1 to 3 parts by weight, per 100 parts by weight of thermoplastic resin, such as various polyolefin resins or rubber-containing aromatic vinyl resin. The blending amount of less than 0.01 part by weight results in insufficient blending effects on the prevention of aging, and on the other hand, the blending amount of more than 10 parts by weight results in the occurrence of vulcanization troubles and remarkable blooming.

Various additives may be added to the color masterbatch resin composition for a packaging material of the invention. Various additives are described in "Saishin Ganryo Binran (The Newest Pigment Handbook), Revised and Enlarged Edition" published by Seibundo Shinko Sha on Jan. 10, 1977, "Shin Kagaku (New Chemical) Indenx" published by The Chemical Daily Co., Ltd. on Jul. 23, 1993, "12394 no Kagaku Shohin (12394 Chemical Goods)" published by The Chemical Daily Co., Ltd. on Jan. 26, 1994, "Plastic Data Handbook" published by Kogyo Chosa Kai on Apr. 5, 1984, "Jitsuyo Plastic Yogo Jiten (Practical Plastic Term Dictionary), Third Edition" published by Plastic Age, in detail. Most of the additives are applicable to packaging materials for photographic photosensitive materials by selecting the type of additive, by limiting blending amount, or by utilizing a reaction rendering harmless by combining other additive(s), or by investigating layer construction or resin composition.

Representative examples are-described below.

A. First Classification (classification by performance against need)

1. Processing Assistant
   a. Processing Stabilizer (antioxidant, heat stabilizer) (PVC stabilizer)
   b. Fluidity Controller (plasticizer, lubricant)
   c. Shape Retention Assistant (mold releasing agent, contraction preventing agent)
2. Modifier
2-1. Stabilizer (Life Controller)
   a. Antioxidant
   b. Light Stabilizer
   c. Flame Retardant d. Biostabilizer
e. Metal Deactivator
f. Deterioration Restoring Agent
2-2. Performance Modifier (Property Controller)
a. Impact Resistance Improver (various elastomers, L-LDPE resin)
b. Filler, Reinforcing Agent
c. Colorant
d. Plasticizer
e. Foaming Agent
f. Crosslinking Agent (organic peroxides)
g. Nucleating Agent
2-3. Function Modifier (Function Imparting Agent)
a. Conductive Agent. Magnetic Agent
b. Antistatic Agent
c. Fluorescent Whitening Agent
2-4. Decomposition Accelerator
a. Biodegradation
b. Photodegradation
c. Thermal Degradation, etc.
B. Second Classification (classification by attribute of additives)
1. Power Modifier
a. Reinforcing Agent/Filler
b. Nucleating Agent
c. Processing Assistant
d. Powder/Special Structure Powder
2. Reactivity Modifier
a. Crosslinking Agent
b. Macromonomer
c. Stabilizer (heat, light, radioactive ray, bio)
d. Decomposition Accelerator (bio, light, heat)
3. Interface Modifier
a. Coupling Agent
b. Compatibilizing Agent
c. Plasticizer/Solvent
4. Polymer Modifier
a. Processibility Improve, Performance Modifier
b. Alloy, Blend (performance modifier), etc.

The color masterbatch resin composition for a packaging material having the foregoing resin composition can be prepared a conventional method. A water content of the resin composition is preferably as small as possible, because water causes unexpected troubles, such as silver streaks, foaming and short shot. Therefore, an oven-dry water content is usually made 0.8 wt. % or less, preferably 0.5 wt. % or less, more preferably 0.4 wt. % or less, most preferably 0.3 wt. % or less.

Particularly, carbon black, which is a light-shielding material most frequently used for packaging materials for a photographic photosensitive material, is liable to absorb water. Accordingly, when a carbon black content of color masterbatch resin composition pellets is increased, moisture absorption increases with time. Then, in the case of storing the pellets for a long period, unless they are packaged by a moistureproof packaging bag, the moisture content gradually increases.

Carbon black masterbatch resin pellets composed of LDPE resin and 20 wt. % or 40 wt. % carbon black were prepared, and stored for four months in a kraft paper bag formed of four layers of which the innermost layer was 50 μm polyethylene. Moisture absorption degree was measured at every month and the results are shown in the following table.

|  | Moisture Content (wt. %) | | | | |
| --- | --- | --- | --- | --- | --- |
| Time (month) | 0 | 1 | 2 | 3 | 4 |
| 20 wt. % Carbon Black | 0.06 | 0.2 | 0.3 | 0.35 | 0.45 |
| 40 wt. % Carbon Black | 0.15 | 0.35 | 0.5 | 0.6 | 0.75 |

Subsequently, the carbon black masterbatch resin pellets which had absorbed moisture were attempted to remove the absorbed moisture by heating at 80° C., and the variation of moisture content was measured. The results are shown in the following table.

|  | Moisture Content (wt. %) | | | | |
| --- | --- | --- | --- | --- | --- |
| Time (hour) | 0 | 1 | 2 | 3 | 4 |
| 20 wt. % Carbon Black | 1.2 | 0.9 | 0.75 | 0.6 | 0.45 |
| 40 wt. % Carbon Black | 0.6 | 0.4 | 0.3 | 0.2 | 0.17 |

As shown in the above table, it is very difficult to remove moisture from carbon black masterbatch resin composition pellets once absorbed moisture only by heating. In the above tables, the moisture content is an oven-day water content.

Accordingly, it is preferable to dry the color masterbatch resin composition by using a vacuum hopper in a combination of heating and reducing pressure lower than atmospheric pressure. When reducing pressure to 80 mm Hg or less is combined with heating, drying time can be shortened to ⅓ or less compared with drying only by heating. This method is particularly preferable for drying a color masterbatch resin composition containing 40 wt. % or more carbon black.

The color masterbatch resin composition for a packaging material of the invention is kneaded and melted with a thermoplastic resin for dilution, and molded into various packaging materials for a photographic photosensitive material.

As the thermoplastic resin for dilution, various aforementioned thermoplastic resins are usable. Particularly, preferable thermoplastic resins for photographic photosensitive materials include LDPE resins, MDPE resins, HDPE resins, L-LDPE resins, EEA resins, EVA resins, EAA resins, homopolypropylene resins, propylene-ethylene block copolymer resins, propylene-ethylene random copolymer resins, polyamide resins, polyester resins, polystyrene resins, rubber-modified polystyrene resins (high-impact polystyrene resins), ABS resins, polyacetal resins, polycarbonate resins, vinyl chlovide resins, EVOH resins, etc.

A method of weighing and mixing pellets of the color masterbatch resin composition with pellets of a thermoplastic resin for dilution automatically is as follows:

Pellets of the color masterbatch resin composition and pellets of a thermoplastic resin for dilution are weighed by two turntables. The turntable weighing the pellets of a thermoplastic resin for dilution continuously turns at a constant speed, and the flow rate of the pellets is controlled by opening and closing by the vertical movement of a damper similar to a water gate attached under a hopper. The flow rate of the pellets of the color masterbatch resin composition can be controlled by two means. One is a damper similar to the damper used for the pellets of a thermoplastic resin for dilution, and the other is by adjusting a rotation angle of the turntable. That is, not the turntable turns continuously but the interval of stroke can very be the intermittent motion of a cam mechanism. As a result, on a continuous flow of the pellets of a thermoplastic resin for dilution, the pellets of the color masterbatch resin composition drop intermittently. Since uneven mixing occurs caused by the specific gravity difference between two components, static electrification, and the difference of pellet size which accelerate their separation attention is required. On the other hand, the separation also occurs during pneumatic transportation after blending and in a hopper of a molding machine. Accordingly, it is preferable to mount an automatic weighing machine on the hopper, and to control the weighing by a level meter so that a stocked amount in the hopper is kept small. Moreover, it is preferable to employ a weight measuring system.

Figure 20:
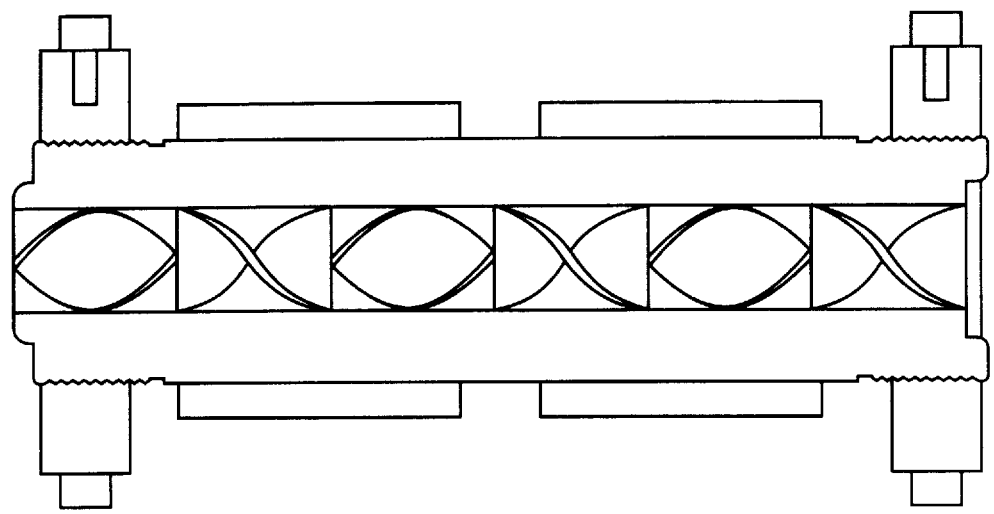
FIG. 20 is a schematic illustration of a line mixer without any movable part.

A line mixer without any movable part is illustrated in FIG. 20. The line mixer is called "Thermogenizer" and made by applying the principle of a pipe mixer "Static Mixer" (Japanese Patent 553918) to extrusion molding. By providing the line mixer between an extruder and a die, temperature gradient of a molten thermoplastic resin flowing from the extruder to the die is dissolved, and the dispersion of a light-shielding material into a thermoplastic resin is uniformed.

The element of the Static Mixer are inserted into the barrel of the Thermonizer, and fixed. The element is formed of connecting a plurality of twist rectangular or square plates in series by welding so that each connecting side is arranged so as to cross at a right angle. Respective twist rectangular or square plates are formed by twisting both sides at 180 degrees in the direction opposite to each other. A molten thermoplastic resin is divided exponentially into ½, ¼, ⅛, ¹⁄₁₆ . . . by passing every twist plate portion. Moreover, since every plate is twisted, the molten thermoplastic resin rotates in a radial direction crosswisely, and a radial mixing occurs. Thereby, uneven distribution of temperature, color and properties in the molten thermoplastic resin is dissolved at once.

Figure 16:
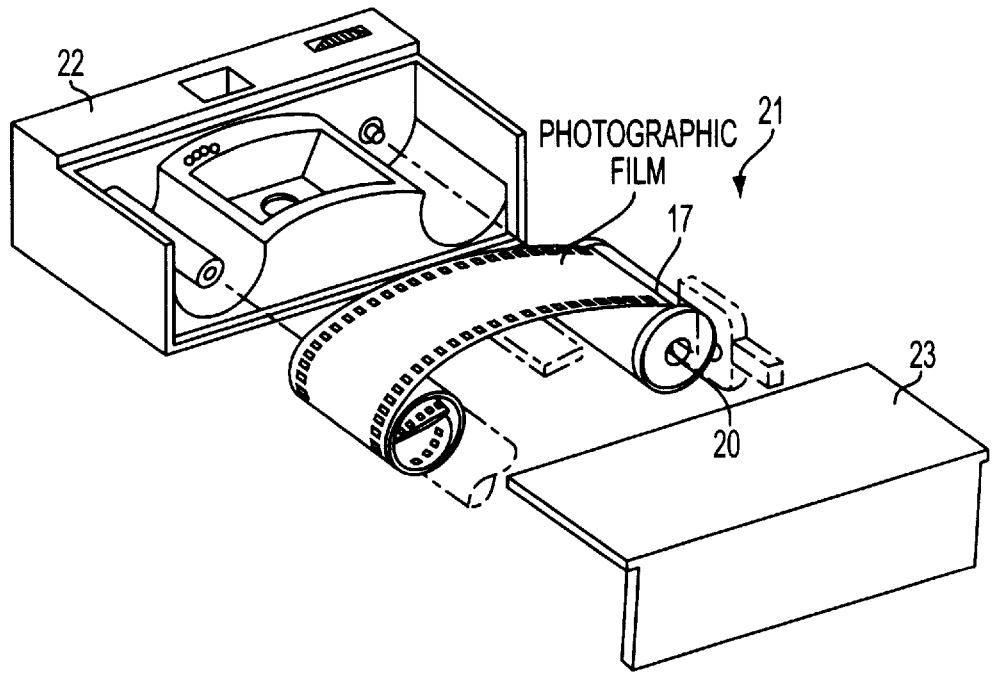
FIG. 16 is an exploded perspective view of a photographic film unit with a lens embodying the invention.
Figure 17:
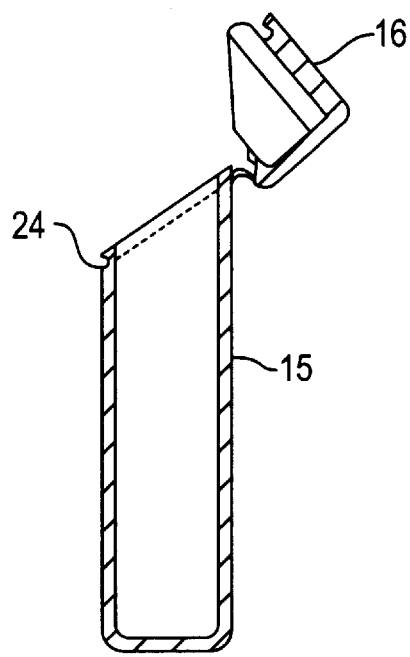
FIG. 17 is a sectional view of a cap-body integrated type photographic film case embodying the invention.

Representative examples of the packaging material for a photographic photosensitive materials of the invention are as follows:

I. Film Molded Articles:
Single layer film: Japanese Patent KOKOKU No. 2-2700, etc.
FIG. 1
Coextruded multilayer films (FIGS. 2–6).
Laminated films using a single layer film or a coextruded multilayer film: Japanese Patent KOKOKU Nos. 63-26697, 2-2701, 2-13774, 2-19225, etc. (FIGS. 7–9)
Packaging materials using the above flexible sheet of the single layer film, coextruded multilayer film or laminated film; packaging bags (unipack bag, single sheet flat bag, double sheet flat bag, single sheet gusset bag, double sheet gusset bag, etc.), shrink packaging, bulk packaging (Japanese Patent KOKAI No. 3-53243, Japanese Utility Model KOKAI No. 3-71346, etc.), assembly packaging, and the like and package for lightroom loading of a band form photosensitive material Japanese Utility Model KOKAI Nos. 55-113543, 60-13386, 60-167796, 2-72347, 3-47547, 3-54937, 3-86358, 3-96648, etc.
II. Vacuum-molded articles:
III. Injection-molded articles: spools for a photographic film, film units with a lens, containers for a photographic film cartridge, light-shielding containers, cartridges for a photographic film made of plastic, light-shielding magazines for light room loading, cores, photographic film cartridges, packs for an instant film, etc.
Cartridge for disc film: Japanese Utility Model KOKAI No. 60-21743, etc.
Film unit with lens: Japanese Patent KOKAI No. 63-226643 (FIG. 16)
Spool for photographic film: Japanese patent KOKAI Nos. 1-251030, 57-196218, 59-15049, 58-203436, 58-82237, 58-82236, 62-240957, Japanese Utility Model KOKAI Nos. 63-73742, 54-120931, 58-178139-178145, 63-73742, Japanese Utility Model KOKOKU Nos. 55-31541, 44-16777, U.S. Pat. No. 1,930,144, GB 2199805A (FIG. 13)
Cartridge for photographic film: Japanese Patent KOKAI Nos. 54-111822, 50-33831, 56-87039, 1-312538, 57-190948, Japanese Patent KOKOKU Nos. 45-6991, 55-21089, Japanese Utility Model KOKAI No. 55-97738, U.S. Pat. No. 4,846,418, U.S. Pat. No. 4,848,693, U.S. Pat. No. 4,887,776, etc. (FIG. 14)
Container for photographic film cartridge: Japanese Patent KOKAI Nos. 61-250639, 61-73947, 63-121047, 62-291639, Japanese Utility Model KOKAI Nos. 60-163451, 1-88940, 1-113235, 1-152337, Japanese Utility Model KOKOKU Nos. 2-33236, 3-48581, Japanese Patent KOKOKU No. 2-38939, U.S. Pat. No. 4,801,011, U.S. Pat. No. 4,979,351, EP 02370562A2, EP 0280065A1, EP 0298375A2, etc. (FIGS. 10–12)
Core, Reel: Japanese Utility Model KOKAI No. 60-107848, U.S. Pat. No. 4,809,923, GB 2,033,873 B, etc.
Magazine for sheet films: Japanese Utility Model KOKAI No. 56-5141, etc.
Photographic film cartridge: Japanese Patent KOKAI No. 1-312537, Japanese Utility Model KOKAI Nos. 2-24846, 2-29041, 60-120448, Japanese Utility Model KOKOKU No. 56-16610, etc. (FIG. 18)
Photographic film case: Japanese Utility Model KOKAI No. 54-100617, 64-32343, 1-94258, 2-56139, Japanese Patent KOKOKU No. 2-54934, U.S. Pat. No. 4,779,756, EP 0242905A1, etc. (FIG. 17)

The method of forming the packaging material for a photographic photosensitive material may be selected from inflation film molding, extrusion laminating, injection molding, vacuum molding, sheet forming, T die flat film molding, pressure forming, rotational molding, intermold vacuum injection molding and the like, according to the form of each article to be molded.

In the case that the packaging material for a photographic photosensitive material is a container for a photographic film cartridge, ethylene-α-olefin copolymer resins, homopolyethylene resins, homopolypropylene resins, propylene-α-olefin copolymer resins, homopolystyrene resins, rubber-containing polystyrene resins, polyester resins, acrylonitrile resins, vinyl chloride resins, etc. are preferred.

In view of moistureproofness, injection moldability, cost, and recycling ability, preferred polyethylene resins (homopolymers, random or block copolymers, and blends of one or more of them and one or more polypropylene resins) have a melt flow rate (ASTM D-1238, E condition) of 5 to 80 g/10 minutes preferably 7 to 70 g/10 minutes, more preferably 10 to 60 g/10 minutes, most preferably 15 to 50 g/10 minutes, a density (ASTM D-1505) of 0.935 g/cm$^3$ or more, preferably 0.940 to 0.985 g/cm$^3$, more preferably 0.950 g/cm$^3$ or more, a bending rigidity (ASTM D-747) of 5,000 kg/cm$^2$ or more, preferably 6,000 kg/cm$^2$ or more, more preferably 8,000 kg/cm$^2$ or more, most preferably 10,000 kg/cm$^2$ or more.

In the case of transparent containers, suitable resin compositions comprises 50 wt. % or more, preferably 65 wt. % or more, more preferably 80 wt. % or more, most preferably 90 wt. % or more of one or more homopolyethylene resins and/or ethylene-α-olefin copolymer resins having a density of 0.935 g/cm$^3$ or more, preferably 0.945 g/cm$^3$ or more, more preferably 0.955 g/cm³ or more, most preferably 0.960 g/cm³ or more and 0.01 to 2 wt. % of at least one of various nucleating agents and 0.01 to 10 wt. % of at least one of various lubricants. Particularly preferable resin compositions are the aforementioned ethylene-α-olefin random copolymer resins having a MFR of 15 to 50 g/10 minutes a density of 0.945 to 0.985 g/cm³ of which α-olefin has a number of carbon atoms of 3 to 10 and propylene-ethylene random copolymer resins containing 0.01 to 2 wt. % of at least one of various nucleating agents. For containers colored white, black, brown or silver, preferable resins are propylene-ethylene block copolymer resins and homopolyethylene resins having a density of 0.935 g/cm³ or more, preferably 0.945 g/cm³ or more, more preferably 0.955 g/cm³ or more.

More preferable resins than the above polyethylene resins for forming container bodies for a photographic film cartridge in terms of quality and cost are various polypropylene resins (homopolymers, random or block copolymers, and blends of one or more of them and one or more polyethylene resins) have a melt flow rate (ASTM D-1238, at 230° C. at a testing load of 2.16 kgf) of 10 to 80 g/10 minutes, preferably 15 to 50 g/10 minutes, particularly preferably 20 to 50 g/10 minutes, particularly preferably 20 to 45 g/10 minutes, a bending elastic modulus (ASTM D790) of 4,000 kg/cm² or more, preferably 8,000 kg/cm² or more, particularly preferably 10,000 kg/cm² or more, and a notched Izod impact strength (ASTM D-256) at 23° C. of 2.0 kg·cm/cm or more, preferably 2.5 kg·cm/cm or more, particularly preferably 3.0 kg·cm/cm or more.

Containers for a photographic film with excellent qualities can be obtained by incorporating organic compounds having a number average molecular weight of less than 10,000 of fatty acid metal salt or fatty acid amide lubricant and organic nucleating agent and antioxidant.

Preferable embodiments of the invention are described below.

(1) A color masterbatch resin composition for a packaging material wherein the thermoplastic resin for dilution is ethylene-α-olefin copolymer resin.

(2) A color masterbatch resin composition for a packaging material wherein the thermoplastic resin for dilution is rubber-containing polystyrene resin.

(3) A color masterbatch resin composition for a packaging material, which contains one or more thermoplastic resin deterioration preventing agents selected from the group consisting of antioxidant, age resistor, radical scavenger, antioxidizing synergist, hydrous compound and hydrous double salt compound.

(4) A method of molding a packaging material using a color masterbatch resin composition for a packaging material for a photographic photosensitive material wherein evaporable substances which adversely affect photographic properties of photographic photosensitive materials have been removed by mounting a hopper provided with a heating and/or evacuating means at an inlet port of an extruder.

(5) A color masterbatch resin composition for a packaging material having a gray appearance, wherein the light-shielding material is a combination of a white pigment and a black pigment.

(6) A color masterbatch resin composition for a packaging material, wherein the light-shielding material is a combination of a sperical pigment and a flake pigment.

(7) To incorporate an antistatic agent and/or a conductive material into one or more of pellet of a color masterbatch resin composition for a packaging material for a photographic photosensitive material, pellets of a thermoplastic resin for dilution, recycle resin pellets and other materials mixed with the pellets of a color masterbatch resin composition is preferable in order to improve mixing workability and so as not to break an uniformly mixed state by static electrification to repel each other during transportation, storing in a hopper or to adhere to the wall of a container for transportation, conveying pipes, the hopper or the like.

(8) To combine a lubricant and/or a plasticizer with an antistatic agent and/or a conductive material is particularly preferable, because it is possible to supply to an extruder in an uniformly mixed form by adhering to each other in addition to antistatic action, and various effects are exhibited, such as improvement in melt kneadability, in dispersion of light-shielding material, in resin fluidity, in lubricity, and in the case of injection molded articles and flow molded articles, in mold releasability, in shortening of molding cycle, etc.

(9) Even when uniformly mixed, the mixture is separated again during putting into a hopper according to the form and size of pellets. In order to prevent the separation again and to improve uniform melt kneadability in an extruder and in economical viewpoint, preferable forms of the pellets are sphere, column, square column, square, rectangle, plate, etc., and preferable sizes are 1 to 10 mm, more preferable 2 to 8 mm, most preferably 3 to 6 mm of a side or a diameter, and 1 to 100 mm³, more preferably 5 to 80 mm³, firtjer, preferably 10 to 60 mm³, most preferably 20 to 50 mm³.

(10) Furthermore, the relation between the volume of pellets of a color masterbatch resin composition and pellets of a thermoplastic resin for dilution is also important, and a suitable volume ratio of the pellets of a color masterbatch resin composition to the pellets of a thermoplastic resin for dilution is 0.35 to 3, preferably 0.5 to 2.3, more preferably 0.65 to 1.6, most preferably 0.8 to 1.3. An ideal relation is of having almost the same form and size between them.

(11) Preferable thermoplastic resins of a color masterbatch resin composition are of having a higher MFR, a lower softening point and a lower molecular weight than a thermoplastic resin for dilution.

(12) In the case that the light-shielding material concentration of a color masterbatch resin composition is 20 to 80 wt. %, and that the resin composition is diluted by a thermoplastic resin for dilution in an amount of 5 to 120 times as much as that of the resin composition, it is preferable that the size of pellets of the resin composition is slightly smaller than pellets of the thermoplastic resin for dilution, and that the fluidity (MFR) of the resin composition is greater than the thermoplastic resin for dilution, because the dispersibility of the light-shielding material is improved to prevent the generation fo uneven coloring and microgrits.

(13) As to antistatic agent, lubricant, plasticizer, light-shielding material, thermoplastic resin, etc., other materials than previously described ones, which do not affect adversely photographic properties of photographic photosensitive materials, are also usable. Those adversely affecting photographic properties are also usable by adjusting the concentration or content to the range where adverse affects upon photographic properties are small and no problem in practical viewpoint. It is also possible to use by making into a state of not affecting adversely photographic photosensitive materials by reacting with or adsorbing substances adversely affecting photographic properties.

(14) As preferable conductive materials for the above (7) and (8), there are conductive carbons, such as conductive carbon blacks cacetylene blacks, conductive furnace blacks, etc.), carbon fibers and graphites, inorganic salts, such as sodium chloride, potassium chloride, lithium chloride, sodium alminate, sodium phosphate, calcium chloride, magnesium chloride and sodium sulfate, organic acid salts, such as potassium formate and sodium oxalate, surfactants, such as fatty acid metal salts (metallic soaps), phosphates and carboxylic acid salts, polymer electrolytes, such as quaternary ammonium salts, polyacrylic acid salts, salts of styrene-maleic acid copolymer resins and polystyrene sulfonates, and inorganic conductive materials, such as silica, slumina and montmorillonite.

(15) A color masterbatch resin composition for a packaging material for a photographic photosensitive material, wherein the light-shielding material is an inorganic pigment or a metal powder, having a mean particle size of 0.01 to 10 μm and a refractive index of 1.50 or more measured by the Larsen oil immersion, and is combined with one or more of a lubricant, a plasticizer, a dripproofing agent and an antistatic agent or is coated with a surface-coating material.

(16) A color masterbatch resin composition for a packaging material for a photographic photosensitive material, which is formed into pellets having a volume 0.35 to 3 times as much as the volume of pellets of a thermoplastic resins or dilution.

(17) A color masterbatch resin composition for a packaging material for a photographic photosensitive material, wherein the blach light-shielding material is carbon black, the number of carbon atoms of the metal salt of partially saponified fatty acid ester is 20 to 50, and the number of carbon atoms of the fatty acid and the higher fatty acid compound is 15 to 50.

(18) A color masterbatch resin composition for a packaging material for a photographic photosensitive material, wherein the light-shielding material is carbon black, the antioxidant is one or more of a hindered phenol antioxidant and a phosphorous-containing antioxidant, and the lubricant is one or more of a fatty acid metal salt and a partially saponified fatty acid ester metal salt.

(19) A color masterbatch resin composition for a packaging material for a photographic photosensitive material, wherein the thermoplastic resin inactive to polyolefin resin has a MFR greater than the MFR of a thermoplastic resin for dilution.

(20) A method of producing a color masterbatch resin composition for a packaging material, wherein the MFR of a thermoplastic resin for dilution is, in the case of a use or an inflation film, 0.1 to 7 g/10 minutes, in the case of a use for a T die film, 1 to 10 g/10 minutes, in the case of a use for an extrusion laminating, 2 to 11 g/10 minutes, and in the case of a use for an injection molded article, 2 to 50 g/10 minutes.

(21) A packaging material for a photographic photosensitive material molded through mixing a thermoplastic resin for dilution having a MFR higher than the MFR of a color masterbatch resin composition for a packaging material for a photographic photosensitive material in an amount three times by weight as much as or more the resin composition.

(22) A packaging material for a photographic photosensitive material, wherein a thermoplastic resin for dilution having MFR 5 times as much as or more the MFR of a color masterbatch resin composition for a packaging material is mixed in an amount 5 times as much as or more the resin composition.

(23) A packaging material for a photographic photosensitive material, wherein the thermoplastic resin for dilution is a polystyrene resin or an ABS resin and is contained in an amount three times as much as or more the color masterbatch resin composition, the carbon black content is 0.1 to 10 wt. %, and the lubricant content is 0.01 to 5 wt. %.

(24) A packaging material for a photographic photosensitive material, wherein the carbon black is coated with a surface-coating material.

(25) A method of producing a packaging material for a photographic photosensitive material, wherein the pressure of the hopper and the resin feed opening is kept 80 mm Hg or less.

(26) A method of producing a packaging material for a photographic photosensitive material, wherein the rubber-containing styrene resin composition has a MFR of 1 to 60 g/10 minutes, a notched Izod impact strength of 2 kg·cm/cm or more, a Vicat softening point of 80° C. or more, a statical friction coefficient of 0.40 or less, and a bending electic modulus of 15000 kg/cm$^2$ or more.

(27) A color masterbatch resin composition for a packaging material for a photographic photosensitive material, wherein the rubber-containing styrene resin composition has a wear resistance of 10 mm$^3$ or less.

(28) A method of producing a packaging material for photographic photosensitive material comprising producing pellets of a color masterbatch resin composition for packaging material for a photographic photosensitive material by passing a resin composition comprising a thermoplastic resin and a light-shielding material through a continuous kneading extruder provided with a mechanism of kneading between a rotary disc and a fixed disc, mixing the pellets with pellets of a thermoplastic resin for dilution at a predetermined ratio, and molding the packaging material by passing the pellet mixture through the above continuous kneading extruder.

(29) A color masterbatch resin composition for a packaging material for a photographic photosensitive material, wherein the total amount of one or more antioxidants is 0.001 to 1 wt. %, and the total amount of one or more of the low molecular weight polyolefin resins having a number average molecular weight of 5000 or less and the compatibilizing agents is 1 to 80 wt. %.

(30) A color masterbatch resin composition for a packaging material for a photographic photosensitive material, wherein the lubricant is a fatty acid metal salt, the light-shielding material is a furnace carbon black, the antioxidant is a hindered phenol antioxidant, and the low molecular weight polyolefin resin is a low molecular weight polyethylene resin.

(31) A packaging material for a photographic photosensitive material, which comprises 0.001 to 0.5 wt. % of a phosphorus-containing antioxidant and 0.01 to 5 wt. % of a fatty acid metal salt (metallic soap).

(32) A color masterbatch resin composition for a packaging material, wherein the polyolefin resin is a homoplyethylener resin and/or an ethylene copolymer resin, and the light-shielding material is carbon black.

(33) A packaging material for a photographic photosensitive material, which comprises 0.001 to 10 wt. % of a lubricant and 0.001 to 10 wt. % of one or more of a phnol antioxidant, a phosphite antioxidant, a radical scavenger, an antioxidant synergyst and a hydrous double salt compound.

(34) A packaging material for a photographic photosensitive material, which comprises 0.01 to 10 wt. % of a fatty acid metal salt having a number of carbon atoms of 10 to 35 and a melting point of 70° to 180° C.

(35) A color masterbatch resin composition for a packaging material for a photographic photosensitive material, which consists essentially of 5 to 80 wt. % of a light-shielding material and 20 to 95 wt. % of a mixture of a styrene thermoplastic resin and an acrylic acid ester copolymer resin containing 10 wt. % or more of methyl methacrylate, wherein the ratio of styrene thermoplastic resin/acrylic acid ester copolymer resin is 20/80 to 80/20.

(36) A packaging material for a photographic photosensitive material, which comprises a blend of 100 parts by weight of a color masterbatch resin composition of claim 1 and 30 to 2000 parts by weight of a rubber-containing polystyrene resin containing 0.01 to 10 wt. % of a lubricant and 3 to 20 wt. % of a synthetic rubber, and contains 0.1 to 3 wt. % of a light-shielding material, 0.4 to 8 wt. % of methyl methacrylate, 0.001 to 5 wt. % of a lubricant and 1 to 15 wt. % of a synthetic rubber.

(37) A color masterbatch resin composition for a packaging material for a photographic photosensitive material, which comprises 5 to 95 wt. % of one or more of an ethylene-α-olefin copolymer resin having a MFR of 0.1 to 20 g/10 minutes, a density of 0.860 to 0.905 g/cm$^3$, a Vicat softening point of 105° C. or less and a crystallinity of 40% or less and a synthetic rubber, 0.01 to 10 wt. % of one or more of a lubricant and a coupling agent, and a light-shielding material in a content three times as much as or more the content of the light-shielding material in the packaging material.

(38) A packaging material for a photographic photosensitive material, which consists essentially of 100 parts by weight of the color masterbatch resin composition of claim 1 or 2 and 500 to 12000 parts by weight of a thermoplastic resin for dilution.

(39) A color masterbatch resin composition for a packaging material for a photographic photosensitive material, which comprises 100 parts by weight of a polyolefin resin, 1 to 80 part s by weight of a polyolefin resin containing carboxyl group or acid anhydride group or an elastomer, 20 to 500 parts by weight of a light-shielding material of which the surface has been coated with a surface-coating material and 0.001 to 10 parts by weight of an organic peroxide.

(40) A packaging material for a photographic photosensitive material, which is a light-shielding polyolefin resin film 30 to 300 μm in thickness composed of 100 parts by weight of the color masterbatch resin composition of claim 1 or 2 and 300 to 2500 parts by weight of pellets of a polyolefin resin for dilution having a MFR of 0.1 to 20 g/10 minutes.

(41) The method of producing a packaging material for a photographic photosensitive material of claim 12, 13 or 14, wherein a ring die having a lip clearance of 0.8 to 3.5 mm used, and a film which is the packaging material is molded by inflation film molding at a resin temperature of 130° to 210° C.

(42) The light-shielding material in claims 1 to 15 is furnace carbon black having a pH of 6 to 8, a mean particle size of 12 to 50 mμ and a DBP oil absorption value of 250 ml/100 g or more.

(43) The light-shielding material in claims 1 to 15 is composed of 0.1 to 60 wt. % of an inorganic pigment having a mean particle size of 0.1 to 20 μm and 0.1 to 60 wt. % of carbon black having a mean particle size of 10 to 120 mμ.

(44) The light-shielding material in claims 1 to 15 is CuO—Mn$_2$O$_3$—Fe$_2$O$_3$ black pigment. CuO—Cr$_2$O$_3$—Fe$_2$O$_3$ black pigment or a combination thereof.

(45) 1 wt. % or more of the thermoplastic resin in claims 1 to 15 is a modified polyolefin resin, modified by an unsaturated carboxylic acid or a derivative thereof, having a MFR of 2 g/10 minutes or more.

(46) In claims 1 to 15, 2 or more higher fatty acid metal salts are contained.

(47) In claims 1 to 15, the thermoplastic resin used is in a form of particle having a volume of 1 mm$^3$ or less.

Some packaging materials for a photographic photosensitive material embodying the invention are illustrated in drawings.

FIGS. 1 through 9 illustrate packaging films for a photographic photosensitive material which belong to the packaging material for a photographic photosensitive material of the invention.

The packaging film for a photographic photosensitive material of FIG. 1 is a single layer film consisting of a light-shielding thermoplastic resin film layer 1a.

Figure 2:
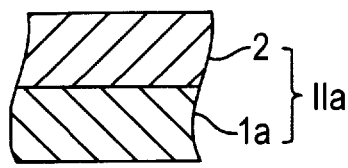

The packaging film for a photographic photosensitive material of FIG. 2 is a coextruded double layer film IIa consisting of a consisting of a light-shielding thermoplastic resin film layer 1a as the packaging material for a photographic photosensitive material of the invention and a thermoplastic resin layer 2.

Figure 3:
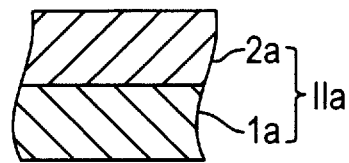

The packaging film for a photographic photosensitive material of FIG. 3 is the same as the film of FIG. 2, except that the thermoplastic resin layer 2 contains a light-shielding material.

Figure 4:
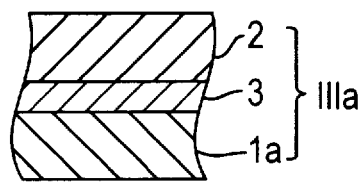

The packaging film for a photographic photosensitive material of FIG. 4 is a coextruded triple layer film IIIa consisting of a light-shielding thermoplastic resin film layer 1a as the packaging material for a photographic photosensitive material of the invention, an intermediate layer 3 and a thermoplastic resin layer 2.

Figure 5:
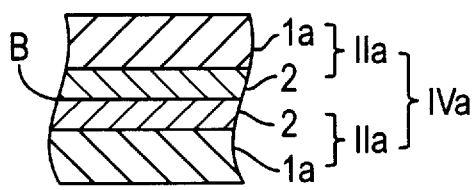

The packaging film for a photographic photosensitive material of FIG. 5 is a laminated film IVa consisting of two coextruded double layer films IIa of FIG. 2 joined by blocking B between the thermoplastic resin layers 2, 2.

Figure 6:
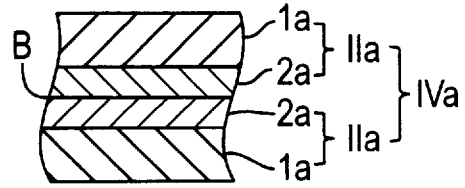

The packaging film for a photographic photosensitive material of FIG. 6 is a laminated film IVa consisting of two coextruded double layer films IIa of FIG. 3 joined by blocking B between the light-shielding thermoplastic resin layers 2, 2.

Figure 7:
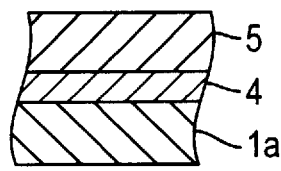

The packaging film for a photographic photosensitive material of FIG. 7 is a laminated film consisting of the above light-shielding thermoplastic resin film layer 1a and a flexible sheet layer 5 laminated through an adhesive layer 4.

Figure 8:
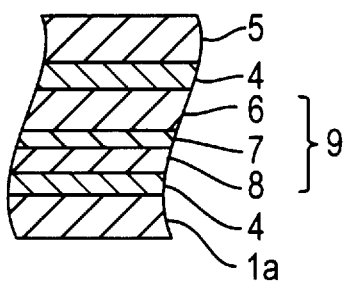

The packaging film for a photographic photosensitive material of FIG. 8 is a laminated film consisting of the above light-shielding thermoplastic resin film layer 1a, a metallized biaxially stretched film layer 9 wherein a vacuum deposited metal layer 8 is provided on a biaxially stretched film layer 6 through an anchor coat layer 7 and a flexible sheet anchor coat layer 7 and a flexible sheet layer 5 laminated each through an adhesive layer 4.

Figure 9:
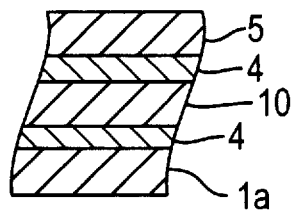

The packaging film for a photographic photosensitive material of FIG. 9 is a laminated film consisting of the above light-shielding thermoplastic resin film layer 1a a metal foil 10 and a flexible sheet layer 5 laminated thereon each through an adhesive layer 4.

Figure 10:
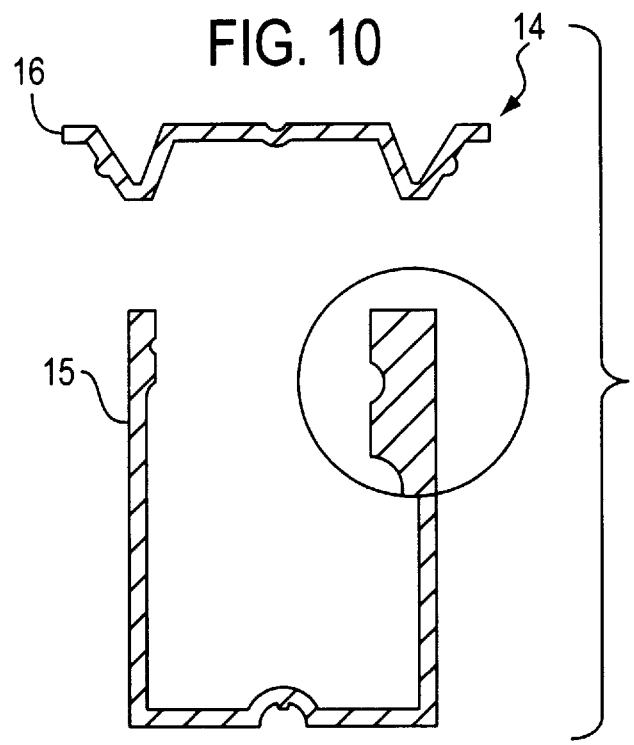
FIGS. 10 and 11 are sectional views of cap separated from body-type containers for a photographic film embodying the invention.

The container 14 for a photographic film cartridge of FIG. 10 consists of a container body 15 and a cap 16. Both of the container body 15 and the cap 16 are the packaging material of the invention.

Figure 11:
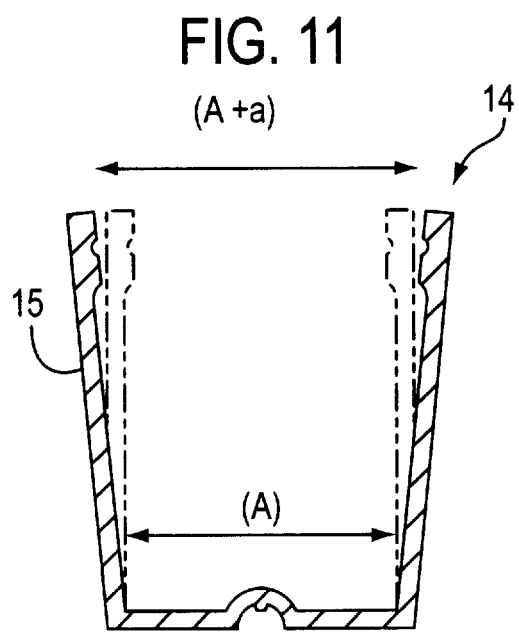

The container for a photographic film cartridge of FIG. 11 also consists of a container body 15 and a cap 16, and the side portion is tapered by enlarging the inside diameter (A+a) of the upper opening portion than the inside diameter (A) of the bottom portion by a. In order to facilitate extracting a core upon injection molding, a suitable value of the a is 0.001 to 2 mm, preferably 0.01 to 1.5 mm, more preferably 0.02 to 1 mm, most preferably 0.05 to 0.5 mm. The container body 15 also belongs to the packaging material for a photographic photosensitive material of the invention.

Figure 12:
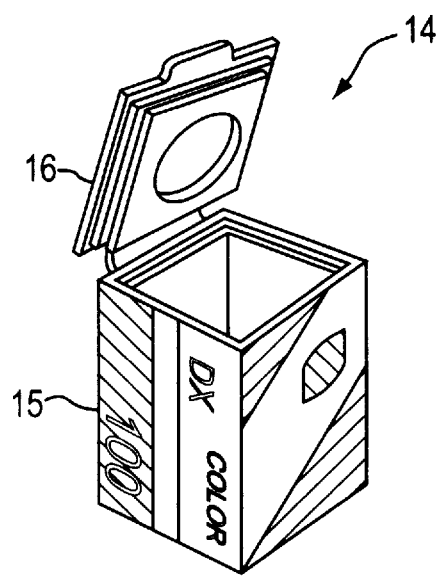
FIG. 12 is a perspective view of a cap-body integrated type container for a photographic film embodying the invention.

The container 14 for a photographic film cartridge of FIG. 12, which is the packaging material of the invention, is a cap-body integrated type consisting of a container body 15 portion and a cap 16 portion, and is formed of the light-shielding thermoplastic resin composition of the invention.

Figure 13:
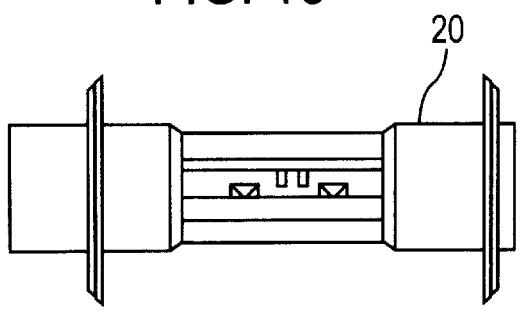
FIG. 13 is a front view of a photographic film spool embodying the invention.

FIG. 13 illustrates a spool 20 for a photographic film which is the packaging material of the invention, the whole body of the spool is formed of the light-shielding thermoplastic resin composition of the invention.

Figure 14:
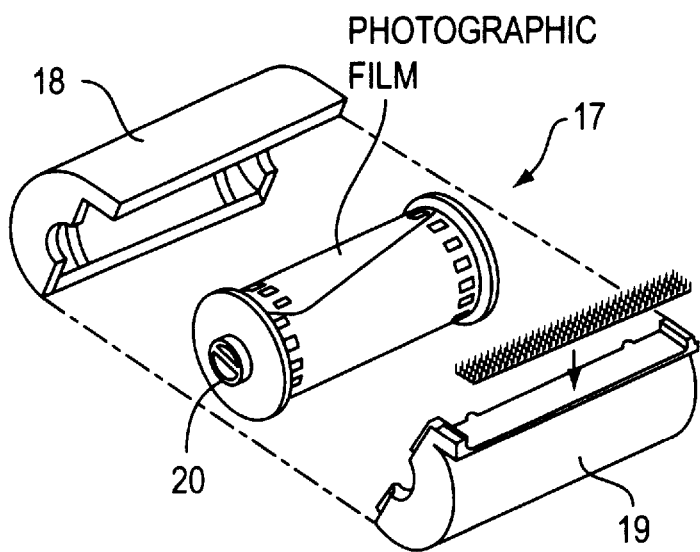
FIG. 14 is an exploded perspective view of a photographic film cartridge embodying the invention.

FIG. 14 illustrates an exploded state of a photographic film cartridge 17, which is the packaging material of the invention, consisting of an upper casing 18 and a lower casing 19, which constitute the cartridge body, and a spool 20 on which the photographic film to be loaded is wound. All of the upper casing 18, the lower casing 19 and the spool 20 belong to the packaging material for a photographic photosensitive material of the invention, and are formed of the light-shielding thermoplastic resin composition of the invention. When taking recycling ability into consideration, it is preferable to form all of the upper casing 18, the lower casing 19 and the spool 20 by the same or a similar resin composition.

Figure 15:
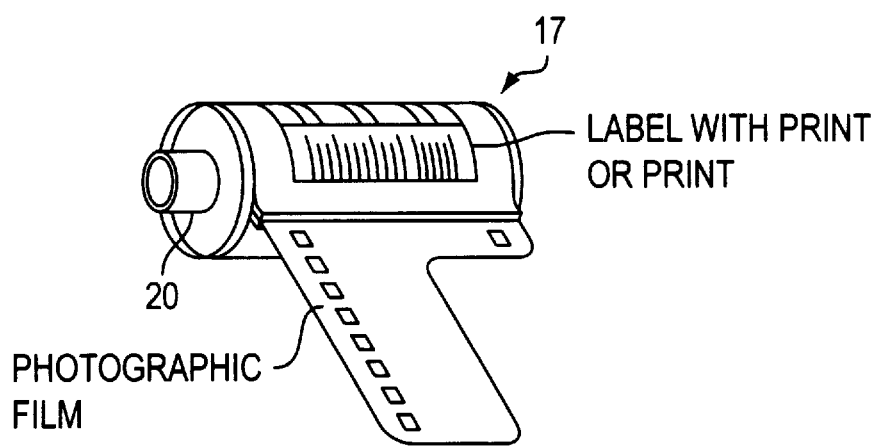
FIG. 15 is a perspective view of a photographic film cartridge made of resin embodying the invention.

FIG. 15 illustrates a photographic film cartridge 17 with a print having a particular size. The cartridge body and caps are made of a metal and the spool 20 on which the photographic film to be loaded is wound is the packaging material for a photographic photosensitive material of the invention and the same as disclosed in FIG. 14.

FIG. 12 illustrates an exploded state of a photographic film unit 21 with a lens, which is the packaging material of the invention, consisting of a lower casing 22 in which a light-shielding photographic film cartridge 17 containing a photographic film wound around a spool 20 is set in a state shielded from light and an upper casing 29 which seals the lower casing 23 so as to form a light-shielding condition. All of the spool 20, the lower casing 22 and the upper casing 23 are formed of the light-shielding polyolefin resin composition. When taking recycling ability into consideration, it is preferable to form all of the cartridge 17 for a photographic film, the spool 20, the upper casing 23 and the lower casing 22 by the same or a similar resin composition.

FIG. 17 illustrates a cap-body integrated type light-shielding case 24 for a photographic film, such as a microfilm, which is the packaging material of the invention, consisting of a container body 15 portion and a cap 16 portion.

Figure 18:
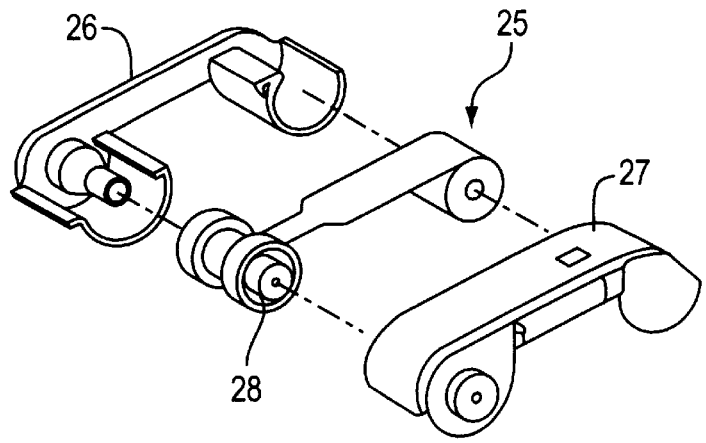
FIG. 18 is an exploded perspective view of a photographic film cartridge embodying the invention.

FIG. 18 illustrates an exploded state of a photographic film cartridge 25, which is the packaging material of the invention, consisting of a lower casing 26, an upper casing 27 and a spool 28 loaded therein, and all of the spool 28, the lower casing 26 and the upper casing 27 are formed of the light-shielding thermoplastic resin composition of the invention. When taking recycling ability into consideration, it is preferable to form all of the spool 28, the lower casing 26 and the upper casing 27 by the same or a similar resin composition.

Figure 19:
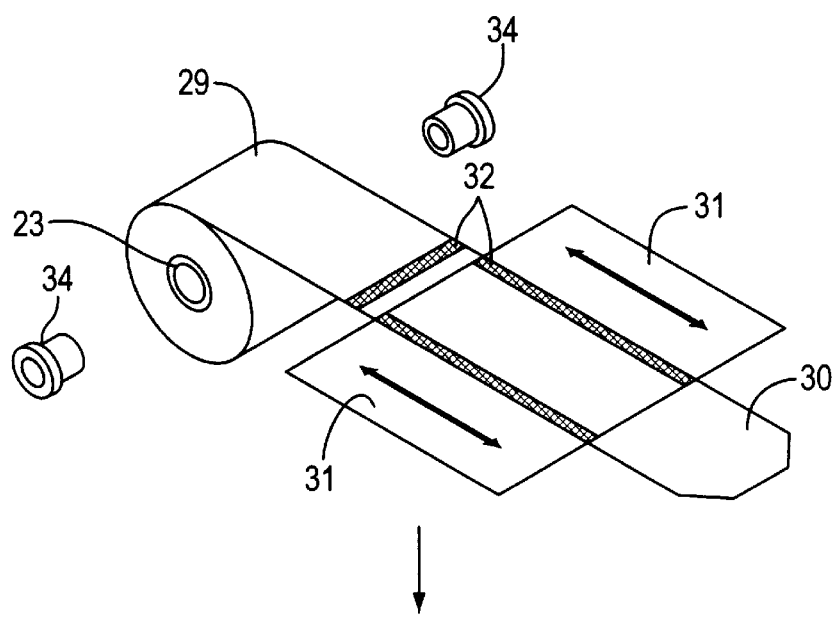
FIG. 19 is a perspective view illustrating a packaging process of a package of a photographic photosensitive strip material using a light-shielding film having a light-shielding thermoplastic resin film layer embodying the invention.
Figure 19:
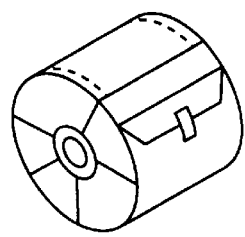

FIG. 19 illustrates a process of packaging a photographic photosensitive strip material by using a light-shielding thermoplastic resin film which is the packaging material for a photographic photosensitive material of the invention. In the figure, 29 is the photographic photosensitive strip material, 30 is a thermoplastic resin film guide member, 31 is a light-shielding thermoplastic resin film cover member, 32 is a joined portion by heat sealing, adhesive, adhesive tape (single face or double face adhesive tape), etc., 33 is a core, and 34 is a bush for seal packaging.

In the color masterbatch resin composition and the packaging material for a photographic photosensitive material of the invention, light-shielding material is dispersed uniformly by employing a special resin composition, and thereby, adverse affects upon photographic photosensitive materials are prevented, and favorable appearance can be ensured. Moreover, fog with time, abnormal sensitivity, abrasion, pressure marks, etc. can be prevented.

EXAMPLES

Inventive Example 1

A light-shielding material mixture was prepared by mixing uniformly 2 kg of an interlaminar compound (mean particle size: 2.0 $\mu$m) of antimony pentafluoride and graphite and 1 kg of furnace carbon black (mean particle size: 20 m$\mu$, pH 8.0, oil absorption value: 110 ml/100 g, volatile components: 0.8%) using a ball mixer. To 3 kg of the mixture, 2 kg of vinyl acetate resin and 0.7 kg of methyl acetate as a solvent were kneaded uniformly, and dried to obtain a color masterbatch resin composition for a packaging material for a photographic material having a light-shielding material concentration of 60 wt. %. The resin composition was cut into cubic pellets having a length of 4 mm, a width of 4 mm and a height of 3 mm (48 mm$^3$).

10 wt. % of the color masterbatch resin composition pellets was mixed uniformly by a tumbler mixer with 90 wt. % of columnar pellets having a diameter of 3 mm and a height of 4 mm (28.3 mm$^3$) of a thermoplastic resin for dilution of ethylene-octene-1 random copolymer resin having an octene-1 content of 3 wt. % containing 0.05 wt. % of erucic amide lubricant, 0.10 wt. % of Irganox 1010, 0.2 wt. % of calcium stearate, 0.10 wt. % of vitamin E and 0.1 wt. % of synthetic silica. The pellet mixture was conveyed to a hopper provided with a dryer (60° C.) by an automatic loader.

60 wt. % of the light-shielding material concentration of the color masterbatch resin composition is ten times as much as the light-shielding material concentration of a packaging material to be molded which is 6 wt. %, and the volume (48 mm$^3$) of the color masterbatch resin composition pellet is 1.7 times as large as the volume (28.3 mm$^3$) of the pellet of the thermoplastic resin for dilution.

Using the above pellet mixture, a light-shielding L-LDPE resin inflation film 70 $\mu$m in thickness which is a packaging material for a photographic photosensitive material was molded. The inflation film was excellent in physical strength. The generation of microgrits was very few, and fish eyes and pinholes were quite none. Bleeding did not occur. Antistatic ability was very excellent, and in the case of using it as light-shielding bag static marks did not generate even under low humidity conditions of 30% RH or less. Moreover, various properties necessary for packaging materials for a photographic photosensitive material, such as photographic properties, light-shielding ability, complete sealability by heat seal, etc. could be ensured for a long period.

Inventive Examples 2–8, Comparative Examples 1–5 and Conventional Example 1

Resin compositions were prepared consisting of acrylic acid ester copolymer resin composed of 65 wt. % of methyl methacrylate and 30 wt. % n-butyl acrylate, rubber-containing polystyrene resin containing 6 wt. % of butadiene synthetic rubber, furnace carbon black having a mean particle size of 21 mμ, a coloring power of 126%, an oil absorption value of 76 ml/100 g, a pH of 8.0, polydimethylsiloxane having a viscosity of 20,000 centistokes, calcium stearate, synthetic silica and di-t-butyl-P-cresol. The content of each component is shown in Table 1. Each resin composition was kneaded in a melted state and pelletized by a double-screw extruder ("PCM-30", Ikegai Corp.) into columnar pellets having a diameter of 3 mm and a height of 4 mm. The pellets were dried at 70° C. with evacuating up to an oven-dry water content of not more than 0.1 wt. % to obtain color masterbatch resin composition pellets for a packaging material for a photographic photosensitive material.

10 wt. % of the color masterbatch resin composition pellets were mixed with 90 wt. % of columnar pellets having a diameter of 3.5 mm and a height of 4 mm of a thermoplastic resin for dilution of rubber-containing polystyrene resin containing 8 wt. % of butadiene synthetic rubber by a tumbler mixer for 30 minutes. Using an injection molding machine ("Netstal", Sumitomo Heavy Ind. Ltd.), the above pellet mixture was injection-molded at a mold clamping pressure of 150 ton into test pieces for Izod impact strength testm, photographic film spools as shown in FIG. 13 which meet a photographic film cartridge having a shape and a size of JIS K 7519-1982, cartridges for a photographic film as shown in FIG. 14 and film units with a lens as shown in FIG. 16. The results are shown in Table 1.

Evaluated by injection moldability of photographic film spools, injection molding for a long period, photographic properties, Izod impact strength, fog, appearance, delamination, etc., collectively.

B. Photographic Properties

A 35 mm negative color photographic film with 24 exposures with an ISO photographic speed 400 was wound around each photographic film spool, and loaded in a cartridge for photographic film having a shape and size of JIS K 7519-1982 with a slot for extending the photographic film to which a light-shielding teremp cloth was attached. The complete light-shielding package thus formed was put in a container body for a photographic film made of high density polyethylene resin, and sealed by attaching a corp made of low density polyethylene resin. The container was left in an air-conditioned room at 20° C. at 60% RH for one year, and then the photographic film was developed. Difference of photographic properties (fog, sensitivity, tone, coloration) was measured from the original photographic film before storing, and evaluated. Smaller difference is better.

C. Last Torque

Load tension upon extending a photographic film. A motor was connected to a pair of nip rolls which nip the leading end and extended a photographic film through a torque pick-up, and a 35 mm negative color film with 36 exposures was extended up to the last at a linear speed of 40 mm/sec. The last torque was measured by the torque pick-up, and the torque value was converted to a tension value.

TABLE 1

| | | Inventive | | | | | | | Conventional | Comparative | | | | | Test Method |
|---|---|---|---|---|---|---|---|---|---|---|---|---|---|---|---|
| | | 2 | 3 | 4 | 5 | 6 | 7 | 8 | 1 | 1 | 2 | 3 | 4 | 5 | |
| Color Masterbatch Resin Composition | | | | | | | | | | | | | | | |
| Carbon Black | wt. % | 20 | 20 | 20 | 20 | 20 | 20 | 20 | 20 | 20 | 20 | 20 | 20 | 20 | — |
| Acrylic Acid Ester Copolymer Resin | wt. % | 15 | 35 | 45 | 50 | 55 | 25 | 55 | 0 | 0 | 10 | 50 | 65 | 30 | — |
| Rubber-Containing Polystyrene Resin | wt. % | 59 | 39 | 29 | 24 | 19 | 49 | 19 | 80 | 80 | 64 | 39 | 19 | 44.6 | — |
| Polydimethylsiloxane | wt. % | 5 | 5 | 5 | 5 | 5 | 5 | 5 | 0 | 0 | 5 | 0 | 5 | 5 | — |
| Ca Stearate | wt. % | 0.5 | 0.5 | 0.5 | 0.5 | 0.5 | 0.5 | 0.5 | 0 | 0 | 0.5 | 0.5 | 0.5 | 0 | — |
| Synthetic Silica | wt. % | 0.4 | 0.4 | 0.4 | 0.5 | 0.5 | 0.5 | 0.5 | 0 | 0 | 0.5 | 0.4 | 0.4 | 0.4 | — |
| di-t-Butyl-p-Cresol | wt. % | 0.1 | 0.1 | 0.1 | 0.1 | 0.1 | 0.1 | 0.1 | 0 | 0 | 0.1 | 0.1 | 0.1 | 0 | — |
| Molded Article | | | | | | | | | | | | | | | |
| Color Masterbatch Resin Composition | wt. % | 10 | 10 | 10 | 10 | 10 | 10 | 13 | 10 | 10 | 10 | 10 | 10 | 10 | — |
| Rubber-Containing Polystyrene Resin for Dilution | wt. % | 90 | 90 | 90 | 90 | 90 | 90 | 88 | 90 | 90 | 90 | 90 | 90 | 90 | — |
| Carbon Black Content | wt. % | 0.4 | 0.4 | 0.4 | 0.4 | 0.4 | 0.4 | 0.52 | 0.4 | 0.4 | 0.4 | 0.4 | 0.4 | 0.4 | — |
| Suitability for Spool | — | ○ | ◎ | ◎ | ○ | ● | ◎ | ○ | ▲ | ▲ | ▲ | ▲ | ▲ | ▲ | A |
| Photographic Properties | — | ○ | ○ | ○ | ○ | ○ | ○ | ○ | ▲ | ▲ | ○ | ○ | ○ | ▲ | *B |
| Last Torque | — | ◎ | ◎ | ◎ | ○ | ○ | ◎ | ○ | ▲ | ▲ | ◎ | ▲ | ○ | ◎ | *C |
| Izod Impact Strength | — | ◎ | ◎ | ○ | ○ | ● | ◎ | ● | ○ | ◎ | ◎ | ○ | ▲ | ◎ | *D |
| Fog | — | ○ | ○ | ○ | ○ | ● | ○ | ○ | ● | ● | ○ | ▲ | ● | ○ | E |
| Appearance | — | ● | ○ | ○ | ○ | ○ | ○ | ○ | ▲ | ▲ | ▲ | ○ | ○ | ▲ | F |
| Delamination | — | ○ | ○ | ○ | ● | ● | ○ | ○ | ○ | ○ | ○ | ○ | ▲ | ○ | G |
| Suitability for Cartridge | — | ● | ◎ | ◎ | ● | ● | ◎ | ○ | ▲ | ▲ | ▲ | ▲ | ▲ | ▲ | H |
| Suitability for Film Unit | — | ○ | ◎ | ◎ | ● | ● | ◎ | ○ | ▲ | ▲ | ▲ | ▲ | ▲ | ▲ | I |

Evaluation was as follows:
◎ . . . Very excellent
○ . . . Excellent
● . . . Practical
▲ . . . Having a problem, improvement is necessary Testing methods are as follows:
A. Suitability for Spool The measuring apparatus is disclosed in Japanese Patent KOKAI 62284355.

D. Izod Impact Strength

Measured according to ASTM D-256 (at 23° C.)

F. Fog

A negative color photographic film with an ISO photographic speed 400 was wound around each photographic film spoo., and loaded in a cartridge for photographic film in JIS 135 type, and exposed to light of 80,000 luxes for 1 hour. Then, the photographic film was developed, fixed, washed with water, and dried, and evaluated by fogged degree of the photographic film.

F. Appearance

Microgrits, uneven color and weldlines generated on each injection-molded photographic film spool were evaluated by visual inspection.

G. Delamination

Using the test piece for Izod impact strength test, the test piece was folded, and a cut line was formed by a knife. Then, peeled in the resin flow direction, and the peeled area was evaluated by visual observation.

H. Suitability for Cartridge

Evaluated by injection moldability of photographic film cartridges, injection molding for a long period, photographic properties, Izod impact strength, fog, appearance, delamination, etc., collectively.

I. Suitability for Film Unit

As to each photographic film unit with a lens, evaluated similar to the testing method H.

The articles of the invention were excellent in photographic properties (the dispersion of carbon black was excellent, the generation of microgrits ware rare, halogen compounds and metal ions in the resin were neutralized by calcium stearate, thermal decomposition of resin was prevented by di-t-butyl-p-cresol). By blending synthetic rubber and polydimethylsiloxane, last torque was decreased, and Izod impact strength was improved. Moreover, since opacified greatly, light-shielding ability was improved, and fog did not occur, even when light-shielding material amount was decreased. Appearance was also excellent. Since the masterbatch resin composition contained a suitable amount of acrylic acid ester copolymer resin, the uniformed dispersion of carbon black into a thermoplastic resin for dilution was improved, and microquits, uneven coloration and fog did not occur. Delamination was not generated, and accordingly, the articles of the invention were excellent as a packaging material for a photographic photosensitive material.

Inventive Example 9

Columnar pellets of a color masterbatch resin composition having a diameter of 3 mm and a height of 4 mm were prepared. The resin composition was composed of 43 wt. % of low crystallinity ethylene-butene-1 copolymer resin having a MFR of 5.0 g/10 minutes, a density of 0.890 g/cm$^3$ and a Vicat softening point of 98° C., 2 wt. % of zinc stearate, 50 wt. % of conductive furnace carbon black having a mean particle size of 16 m$\mu$, an oil absorption value of 80 ml/100 g and a pH of 8.0, 0.3 wt. % of a hindered phenol antioxidant of tetrakis[methylene-3-(3,5-di-t-butyl-4-bydroxyphenyl) propionate]methane (molecular weight: 118), 0. 2 wt. % of synthetic silica and 4.5 wt. % of low molecular weight polyethylene resin having a number average molecular weight of 1700.

20 wt. % of the above color masterbatch resin composition pellets were mixed with 80 wt. % columnar pellets having a diameter of 35 mm and a height of 4 mm of ethylene-butene-1copolymer resin having a MFR of 2.3 g/10 minutes, a density of 0.919 g/cm$^3$ and a Vicat softening point of 129° C. containing 0.05 wt. % of erucic amide and 0.2 wt. % of calcium stearate, by a tumbler mixer for 30 minutes, and the pellet mixture was molded into a light-shielding film 70 $\mu$m in thickness which was a packaging material for a photographic photosensitive material under the following inflation film molding conditions.

Inflation Film Molding conditions

Screw diameter: 50 mm ø

Screw L/D: 26/1

Compression ratio: 3.5

Ring die diameter: 100 mm ø

Ring dip lip clearance: 1.0 mm

Blow-up ratio: 1.2

Set temperature:

Cylinder: 180° C.

Resin temperature: 180° C.

Ring die: 180° C.

Cooling: Air cooling

Nip roll linear pressure: 5 kg/cm

The above packaging material for a photographic photosensitive material of the light-shielding inflation film had complete light-shielding ability, and was excellent in heat sealing properties (heat seal strength was great, heat seal strength descending with time was small, sealability with other materials was excellent). Moreover, physical strength was great, the generation of microgrits was very rare, and lubricity was excellent.

Furthermore, a volume specific resistance according to standards of Japan Rubber Association (SRIS 2301) was small 6.2×105 Ω·cm. A photographic photosensitive material was taken in and out five times from a light-shielding bag made of the light-shielding inflation film in a low humidity dark room at 20° C., 25% RH, and then, developed. As a result, it was found that the occurrence of static marks was none, different from the case of using a conventioned bag, wherein static marks occurred. Photographic photosensitive materials (color photographic paper) were sealed in the bag, and left in an air-conditioned room at 20° C. at 60% RH for one year, and then developed and fixed. As a result, fog did not occur at all. Photographic properties (sensitivity, tone, color reproducibility, fog) were normal compared with those before storing, and normal photographs were obtained through normal developing conditions.

Inventive Example 10

10 wt. % of the pellets of the color masterbatch resin composition prepared in Inventive Example 9 were mixed with 1.0 wt. % of calcium stearate, 5.0 wt. % of dimethylpolysiloxane having a viscosity of 10,000 centistokes and 84 wt. % of columnar pellets having a diameter of 3.5 mm and a height of 4 mm of polystyrene resin having a MFR of 15 g/10 minutes, a density of 1.04 g/cm$^3$ and a Vicat softening point of 98° C. containing 6 wt. % of butadiene synthetic rubber by a tumbler mixer for 60 minutes. The pellet mixture was kneaded in a melted state and pelletized by a double-screw extruder ("PCM-30", Ikegai Corp.) into columnar pellets having a diameter of 3 mm and a height of 4 mm containing 5 wt. % of carbon black. 10 wt. % of the above low concentration color masterbatch resin composition containing 5 wt. % of carbon black and 4.5 wt. % of dimethylpolysiloxane was mixed with 90 wt. % of the above polystyrene resin pellets containing 6 wt. % of butadiene synthetic rubber by a tumbler mixer for 30 minutes, and injection-molded into photographic film spools, photographic film cartridges and photographic film units with a lens by using the same injection molding machine and the molds used in Inventive Examples 2–8.

The molded articles were evaluated by the same testing methods employed in Inventive Examples 2–8. As a result, the photographic film spools had very excellent properties, i,e, the suitability for spool: ⊚, the photographic properties: ○, the last torque: ⊚, the Izod impact strength: ⊚, the fog: ○, the appearance: ○, the delamination: ○. The photographic film cartridges and the photographic film units with a lens had also very excellent properties, and the suitability for cartridge was evaluated ⊚, and the suitability for film unit was also evaluated ⊚.

Inventive Example 11

100 parts by weight of ethylene-butene-1 copolymer resin having a MFR of 2.1 g/10 minutes, a density of 0.922 g/cm$^3$, a melting point of 125° C., a molecular weight distribution (Mw/Mu) of 3.5 and a butene-1content of 4.2 mol. % was mixed with 10 parts by weight of maleic anhydride-modified ethylene-butene-1 copolymer resin having a MFR of 8 g/10 minutes, a density of 0.920 g/cm$^3$ a carboxyl group content of 5 g/1 kg, 100 parts by weight of furnace type carbon black having a mean particle size of 25 m$\mu$ and a pH of 8.0 of which the surface was coated with acrylic acid and 0.1 part by weight of an organic peroxide of 2.5-dimethyl-2.5-di(t-butylperoxy)hexane by a ribbon blender. The mixture was kneaded in a melted state by a single-screw extruder (screw diameter: 50 mm ø, L/D=28) at 205° C., and extruded in a strand (diameter: 3 mm ø), into a water bath. After cooled, the strands were pelletized by cutting into 3 mm length pieces by a cutter.

The pellets were dried up to an oven-dry water content of not more than 0.1 wt. % at 80° C. under reduced pressure at 80 mm Hg for 2 hours to obtain columnar pellets having a diameter of 3 mm and a height of 3 mm of a color masterbatch resin composition for a packaging material for a photographic photosensitive material. 10 wt. % of the above color masterbatch resin composition pellets were mixed with 90 wt. % of columnar pellets having a diameter of 3 mm and a height of 4 mm of ethylene-4-methylpentene-1 random copolymer resin having a MFR of 2.0 g/10 minutes, a density of 0.920 g/cm$^3$ and a 4-methylpentene-1 content of 4 mol. % containing 0.05 wt. % of erucic amide, 0.1 wt. % of antioxidant and 0.3 wt. % of calcium stearate as the thermoplastic resin pellets for dilution by an automatic weighing mixer in weight measuring type ("Auto Color AC", Kawada Seisakusho) uniformly. The pellet mixture was conveyed to a hopper of an extruder by an automatic loader, and molded into a light-shielding L-LDPE resin inflation film 70 $\mu$m in thickness which was a packaging material for a photographic photosensitive material under the following inflation film molding conditions.

Inflation Film Molding conditions
Screw diameter: 50 mm ø
Screw L/D: 26/1
Compression ratio: 3.5
Ring die diameter: 100 mm ø
Ring dip lip clearance: 1.0 mm
Blow-up ratio: 1.2
Set temperature:
Cylinder: 180° C.
  Resin temperature: 180° C.
  Ring die: 180° C.
Cooling: Air cooling
Nip roll linear pressure: 5 kg/cm The packaging material did not affect adversely photographic properties of photographic photosensitive materials, and had a great physical strength. The generation of microgrits was rare, and fish eyes and pinholes did not occur at all. Heat sealing properties were very excellent, and even when a light-shielding bag was prepared by a single layer film, complete light-shielding ability and moistureproofness could always be assured.

Inventive Example 12

1 wt. % of the color masterbatch resin composition pellets prepared in Inventive Example 11 was mixed with 99 wt. % of columnar pellets having a diameter of 3 mm and a height of 3 mm of homopolyethylene resin having a MFR of 30 g/10 minutes, a density of 0.920 g/cm$^3$ and a molecular weight distribution (Mw/Mn) of 4.5 containing 0.05 wt. % of oleic amide, 0.1 wt. % of phenol antioxidant and 0.15 wt. % of dibenzylidene sorbitol compound as the thermoplastic resin for dilution by an automatic weighing mixer ("Auto Color AC", Kawada Seisakusho) uniformly, and put in a hopper of an extruder.

The pellet mixture was kneaded in a melted state and injection-molded into caps shown in FIG. 10 by using a toggle type injection molding machine and a hot runner type mold with the number of cavities of 36 at a resin temperature of 190° C. at a mold clamping pressure of 200 ton at a molding cycle of 6 seconds, The packaging material was excellent in the dispersion of carbon black which was a light-shielding material, and uneven coloration did not occur. Since the masterbatch resin composition was diluted at a high dilution ratio with a thermoplastic resin for dilution, the cost was substantially the same as the cost of the uncolored low density homopolyethylene resin which was very inexpensive. By using the resin having a small molecular weight distribution and a high MFR, mold shrinkage could be decreased to ⅓ or less of conventional colores cap without degrading injection moldability, the blending effect of a nucleating agent was enhanced, and crystallization rate was improved. Cooling time could be shortened sharply, and even rendering molding cycle 6 seconds, molding troubles and troubles of fitting to a container body did not occur. Since coloring troubles caused by thermal degradation of resin, clogging of an injection molding machine and short shot trouble caused by the generation of microgrits did not occur at all, unmanned continuous molding was possible through day and night without the occurrence of molding troubles, by using a computer-controlled injection molding machine.

Inventive Example 13

2 wt. % of the color masterbatch resin composition pellets prepared in Inventive Example 11 was mixed with 98 wt. % of columnar pellets having a diameter of 3 mm and a height of 4 mm of homopolyethylene resin having a MFR of 30 g/10 minutes, a density of 0.975 g/cm$^3$ and a molecular weight distribution (MW/MN) of 7.6 containing 0.05 wt. % of oleic amide, 0.2 wt. % of oleic monoglyceride, 0.05 wt. % of a phenol antioxidant, 0.05 wt. % of a phosphite antioxidant, 0.2 wt. % of calcium stearate, 0.2 wt. % of an organic nucleating agent and 0.3 wt. of a hydrotalcite compound as the thermoplastic resin for dilution by an automatic weighing mixer in weight measuring type ("Auto Color AC", Kawada Seisakusho) uniformly.

The pellet mixture was kneaded in a melted state and injection-molded into container bodies shown in FIG. 11 by using a toggle type injection molding machine (L/D=25) and a hot runner type mold with the number of cavities of 36 at a melted resin temperature of 210° C. at a mold lamping pressure of 200 ton at a molding cycle of 6 seconds.

The packaging material was excellent in the dispersion of carbon black which was a light-shielding material, and uneven coloration did not occur. Since the masterbatch resin composition was diluted at a high dilution ratio with a thermoplastic resin for dilution, the cost was substantially the same as the cost of the uncolored high density homopolyethylene resin which was very inexpensive. By using the resin having a small molecular weight distribution and a high MFR, mold shrinkage could be decreased to ½ or less of conventional colores container body without degrading injection moldability, the blending effect of a nucleating agent was enhanced, and crystallization rate was improved. As a result, cooling time could be shortened sharply, and even rendering molding cycle 6 seconds, molding troubles buckling and troubles of fitting to a container cap did not occur. Since coloring troubles caused by thermal degradation of resin, clogging of an injection molding machine and short shot trouble caused by the generation of microgrits did not occur at all, unmanned continuous molding for a long period was possible through day and night without the occurrence of molding troubles, by using a computer-controlled closed system injection molding machine.

Inventive Example 14

2 wt. % of the color masterbatch resin composition pellets prepared in Inventive Example 11 was mixed with 48 wt. % of columnar pellets having a diameter of 4 mm: and a height of 3 mm of polystyrene resin having a MFR of 15 g/10 minutes, a density of 1.04 g/cm$^3$, a molecular weight distribution (MW/MN) of 3.0 and a butadiene rubber content of 4 wt. % containing 0.3 wt. % of calcium stearate, 0.3 wt. % of methylenebisoleic amide, 0.1 wt. % of a phenol antioxidant and 1.0 wt. % of a hydrotalcite compound and 50 wt. % of columnar spool recycled pellet having a diameter of 4 mm and a height of 3 mm as the thermoplastic resin for dilution by an automatic weighing mixer in weight measuring type ("Auto Color AC", Kawada Seisakusho) uniformly.

The pellet mixture was kneaded in a melted state and injection molded into spools shown in FIG. 13 by using a toggle type injection molding machine (L/D=25) and a semi-hot runner type mold with the number of cavities of 36 at a melted resin temperature of 190° C. at a mold clomping pressure of 200 ton at a molding cycle of 6 seconds.

The packaging material was excellent in the dispersion of carbon black which was a light-shielding material and uneven coloration did not occur, and complete light-shielding ability could be ensured. Since the masterbatch resin composition was diluted at a high dilution ratio with an uncolored butadiene rubber-containing polystyrene resin and recycled polystyrene resin for dilution, the cost was very inexpensive. Since the spool was excellent in lubricity, rare generation of microgrits, and beautiful appearance, winding torque and unwinding torque of a photographic film was small, winding stop at midway did not occur at all. Since coloring trouble caused by thermal degradation of resin, clogging of an injection molding machine and short shot trouble caused by the generation of microgrits did not occur at all, unmanned continuous molding for a long period was possible through day and night without the occurrence of molding troubles, by using a computer-controlled closed system injection molding machine. As a result, to remove inspection except automatic inspection of processing was possible.

As above, it was found that the color masterbatch resin composition of Inventive Example 11 could be dispersed into most thermoplastic resins, such as polyolefin resins, polystyrene resins, polyamide resins and polyester resins, used as a resin for dilution, and had excellent properties capable of ensuring photographic properties and complete light-shielding ability necessary for packaging materials for a photographic photosensitive material.

We claim:

1. A packaging material for a photographic photosensitive material, comprising a color masterbatch resin composition for a packaging material, which comprises a thermoplastic resin and a light-shielding material having a surface which has been coated with a surface-coating material dispersed into the thermoplastic resin, a resin composition for dilution, and a lubricant, wherein the thermoplastic resin is a rubber-containing aromatic monovinyl resin which has a melt flow rate of 3 to 40 g/10 minutes, a Rockwell hardness of M 40 or more, a Vicat softening point of 78° C. or more, a bending elastic modulus of 20,000 kg/cm$^2$ or more and which contains 1 to 12 wt. % of a rubber material having a mean particle size of 0.1 to 10 $\mu$m;

wherein the surface-coating material is present in a coating amount of 0.001 to 2 wt. % of the weight of the packaging material for a photographic photosensitive material and is an ester of (i) an aliphatic monocarboxylic acid having 20 to 40 carbon atoms and (ii) a monovalent aliphatic alcohol having 20 to 40 carbon atoms;

wherein the light-shielding material is carbon black which has a DBP oil absorption value of not less than 50 ml/100 g and a total sulfur components content of 0.9% or less; and wherein the lubricant is present in an amount of 0.01 to 10 wt. % of the weight of the packaging material for a photographic photosensitive material and is a fatty acid metal salt having 10 to 35 carbon atoms and a melting point of 70° to 180° C.

2. The packaging material for a photographic photosensitive material claim 1 wherein the color masterbatch resin composition for a packaging material comprises 100 parts by weight of a polystyrene resin and/or an ABS resin, 0.2 to 50 parts by weight of the carbon black having a total sulfur components content of 0.9% or less and having an iodine adsorption amount of 20 mg/g or more, and a thermoplastic resin for dilution;

wherein the polystyrene resin and/or ABS resin has a melt flow rate of 3 to 40 g/10 minutes, a Rockwell hardness of M 40 or more, a Vicat softening point of 78° C. or more, and a bending elastic modulus of 20,000 kg/cm$^2$ or more;

wherein the carbon black has a DBP oil absorption value of not less than 50 ml/100 g and a mean particle size of 10 to 120 m$\mu$; and wherein the lubricant is present in an amount of 0.01 to 10 wt. % of the weight of the packaging material for a photographic photosensitive material and is a fatty acid metal salt having 10 to 35 carbon atoms and a melting point of 70° to 180° C.

3. The packaging material for a photographic photosensitive material of claim 2 which is made by a process comprising the steps of mixing a color masterbatch resin composition and a thermoplastic resin for dilution in an amount twice as much as or more by weight of the color masterbatch resin composition, molding by keeping a hopper and a resin feed opening of an extruder under reduced pressure conditions lower than an atmospheric pressure.

4. The packaging material for a photographic photosensitive material of claim 2 which packaging material comprises 100 parts by weight of the color masterbatch resin composition for a packaging material and 300 parts by weight or more of the thermoplastic resin for dilution mixed almost uniformly, said packaging material being prepared by supplying the mixed resin in a melted state to a mold through a line mixer without any movable part between an extruder and the mold.

5. The packaging material for a photographic photosensitive material of claim 2 which has been molded from a mixture of pellets of the color masterbatch resin composition for a packaging material for a photographic photosensitive material with pellets of the thermoplastic resin for dilution in a predetermined ratio by an automatic weighing mixer, wherein evaporable substances have been removed from the resin mixture through their evaporation by keeping a hopper and a resin feed opening of an extruder to which the mixed pellets are supplied under reduced pressure conditions lower than an atmospheric pressure.

6. The packaging material for a photographic photosensitive material of claim 2 wherein the thermoplastic resin for dilution is a rubber-containing polystyrene resin for dilution, and wherein the packaging material has been molded from a mixture of pellets of the color masterbatch resin composition for the packaging material for the photographic photosensitive material with pellets of the rubber-containing polystyrene resin for dilution in a predetermined ratio almost uniformly, by injecting the resin mixture into a mold of which a wall temperature of core and cavity portions is from 110° to 250° C., and taking the molded packaging material out of the mold when the wall temperature of core and cavity portions is less than a glass transition temperature of the rubber-containing polystyrene.

* * * * *